US007352865B2

(12) United States Patent
Gassho et al.

(10) Patent No.: US 7,352,865 B2
(45) Date of Patent: Apr. 1, 2008

(54) PRINTER SERVER AND PRINT SYSTEM AND DATA RECEIVING DEVICE AND DATA SENDING/RECEIVING SYSTEM

(75) Inventors: Kazuhito Gassho, Nagano-Ken (JP); Toshihiro Shima, Nagano-Ken (JP); Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 578 days.

(21) Appl. No.: 10/500,051

(22) PCT Filed: Jun. 17, 2003

(86) PCT No.: PCT/JP03/07684

§ 371 (c)(1),
(2), (4) Date: Jun. 25, 2004

(87) PCT Pub. No.: WO03/107171

PCT Pub. Date: Dec. 24, 2003

(65) Prior Publication Data

US 2005/0039044 A1 Feb. 17, 2005

(30) Foreign Application Priority Data

Jun. 17, 2002 (JP) ............................ 2002-176151
Apr. 2, 2003 (JP) ............................ 2003-099544

(51) Int. Cl.
*G06F 21/00* (2006.01)

(52) U.S. Cl. ...................................................... 380/258

(58) Field of Classification Search ................ 380/258; 713/155; 709/203
See application file for complete search history.

(56) References Cited

U.S. PATENT DOCUMENTS

| | | | | |
|---|---|---|---|---|
| 5,757,916 | A * | 5/1998 | MacDoran et al. | 380/258 |
| 5,815,814 | A * | 9/1998 | Dennison et al. | 455/456.2 |
| 6,131,067 | A * | 10/2000 | Girerd et al. | 701/213 |
| 6,552,813 | B2 * | 4/2003 | Yacoub | 358/1.1 |
| 6,985,588 | B1 * | 1/2006 | Glick et al. | 380/258 |
| 2002/0094777 | A1 * | 7/2002 | Cannon et al. | 455/41 |
| 2002/0194266 | A1 * | 12/2002 | Brebner et al. | 709/203 |
| 2003/0095524 | A1 * | 5/2003 | Stephens et al. | 370/338 |
| 2003/0101342 | A1 * | 5/2003 | Hansen | 713/167 |

FOREIGN PATENT DOCUMENTS

WO WO 01/55979 8/2001

* cited by examiner

*Primary Examiner*—Kambiz Zand
*Assistant Examiner*—Andrew L Nalven
(74) *Attorney, Agent, or Firm*—Martine Penilla & Gencarella, LLP

(57) ABSTRACT

From a printer, a print client previously acquires printer position information on the printer. For example, when trying to transmit print data to the printer, the print client generates print transmitting data by adding printer position information on the printer to the print data and transmits the print transmitting data. The printer which has received this print transmitting data prints the print data only when the printer position information contained in the print transmitting data coincides with printer position information at this point in time. Consequently, the security of the print transmitting data transmitted from the print client to the printer via a network is ensured.

8 Claims, 39 Drawing Sheets

TB10: RINTER POSITION INFORMATION TABLE

D10 D12 D11 D13 D14

| PRINTER | PRINTER POSITION INFORMATION | | |
|---|---|---|---|
| | LATITUDE | LONGI-TUDE | ALTITUDE |
| 192.168.1.10 | X1 | Y1 | Z1 |
| 192.168.1.11 | X2 | Y2 | Z2 |
| ⋮ | ⋮ | ⋮ | ⋮ |

FIG.6

TB20: PUBLIC KEY TABLE

D20 D21

| PRINTER | PUBLIC KEY |
|---|---|
| 192.168.1.10 | PKEY1 |
| 192.168.1.11 | PKEY2 |
| ⋮ | ⋮ |

FIG.15

TB30: PUBLIC KEY TABLE

D30 D31

| PRINTER | PUBLIC KEY |
|---|---|
| 192.168.1.10 (PORT 1) | PKEY1 |
| 192.168.1.10 (PORT 2) | PKEY2 |
| ⋮ | ⋮ |

FIG.25

TB40: PUBLIC KEY TABLE

D40 D41

| PRINT SERVER | PUBLIC KEY |
|---|---|
| 192.168.1.10 | PKEY1 |
| 192.168.1.11 | PKEY2 |
| ⋮ | ⋮ |

FIG.31

PRINTER SERVER AND PRINT SYSTEM AND DATA RECEIVING DEVICE AND DATA SENDING/RECEIVING SYSTEM

BACKGROUND OF THE INVENTION

1. Field of the Invention

The present invention relates to a printer, a server, and a print system, and a data receiving device and a data transmitting and receiving system, and particularly relates to a printer, a server, and a print system, and a data receiving device and a data transmitting and receiving system which ensure security of data transmitted to the printer, the server, and the data receiving device.

2. Background Art

These days, a print system in which a printer is shared using a network has been increasingly used. Namely, by connecting plural computers as print clients to one network and connecting, for example, one printer to this network, the one printer can accept print data from the plural print clients and print the print data.

In such a print system using the network, various users can transmit print data from their respective print clients to the printer and perform printing.

However, if the print data transmitted from the print clients is printed by the printer unconditionally, a print operation is executed even by the printer which is not installed in a place where the users intend to perform printing. In particular, in the case of the printer which is moved from one place where the printer has been heretofore used to another place, an IP address or the like which is an address on the network sometimes remains unchanged, and hence the transmitted print data may be printed by the printer moved to another place. The above situation is undesirable for users who want to ensure the security of print data.

Moreover, if the print data transmitted from the print clients is printed by the printer unconditionally, even print data transmitted from the print clients which are not duly authorized to perform printing with the printer is printed by the printer. In this case, print clients able to perform printing with the printer cannot be restricted, which is undesirable as well. Especially when the possibility of the existence of users who transmit a large amount of print data with dishonest intention is considered, it is necessary to provide some print restriction.

Further, in some cases, a printer which has been used in one department of a company is moved to another department and used there. In such a case, even print clients which have heretofore had the authority of perform printing with this printer are not sometimes wanted to be given the authority to perform printing with this printer after the printer has been moved. In the above situation, a need for technology which prevents print data from the print clients from being printed on the printer side is acknowledged.

Furthermore, it can be assumed that by manipulating path information on the network to install the same printer in a different position and using the same network address, another printer can pass itself off as a true printer.

Moreover, there exists a printer into which a certificate to authenticate the printer itself is incorporated, and when this printer is discarded, it is necessary to certainly delete the certificate incorporated into the printer. However, if a printer becomes unable to execute a print operation by only changing the installation place of the printer, the printer can be discarded more safely.

SUMMARY OF THE INVENTION

Hence, the present invention is made in view of the aforementioned problems, and an object of the present invention is to provide a print system which ensures security of print data and a printer by restricting print data which can be printed based on information on a position where the printer is installed. Another object is to provide a data transmitting and receiving device which ensures security of transmitted data and a data receiving device by restricting data which can be processed based on information on a position where the data receiving device is installed.

In order to accomplish the aforementioned and other objects, according to one aspect of the present invention, a printer which processes print transmitting data, comprises:

a print transmitting data receiver which receives the print transmitting data;

a first printer position acquisition which acquires printer position information to specify a place where the printer is installed when the print transmitting data receiver has received the print transmitting data, this printer position information being regarded as first printer position information;

a judgment section which judges whether the print transmitting data matches the first printer position information; and a print executor which executes a print operation based on the print transmitting data when the judgment section judges that the print transmitting data matches the first printer position information and restricts the print operation based on the print transmitting data when the judgment section judges that the print transmitting data does not match the first printer position information.

According to another aspect of the present invention, a control method of a printer which processes print transmitting data, comprises the steps of:

receiving the print transmitting data;

acquiring printer position information to specify a place where the printer is installed when the print transmitting data has been received, and regarding this printer position information as first printer position information;

judging whether the print transmitting data matches the first printer position information;

executing a print operation based on the print transmitting data when it is judged that the print transmitting data matches the first printer position information; and restricting the print operation based on the print transmitting data when it is judged that the print transmitting data does not match the first printer position information.

According to another aspect of the present invention, a print system includes at least one printer and at least one print client connected to the printer via a network, wherein the print client comprises:

a printer position information holder which holds first printer position information which is printer position information to specify a place where the printer is installed;

a printer position information reader which reads the first printer position information from the printer position information holder;

a print transmitting data generator which generates print transmitting data by adding the first printer position information read by the printer position information reader to print data; and a print transmitting data transmitter which transmits the print transmitting data generated by the print transmitting data generator to the printer via the network, and the printer comprises:

a print transmitting data receiver which receives the print transmitting data transmitted by the print client;

a first printer position acquisition which acquires second printer position information which is printer position information to specify a place where the printer is installed when the print transmitting data has been received; and a print executor which judges whether the first printer position information contained in the print transmitting data and the second printer position information acquired by the first printer position acquisition match, executes a print operation based on the print transmitting data when the two pieces of the printer position information match, and restricts the print operation based on the print transmitting data when the two pieces of the printer position information do not match.

According to another aspect of the present invention, a print system includes at least one printer and at least one print client connected to the printer via a network, wherein the print client comprises:

a public key holder which holds a public key for encryption acquired from the printer;

a public key reader which reads the public key from the public key holder;

a print transmitting data generator which encrypts print data with the public key read by the public key reader to generate print transmitting data; and a print transmitting data transmitter which transmits the print transmitting data generated by the print transmitting data generator to the printer via the network, and the printer comprises:

a print transmitting data receiver which receives the print transmitting data transmitted by the print client;

a first printer position acquisition which acquires printer position information to specify a place where the printer is installed when the print transmitting data has been received, this printer position information being regarded as first printer position information; and a print executor which generates a private key with a first passphrase containing at least the first printer position information acquired by the first printer position acquisition, executes a print operation based on the print transmitting data when the print transmitting data has been decrypted with the private key, and does not execute the print operation based on the print transmitting data when the print transmitting data has not been decrypted with the private key.

According to another aspect of the present invention, a control method of a print system including at least one printer and at least one print client connected to the printer via a network, comprises the steps of:

reading first printer position information from a printer position information holder, which holds the first printer position information which is printer position information to specify a place where the printer is installed, in the print client;

generating print transmitting data by adding the read first printer position information to print data;

transmitting the generated print transmitting data from the print client to the printer via the network;

receiving the print transmitting data transmitted by the print client in the printer;

acquiring second printer position information which is printer position information to specify a place where the printer is installed when the print transmitting data has been received;

judging whether the first printer position information contained in the print transmitting data and the acquired second printer position information match;

executing a print operation based on the print transmitting data when it is judged that the print transmitting data matches the first printer position information; and restricting the print operation based on the print transmitting data when it is judged that the print transmitting data does not match the first printer position information.

According to another aspect of the present invention, a control method of a print system including at least one printer and at least one print client connected to the printer via a network, comprises the steps of:

reading a public key from a public key holder, which holds the public key for encryption acquired from the printer, in the print client;

encrypting print data with the read public key to generate print transmitting data;

transmitting the generated print transmitting data to the printer via the network;

receiving the print transmitting data transmitted by the print client in the printer;

acquiring printer position information to specify a place where the printer is installed when the print transmitting data has been received and regarding this printer position information as first printer position information; and generating a private key with a first passphrase containing at least the first printer position information, executing a print operation based on the print transmitting data when the print transmitting data has been decrypted with the private key, and not executing the print operation based on the print transmitting data when the print transmitting data has not been decrypted with the private key.

According to another aspect of the present invention, a printer which processes print transmitting data, comprises:

a print transmitting data receiver which receives the print transmitting data;

a printer position acquisition which acquires printer position information to specify a place where the printer is installed when the print transmitting data receiver has received the print transmitting data;

a private key generator which generates a private key with a passphrase containing at least the printer position information; and a print executor which decrypts the print transmitting data received by the print transmitting data receiver with the private key and executes a print operation based on print data obtained by the decryption.

According to another aspect of the present invention, a data receiving device which processes data, comprises:

a data receiver which receives transmitted data;

a device position acquisition which acquires device position information to specify a place where the data receiving device is installed;

a judgment section which judges whether the data matches the device position information acquired by the device position acquisition; and a processing section which executes a process based on the data when the judgment section judges that the data matches the device position information and restricts the process based on the data when the judgment section judges that the data does not match the device position information.

According to another aspect of the present invention, a data transmitting and receiving system includes at least one data receiving device and at least one data transmitting device connected to the data receiving device via a network, wherein the data transmitting device comprises:

a device position information holder which holds first device position information to specify a place where the device receiving device is installed;

a device position information reader which reads the first device position information from the device position information holder;

a transmitting data generator which generates transmitting data by adding the first device position information read by the device position information reader to data; and a transmitting data transmitter which transmits the transmitting data generated by the transmitting data generator to the data receiving device via the network, and the data receiving device comprises:

a transmitting data receiver which receives the transmitting data transmitted by the data transmitting device;

a device position acquisition which acquires second device position information to specify a place where the data receiving device is installed when the transmitting data has been received; and a process executor which judges whether the first device position information contained in the transmitting data and the second device position information acquired by the device position acquisition coincide, executes a process based on the transmitting data when the two pieces of the device position information coincide, and restricts the process based on the transmitting data when the two pieces of the device position information do not coincide.

According to another aspect of the present invention, a data transmitting and receiving system includes at least one data receiving device and at least one data transmitting device connected to the data receiving device via a network, wherein the data transmitting device comprises:

a public key holder which holds a public key for encryption acquired from the transmitting device;

a public key reader which reads the public key from the public key holder;

a transmitting data generator which encrypts data with the public key read by the public key reader to generate transmitting data; and a transmitting data transmitter which transmits the transmitting data generated by the transmitting data generator to the data receiving device via the network, and the data receiving device comprises:

a transmitting data receiver which receives the transmitting data transmitted by the data transmitting device;

a device position acquisition which acquires device position information to specify a place where the data receiving device is installed when the transmitting data has been received; and a process executor which generates a private key with a passphrase containing at least the device position information acquired by the device position acquisition, executes a process based on the transmitting data when the transmitting data has been decrypted with the private key, and does not execute the process based on the transmitting data when the transmitting data has not been decrypted with the private key.

According to another aspect of the present invention, a server which processes print transmitting data, comprises:

a print transmitting data receiver which receives the print transmitting data;

a first server position acquisition which acquires server position information to specify a place where the server is installed, this server position information being regarded as first server position information;

a judgment section which judges whether the print transmitting data matches the first server position information acquired by the first server position acquisition; and a selective spooling section which spools the print transmitting data when the judgment section judges that the print transmitting data matches the first server position information and does not spool the print transmitting data when the judgment section judges that the print transmitting data does not match the first server position information.

According to another aspect of the present invention, a server which processes print transmitting data, comprises:

a print transmitting data receiver which receives the print transmitting data;

a first server position acquisition which acquires server position information to specify a place where the server is installed, this server position information being regarded as first server position information;

a judgment section which judges whether the print transmitting data matches the first server position information acquired by the first server position acquisition; and a transfer section which transfers print data obtained from the print transmitting data to a printer when the judgment section judges that the print transmitting data matches the first server position information and does not transfer the print data to the printer when the judgment section judges that the print transmitting data does not match the first server position information.

According to another aspect of the present invention, a print system includes at least one printer, at least one server connected to the printer, and at least one print client connected to the server via a network, wherein the print client comprises:

a public key holder which holds a public key for encryption of the printer acquired from the server;

a public key reader which reads the public key of the printer by which a print operation is to be executed from the public key holder;

a print transmitting data generator which encrypts print data with the public key read by the public key reader to generate print transmitting data; and a print transmitting data transmitter which transmits the print transmitting data generated by the print transmitting data generator to the server via the network, and the server comprises:

a print transmitting data receiver which receives the print transmitting data transmitted by the print client;

a first server position acquisition which acquires server position information to specify a place where the server is installed when the print transmitting data has been received, this server position information being regarded as first server position information; and a selective spooling section which generates a private key with a first passphrase containing at least the first server position information acquired by the first server position acquisition, spools the print data obtained by decrypting the print transmitting data when the print transmitting data has been decrypted with the private key, and does not spool the print data when the print transmitting data has not been decrypted with the private key.

According to another aspect of the present invention, a print system includes at least one printer, at least one server connected to the printer, and at least one print client connected to the server via a network, wherein the print client comprises:

a public key holder which holds a public key for encryption of the server acquired from the server;

a public key reader which reads the public key of the server from the public key holder;

a print transmitting data generator which encrypts print data with the public key read by the public key reader to generate print transmitting data; and a print transmitting data transmitter which transmits the print transmitting data generated by the print transmitting data generator to the server via the network, and the server comprises:

a print transmitting data receiver which receives the print transmitting data transmitted by the print client;

a first server position acquisition which acquires server position information to specify a place where the server is installed at a point in time when the print transmitting data has been received, this server position information being regarded as first server position information; and a selective spooling section which generates a private key with a first passphrase containing at least the first server position information acquired by the first server position acquisition, spools the print data obtained by decrypting the print transmitting data when the print transmitting data has been decrypted with the private key, and does not spool the print data when the print transmitting data has not been decrypted with the private key.

According to another aspect of the present invention, a printer which processes print transmitting data, comprises:

a print transmitting data receiver which receives the print transmitting data;

a first printer position acquisition which acquires printer position information to specify an installation place from an external device provided outside the printer, this printer position information being regarded as first printer position information;

a judgment section which judges whether the print transmitting data matches the first printer position information acquired by the first printer position acquisition; and a print executor which executes a print operation based on the print transmitting data when the judgment section judges that the print transmitting data matches the printer position information and restricts the print operation based on the print transmitting data when the judgment section judges that the print transmitting data does not match the printer position information.

According to another aspect of the present invention, a server which processes transmitting data, comprises:

a transmitting data receiver which receives the transmitting data;

a first server position acquisition which acquires server position information to specify a place where the server is installed, this server position information being regarded as first server position information;

a judgment section which judges whether the transmitting data matches the first server position information acquired by the first server position acquisition; and a selective spooling section which spools the transmitting data when the judgment section judges that the transmitting data matches the first server position information and does not spool the transmitting data when the judgment section judges that the print transmitting data does not match the first server position information.

According to another aspect of the present invention, a server which processes transmitting data, comprises:

a transmitting data receiver which receives the transmitting data;

a first server position acquisition which acquires server position information to specify a place where the server is installed, this server position information being regarded as first server position information;

a judgment section which judges whether the transmitting data matches the first server position information acquired by the first server position acquisition; and a transfer section which transfers data obtained from the transmitting data to a data receiving device when the judgment section judges that the transmitting data matches the first server position information and does not transfer the data to the data receiving device when the judgment section judges that the transmitting data does not match the first server position information.

According to another aspect of the present invention, a data transmitting and receiving system includes at least one data receiving device, at least one server connected to the data receiving device, and at least one data transmitting device connected to the server via a network, wherein the data transmitting device comprises:

a public key holder which holds a public key for encryption of the data receiving device acquired from the server;

a public key reader which reads the public key of the data receiving device to which a process request is to be given from the public key holder;

a transmitting data generator which encrypts process data with the public key read by the public key reader to generate transmitting data; and a transmitting data transmitter which transmits the transmitting data generated by the transmitting data generator to the server via the network, and the server comprises:

a transmitting data receiver which receives the transmitting data transmitted by the data transmitting device;

a first server position acquisition which acquires server position information to specify a place where the server is installed at a point in time when the transmitting data has been received, this server position information being regarded as first server position information; and a selective spooling section which generates a private key with a first passphrase containing at least the first server position information acquired by the first server position acquisition, spools the process data obtained by decrypting the transmitting data when the transmitting data has been decrypted with the private key, and does not spool the process data when the transmitting data has not been decrypted with the private key.

According to another aspect of the present invention, a data transmitting and receiving system includes at least one data receiving device, at least one server connected to the data receiving device, and at least one data transmitting device connected to the server via a network, wherein the data transmitting device comprises:

a public key holder which holds a public key for encryption of the server acquired from the server;

a public key reader which reads the public key of the server from the public key holder;

a transmitting data generator which encrypts process data with the public key read by the public key reader to generate transmitting data; and a transmitting data transmitter which transmits the transmitting data generated by the transmitting data generator to the server via the network, and the server comprises:

a transmitting data receiver which receives the transmitting data transmitted by the data transmitting device;

a first server position acquisition which acquires server position information to specify a place where the server is installed when the transmitting data has been received, this server position information being regarded as first server position information; and a selective spooling section which generates a private key with a first passphrase containing at least the first server position information acquired by the first server position acquisition, spools the process data obtained by decrypting the transmitting data when the transmitting data has been decrypted with the private key, and does not spool the process data when the transmitting data has not been decrypted with the private key.

BRIEF DESCRIPTION OF THE DRAWINGS

FIG. 6 is a diagram showing an example of the structure of a printer position information table included in the print client according to the first embodiment to the third embodiment;

FIG. 15 is a diagram showing an example of the structure of a public key table included in the print client according to the fourth embodiment and the fifth embodiment;

FIG. 25 is a diagram showing an example of the structure of a public key table included in the print client according to the seventh embodiment;

FIG. 31 is a diagram showing an example of the structure of a public key table included in the print client according to the eighth embodiment;

DETAILED DESCRIPTION OF THE EMBODIMENTS

First Embodiment

A print system according to the first embodiment of the present invention is designed so that a print client previously acquires printer position information indicating a position where a printer is installed, when transmitting print data to this printer, the print client transmits the printer position information together therewith, and that the printer which has received it prints the received print data only when the printer position information transmitted with the print data and actual printer position information at this point in time coincide. Further details will be given below.

Figure 1:
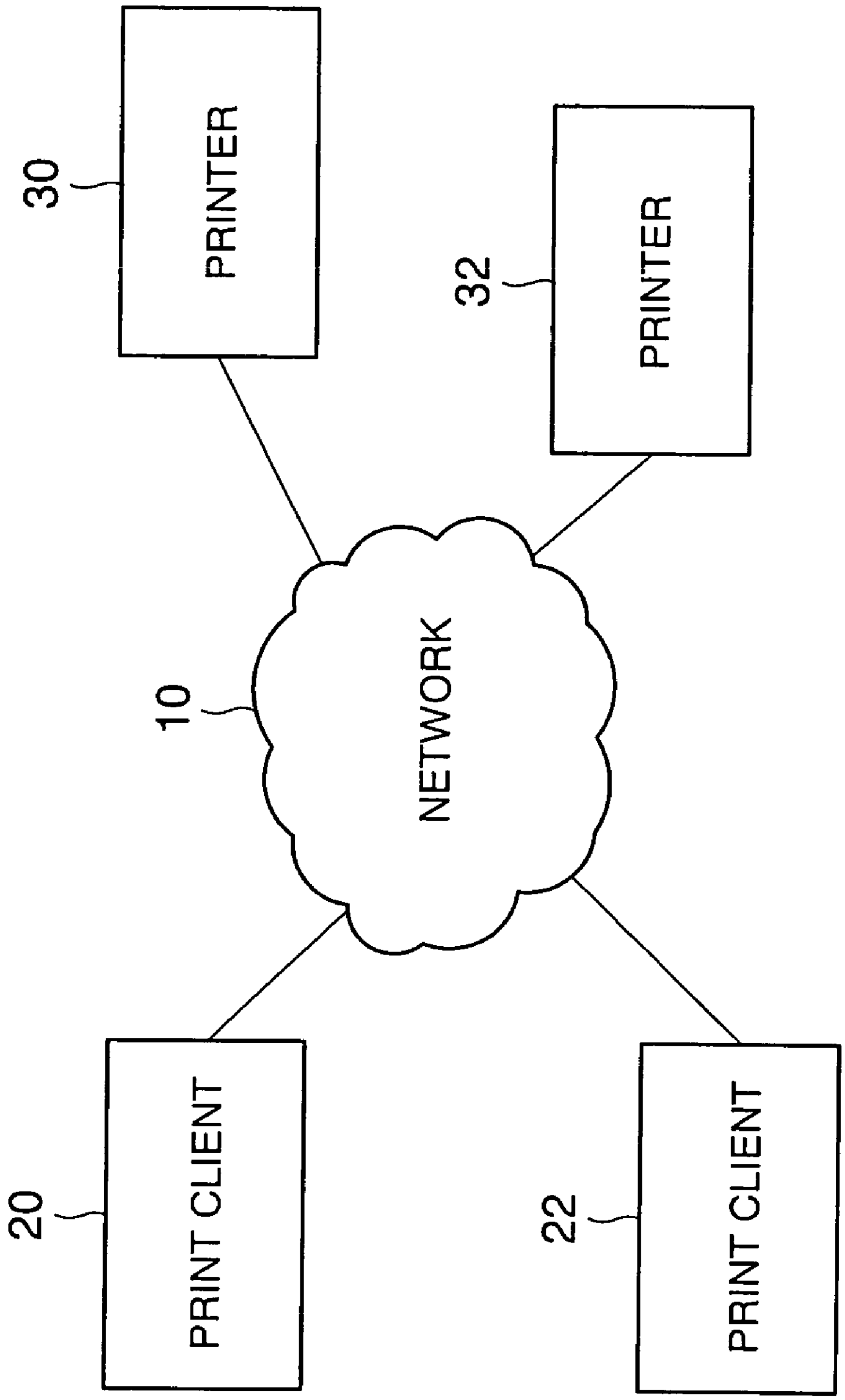
FIG. 1 is a diagram showing an example of a configuration of a print system according to each of embodiments of the present invention.

First, a configuration of the print system according to this embodiment will be explained based on FIG. 1. FIG. 1 is a block diagram showing a hardware configuration of the print system according to this embodiment.

As shown in FIG. 1, the print system according to this embodiment includes print clients 20, 22 connected to a network 10 and printers 30, 32 also connected to the network 10. In this embodiment, the network 10 is constituted by the Internet using TCP/IP (transmission control protocol/internet protocol). However, the form of the network 10 is not limited to the Internet, and, for example, it may be constituted by a LAN such as Ethernet (registered trademark) or by mixing the Internet and the LAN.

The print clients 20, 22 are each composed of any of various kinds of computers, for example, called a host computer and a personal computer. In this embodiment, in particular, the print clients 20, 22 generate print transmitting data containing print data and transmit this print transmitting data to the printer 30 and/or the printer 32 via the network 10. The number of print clients connected to the network 10 is optional, and it may be one or more than one. Moreover, the print client is not limited to a computer, and, for example, it may be a digital camera with a necessity to print a taken image, a content server in which print image data is stored as contents, or the like.

Further, in this embodiment, the printers 30, 32 are so-called network printers. In this embodiment, particularly, when receiving print transmitting data from the print client 20 and/or the print client 22, the printers 30, 32 each prints print data contained in the print transmitting data only when printer position information contained in the print transmitting data and actual printer position information coincide.

In this embodiment, the printers 30, 32 are directly connected to the network 10, and each of the printers 30, 32 has its own peculiar network address. Accordingly, the print clients 20, 22 can transmit print transmitting data to the printer 30 or the printer 32 by designating its network address.

Incidentally, the printers 30, 32 are directly connected to the network 10 in FIG. 1, but the printers 30, 32 may be connected thereto via a print server. Moreover, the number of printers connected to the network 10 is optional, and it may be one or more than one.

Figure 2:
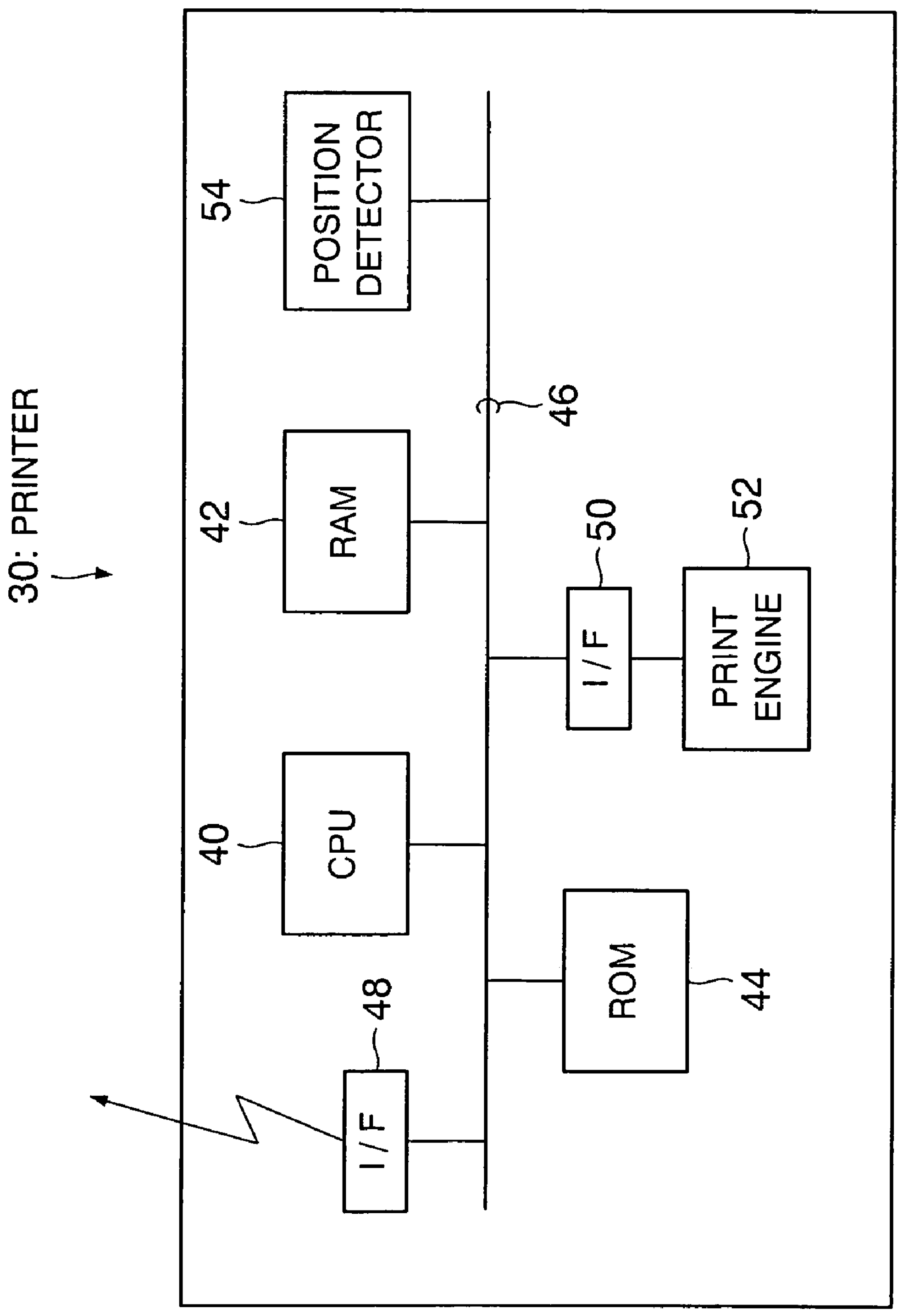
FIG. 2 is a diagram showing an example of a hardware configuration of a printer according to a first embodiment, a third embodiment, and a fourth embodiment of the present invention.

FIG. 2 is a block diagram explaining an internal configuration of the printer 30. It should be mentioned that an internal configuration of the printer 32 is the same as that of the printer 30.

As shown in FIG. 2, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude, respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30.

Moreover, the position of the printer 30 may be specified by using mobile communication technology including the PHS (Personal Handyphone System) (See a sixth embodiment). Further, it is also possible that the position detector 54 uses both the GPS and the PHS, and when it cannot receive ratio waves of the GPS inside a room, it specifies the position based on radio waves of the PHS.

Figure 3:
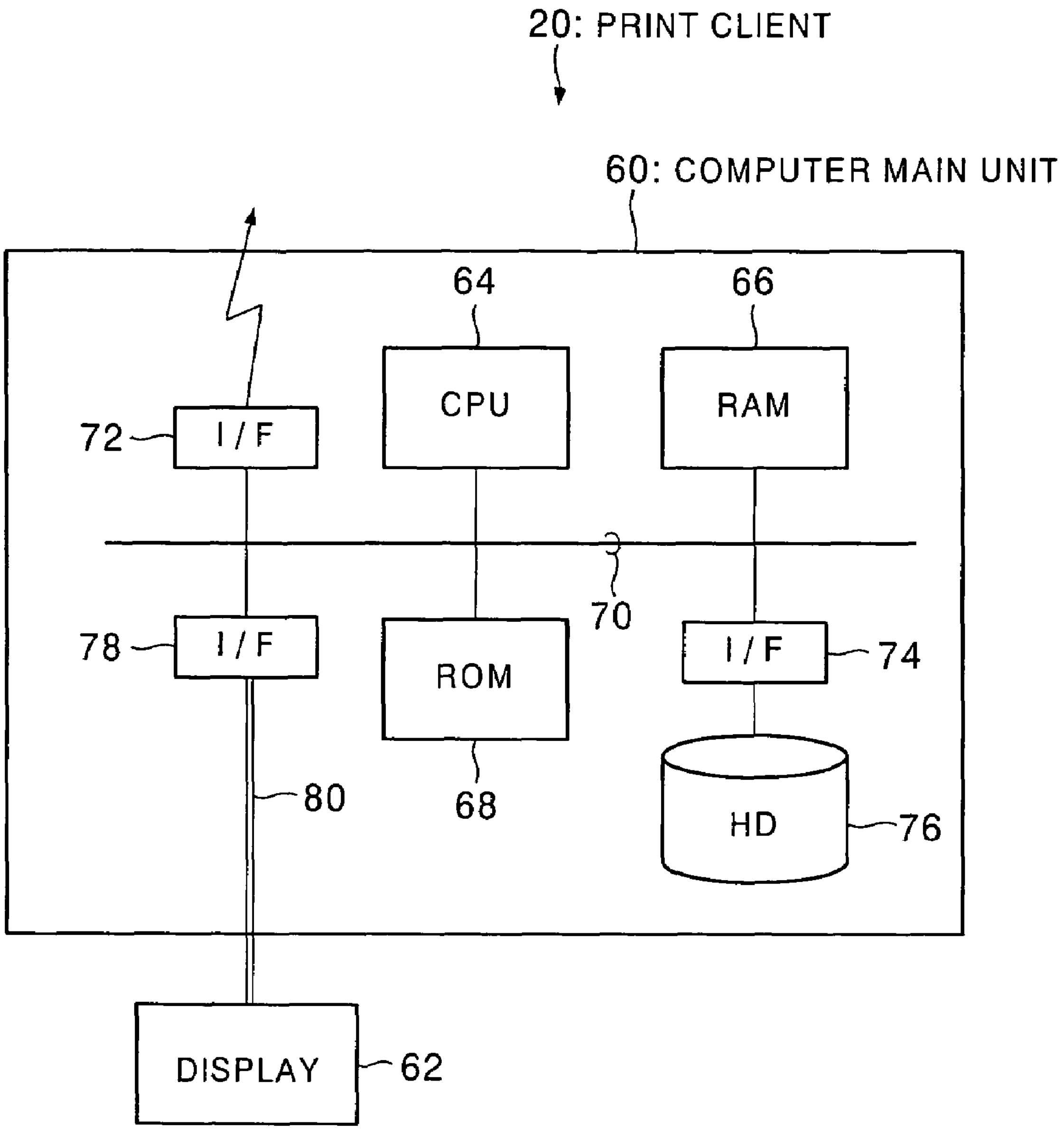
FIG. 3 is diagram showing an example of a configuration of a print client according to each of the embodiments of the present invention.

FIG. 3 is a block diagram for explaining an internal configuration of the print client 20. It should be mentioned that an internal configuration of the print client 22 is the same as that of the print client 20 in this embodiment.

As shown in FIG. 3, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 70, and the print client 20 is connected to the aforementioned network 10 via the communication interface 72.

In addition, an interface 74 is connected to the internal bus 70, and a hard disk 76 which is a large capacity storage is connected to the interface 74. Moreover, an interface 78 is connected to the internal bus 70, and the aforementioned display 62 is connected via a cable 80 which extends from the interface 78.

Next, a brief explanation of a process, for example, when the print client 20 performs printing with the printer 30 in the print system according to this embodiment will be given.

In this case, the print client 20 previously acquires, for example, printer position information on the printer 30 from the printer 30. In this embodiment, the printer position information is acquired via the network 10. Namely, the printer 30 confirms whether the print client which requests the printer position information has rightful authority, and only when the print client has rightful authority, the printer 30 notifies the print client of the printer position information. However, the printer 30 need not necessarily notify the print client 20 of printer position information on the printer 30 via the network 10. For example, if a user of the print client 20 has rightful authority, he or she can go to the installation location of the printer 30 and operate the printer 30, whereby it is also possible that the user operates a control panel of the printer 30 and acquires the printer position information on the printer 30. In this case, the user records the printer position information on the printer 30 on a memo pad or the like and inputs it to the print client 20 manually. Moreover, it is also possible that the user records the printer position information on the printer 30 on a record medium such as a flexible disk and makes the print client 20 read this printer position information.

Figure 4:
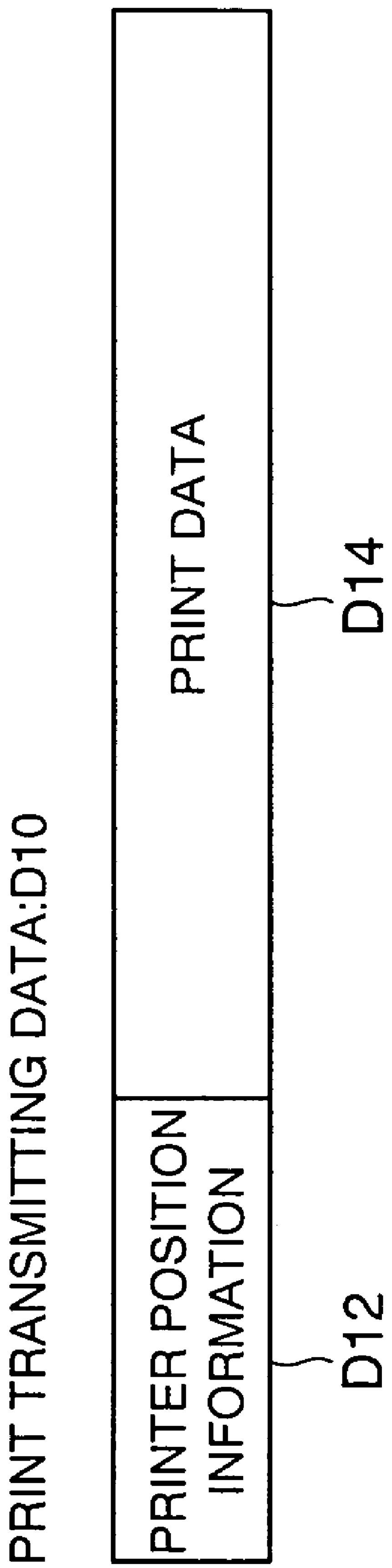
FIG. 4 is a diagram showing an example of a format of print transmitting data transmitted from the print client to the printer in the first embodiment to the third embodiment.

Then, the user of the print client 20 generates data to be printed and designates the printer 30 for the print client 20 to instruct a print operation. FIG. 4 is a diagram explaining a data format of print transmitting data D10 generated by the print client 20 on this occasion.

As shown in FIG. 4, the print client 20 adds previously acquired printer position information D12 to print data D14 to generate the print transmitting data D10. Here, the print data D14 means original print data needed for a print operation executed by driving the print engine 52 in the printer 30. Incidentally, the print transmitting data D10 may contain data other than the printer position information D12 and the print data D14 which are shown in FIG. 4.

The print client 20 encrypts all the print transmitting data D10 in this embodiment, but the print client 20 need not necessarily encrypt the print transmitting data D10. The print client 20 then transmits the print transmitting data D10 to the printer 30 via the network 10.

The printer 30 which has received the print transmitting data D10 temporarily stores the received print transmitting data D10 in the RAM 42 as shown in FIG. 2. The printer 30 then decrypts the encrypted print transmitting data D10 and acquires the printer position information D12 contained in the print transmitting data D10. Moreover, the printer 30 acquires printer position information on the printer 30 at this point in time from the position detector 54. Subsequently, the printer 30 judges whether the printer position information D12 contained in the print transmitting data D10 and the printer position information at this point in time coincide, when the two pieces of printer position information coincide, the print data D14 contained in the print transmitting data D10 is transmitted to the print engine 52 and printed, and when these two pieces of printer position information do not coincide, the print data D14 is not printed.

Next, processes in the print clients 20, 22 and the printers 30, 32 when the print clients 20, 22 acquire printer position information will be explained in detail.

Figure 5:
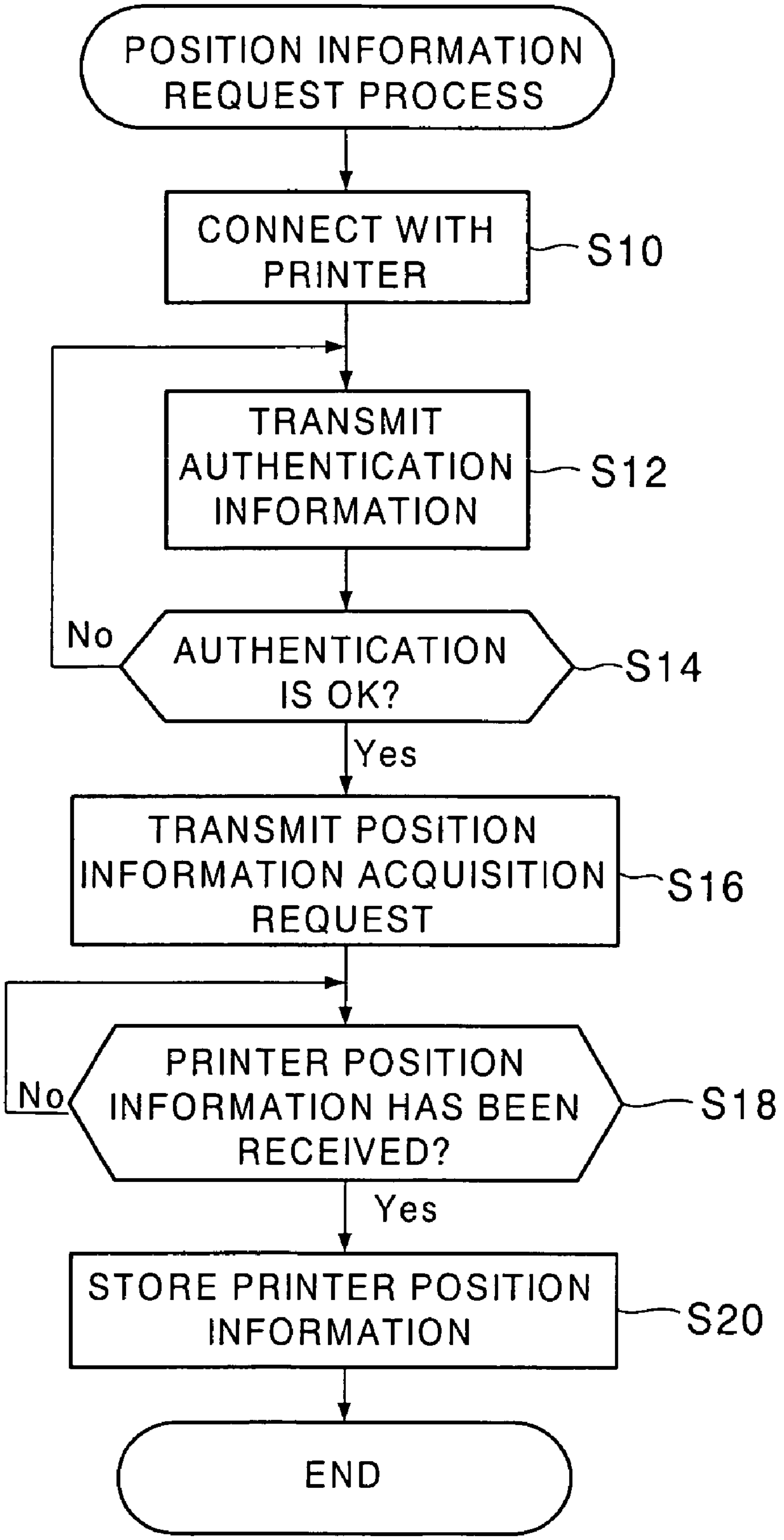
FIG. 5 is a flowchart explaining a position information request process executed by the print client according to the first embodiment to the third embodiment.

FIG. 5 is a flowchart explaining a position information request process executed in the print clients 20, 22. This position information request process is realized by making the CPU 64 read and execute a position information request program stored in the ROM 68 or the hard disk 76 of the print client. Assuming here a case where the print client 20 makes a request for printer position information to the printer 30, the following explanation is given.

As shown in FIG. 5, in the position information request process, the print client 20 first connects with the printer 30 (step S10). More specifically, the print client 20 establishes a connection between the print client 20 and the printer 30 by designating the network address of the printer 30.

Thereafter, the print client 20 transmits authentication information to the printer 30 (step S12). Here, the authentication information means information which allows the printer 30 to judge whether the print client 20 or a user who operates the print client 20 has authority to use the printer 30. In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication has been accepted from the printer 30, and judges whether the authentication has been accepted by the printer 30 based on the authentication result (step S14). When the authentication has not been accepted (step S14: No), the print client 20 repeats the aforementioned process from step S12.

On the other hand, when the authentication has been accepted (step S14: Yes), the print client 20 transmits a position information acquisition request to the printer 30 (step S16). Then, the print client 20 judges whether the printer position information has been received from the printer 30 (step S18). When the printer position information has not been received from the printer 30 (step S18: No), the print client 20 stands by while repeating step S18.

On the other hand, when the printer position information has been received from the printer 30 (step S18: Yes), the printer position information is stored (step S20). In this embodiment, the print client 20 is provided with a printer position information table TB10 on the hard disk 76, and the acquired printer position information is stored and held in this printer position information table TB10.

FIG. 6 is a diagram showing an example of the structure of the printer position information table TB10. As shown in FIG. 6, the printer position information table TB10 includes an item D10 which stores information to specify printers and an item D11 which stores acquired printer position information in a one-to-one correspondence with the printers.

In this embodiment, as an example of the information to specify printers, network addresses of the printers are stored in the item D10. The item D11 includes an item D12 which stores latitude out of the printer position information, an item D13 which stores longitude, and an item D14 which stores altitude. The printer position information table TB10 can hold printer position information on plural printers on a printer-by-printer basis. Moreover, by storing the printer position information in the printer position information table TB10 on the hard disk 76 in this manner, even when the print client 20 is powered off and then powered on again, the printer position information acquired before the power-on can be read from the hard disk 76 and used as it is.

By storing the acquired printer position information in the printer position information table TB10, the position information request process shown in FIG. 5 is completed.

Figure 7:
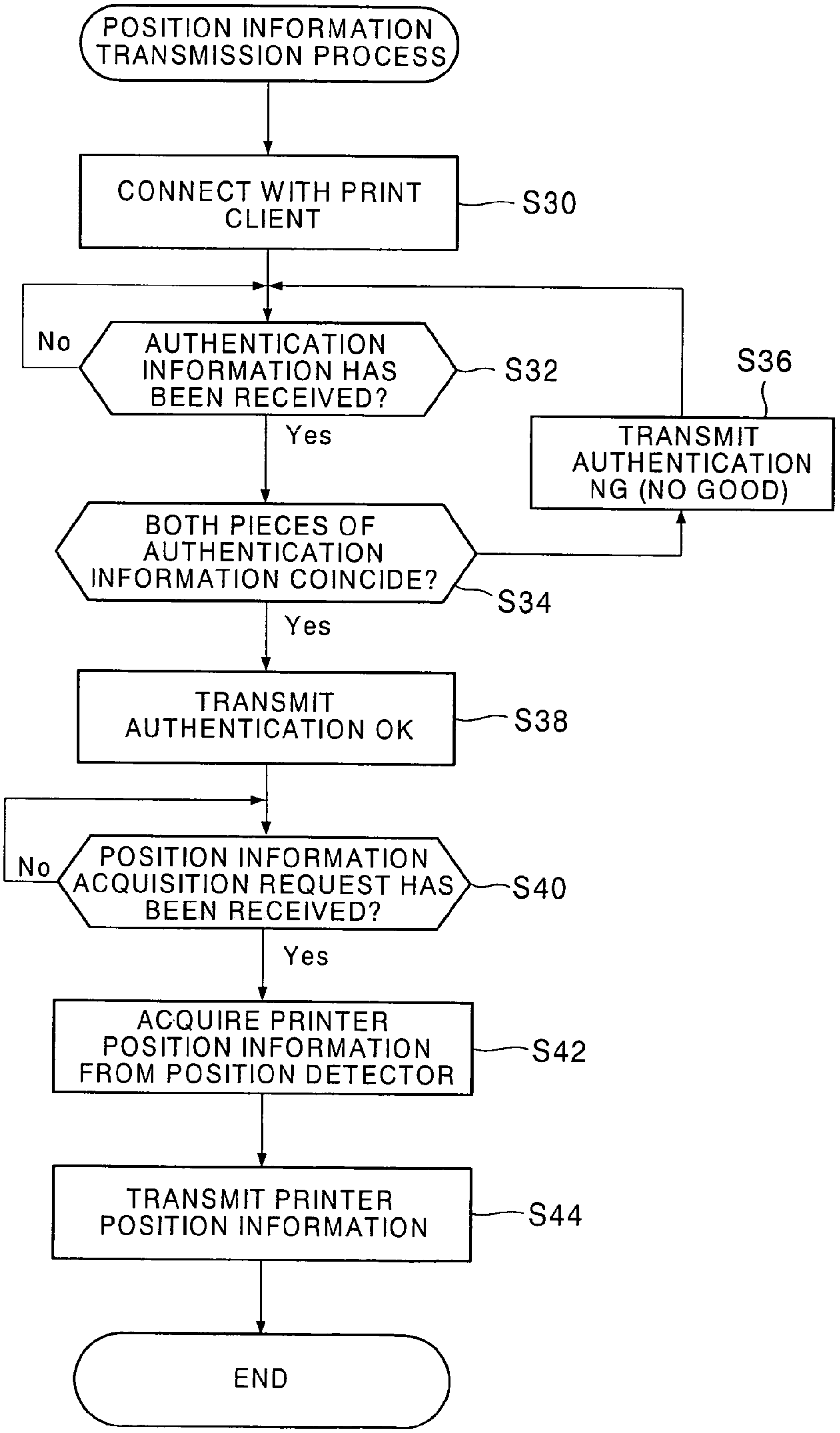
FIG. 7 is a flowchart explaining a position information transmission process executed by the printer according to the first embodiment to the third embodiment.

Next, a position information transmission process executed in the printers 30, 32 corresponding to the position information request process in the print clients 20, 22 will be explained based on FIG. 7. FIG. 7 is a flowchart explaining the position information transmission process executed in the printers 30, 32. The position information transmission process is realized by making the CPU 40 read and execute a position information transmission program stored in the ROM 44 in the printer. Also here, similarly to the above, assuming the case where the print client 20 makes the request for the printer position information to the printer 30, the following explanation is given.

As shown in FIG. 7, first, the printer 30 establishes a connection with the print client 20 (step S30). This corresponds to the aforementioned step S10 on the print client 20 side. Subsequently, the printer 30 judges whether the authentication information has been received from the print client 20 (step S32). When the authentication information has not been received (step S32: No), the printer 30 stands by while repeating the process in step S32.

On the other hand, when the authentication information has been received from the print client 20 (step S32: Yes), the printer 30 judges whether this authentication information coincides with authentication information which is previously registered with the printer 30 (step S34). More specifically, since the client ID and the password are transmitted as the authentication information from the print client 20 as described above, the printer 30 judges whether these client ID and password coincide with a client ID and a password which are previously registered with the printer 30.

When these two pieces of authentication information do not coincide (step S34: No), the printer 30 transmits the authentication result indicating that the authentication has not been accepted to the print client 20 (step S36) and returns to the process in step S32. On the other hand, when these two pieces of authentication information coincide (step S34: Yes), the printer 30 transmits the authentication result indicating that the authentication has been accepted to the print client 20 (step S38).

Incidentally, the aforementioned authentication process from step S32 to step S38 can be omitted. In this case, step S12 and step S14 in the position information request process in FIG. 5 can be also omitted.

Thereafter, the printer 30 judges whether the printer position acquisition request has been received from the print client 20 (step S40). When the position information acquisition request has not been received (step S40: No), the printer 30 stands by while repeating the process in step S40.

On the other hand, when the position information acquisition request has been received from the print client 20 (step S40: Yes), the printer 30 acquires printer position information on the printer 30 at this point in time from the position detector 54 (step S42). The reason why the printer position information is acquired from the position detector 54 each time as described just above is in order that, when the printer 30 has been moved to a different place, the print client 20 can be notified of position information after the movement.

Then, the printer 30 transmits the printer position information to the print client 20 (step S44). Thus, the position information transmission process according to this embodiment is completed.

Next, processes in the print clients 20, 22 and the printers 30, 32 when the print clients 20, 22 want to perform printing and transmit a print request to the printers 30, 32 will be explained in detail.

Figure 8:
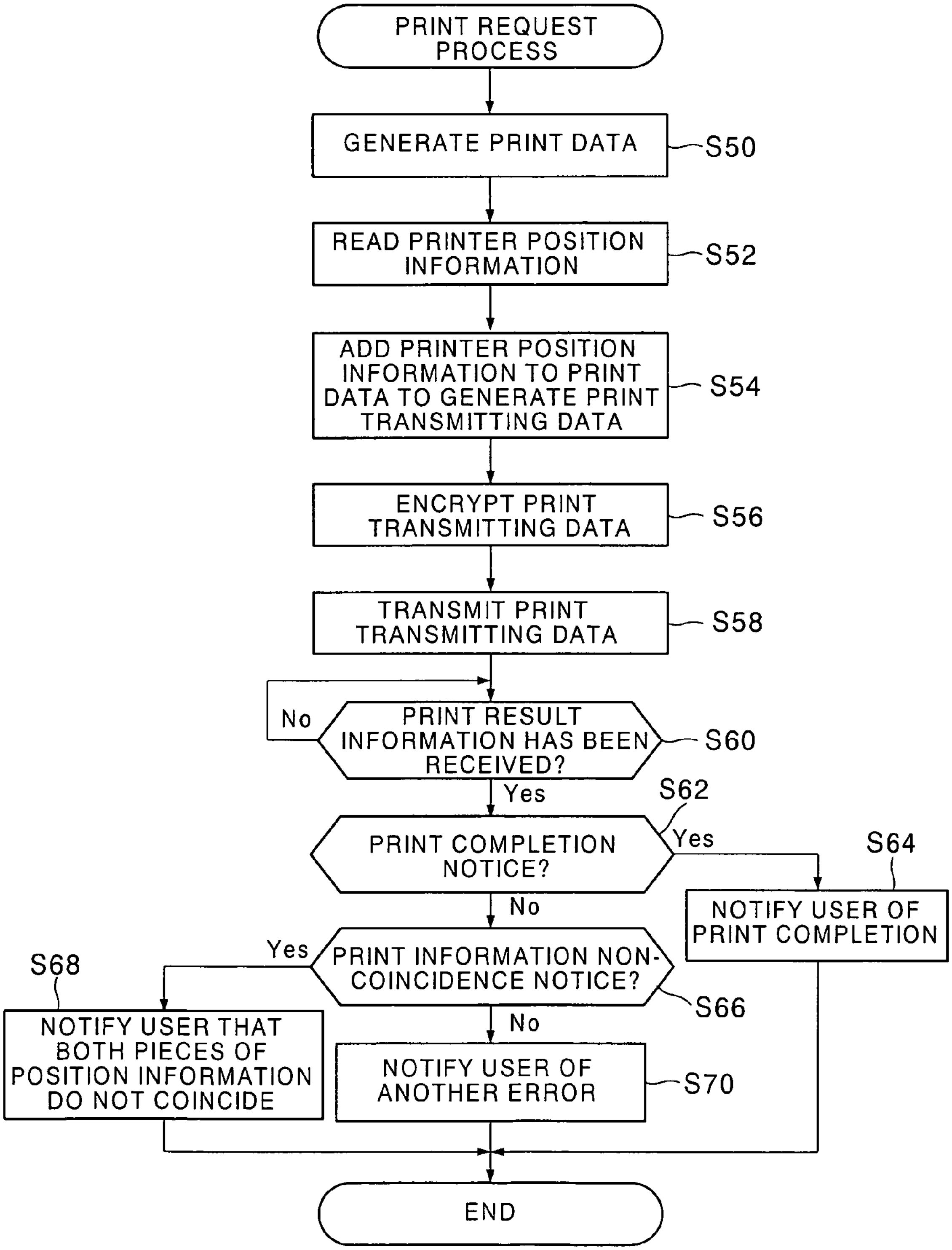
FIG. 8 is a flowchart explaining a print request process executed by the print client according to the first embodiment to the third embodiment.

FIG. 8 is a flowchart explaining a print request process executed in the print clients 20, 22. This print request process is realized by making the CPU 64 read and execute a print request program stored in the ROM 68 or the hard disk 76 of the print client. Here, assuming a case where the print client 20 makes a print request to the printer 30, the following explanation is given.

As shown in FIG. 8, the print client 20 generates the print data D14 based on a print request from the user (step S50). The print data D14 is data necessary for an actual print operation when the printer 30 is an ordinary printer.

Then, the print client 20 reads the printer position information on the printer 30 which is previously registered with the printer position information table TB10 on the hard disk 76 and to which the print client 20 wants to produce an output (step S52). Subsequently, the print client 20 adds the read printer position information D12 to the print data D14 to generate the print transmitting data D10 (step S54).

Thereafter, the print client 20 encrypts this print transmitting data D10 (step S56). Then, the print clients 20 transmits the encrypted print transmitting data D10 to the printer 30 (step S58). More specifically, the print client 20 designates the network address of the printer 30 and sends out the print transmitting data D10 to the network 10.

Subsequently, the print client 20 judges whether print result information has been received from the printer 30 (step S60). When the print result information has not been received (step S60: No), the print client 20 stands by while repeating the process in step S60. On the other hand, when the print result information has been received (step S60: Yes), the print client 20 judges whether the print result information is a print completion notice (step S62).

When this print result information is the print completion notice (step S62: Yes), it means that the printer 30 has properly completed the print operation, and hence the print client 20 notifies the user that the printer 30 has completed the print operation (step S64). On the other hand, when the received print result information is not the print completion notice (step S62: No), whether the print result information is a position information non-coincidence notice is judged (step S66).

When the print result information is the position information non-coincidence notice (step S66: Yes), the print client 20 notifies the user that since the printer position information D12 of the print transmitting data D10 and current printer position information in the printer 30 do not coincide, the print operation has not been executed (step S68). This makes it possible to find that the printer 30 has been moved and doubt that the printer 30 has been stolen, or the like. On the other hand, when the print result information is not the printer position non-coincidence notice (step S66: No), it is thought that some other error occurs, and hence the print client 20 gives notice according to the type of the error to the user (step S70).

The print request process in the print client 20 is completed by the notice in step S64, step S68, or step S70.

Figure 9:
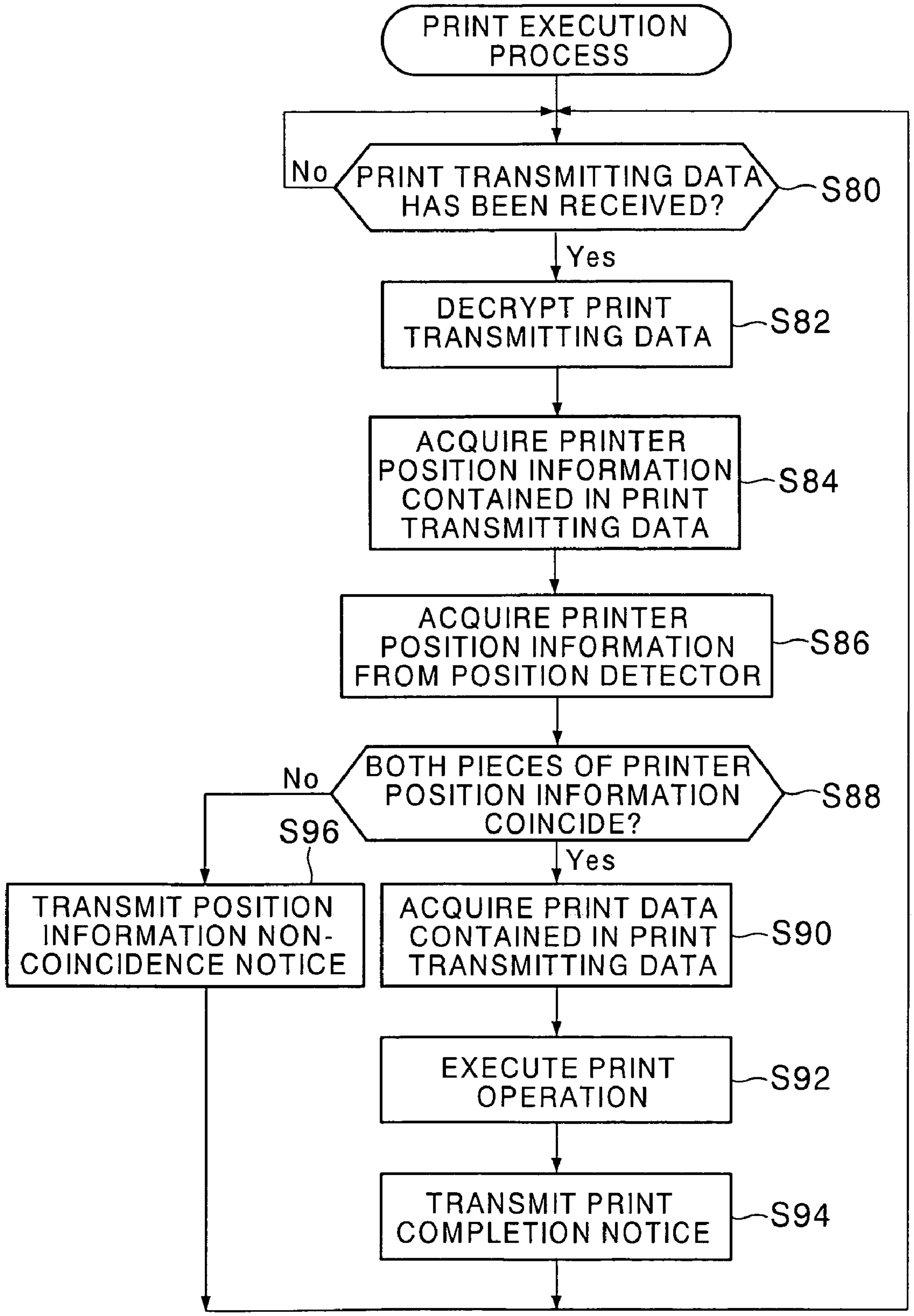
FIG. 9 is a flowchart explaining a print execution process executed by the printer according to the first embodiment.

Next, a print execution process executed in the printers 30, 32 corresponding to the print request process in the print clients 20, 22 will be explained based on FIG. 9. FIG. 9 is a flowchart explaining the print execution process executed in the printers 30, 32. This print execution process is realized by making the CPU 40 read and execute a print execution program stored in the ROM 44 in each of the printers 30 and 32. Also here, similarly to the above, assuming the case where the print client 20 makes the print request to the printer 30, the following explanation is given.

As shown in FIG. 9, the printer 30 judges whether the print transmitting data D10 has been received from the network 10 (step S80). When no print transmitting data D10 has been received (step S80: No), the printer 30 stands by while repeating the process in step S80.

On the other hand, when the print transmitting data D10 has been received (step S80: Yes), the printer 30 decrypts the print transmitting data D10 (step S82). Subsequently, the printer 30 acquires the printer position information D12 contained in the decrypted print transmitting data D10 (step S84).

Then, the printer 30 acquires printer position information on the printer 30 at this point in time from the position detector 54 (step S86). The reason why the printer position information is acquired from the position detector 54 each time as described just above is that, when the printer 30 has been moved to a different place, there is a possibility that the printer 30 is installed in a place where the user does not intend to perform printing, and in order that in such a case, the print operation is not executed by the printer 30.

Then, the printer 30 judges whether printer position information D12 contained in the print transmitting data D10 and the printer position information on the printer 30 at this point in time acquired in step S86 coincide (step S88). More specifically, the printer 30 judges whether the latitude, longitude, and altitude of the printer position information D12 and the latitude, longitude, and altitude of the printer position information acquired in step S86 coincide respectively. When these two pieces of printer position information coincide (S88: Yes), the printer 30 acquires the print data D14 contained in the print transmitting data D10 (step S90). Namely, in this embodiment, when the printer position information D12 contained in the print transmitting data D10 and the printer position information acquired in step S86 coincide, it is judged that the print transmitting data D10 matches the printer position information at this point in time.

Then, the printer 30 executes the print operation by driving the print engine 52 based on the print data D14 (step S92). More specifically, the printer 30 performs a language interpretation of the print data D14 and generates print request data fitting the print engine 52. Then, by transmitting this print request data to the print engine 52, print sheets and so on are printed by the print engine 52.

At a point in time when the print operation has been properly completed, the printer 30 transmits the print completion, notice that the print operation has been properly completed as the print result information to the print client 20 (step S94). Then, the printer 30 returns to the aforementioned process in step S80.

Contrary to this, when it is judged in step S88 that the printer position information D12 contained in the print transmitting data D10 and the printer position information acquired in step S86 do not coincide (step S88: No), the printer 30 transmits the position information non-coincidence notice as the print result information to the print client 20 (step S96). Namely, in this embodiment, when the printer position information D12 contained in the print transmitting data D10 and the printer position information acquired in step S86 do not coincide, it is judged that that the print transmitting data D10 does not match the printer position information at that point in time. Then, the printer 30 returns to the aforementioned process in step S80.

As described above, according to the print system of this embodiment, the print clients 20, 22 can limit a printer able to print the transmitted print transmitting data D10 based on printer position information, so that the execution of a print operation by a printer installed in a position where the users of the print clients 20, 22 do not intend to perform printing can be avoided. For example, even if the print transmitting data D10 is transmitted by mistake to the printer 30 from the print client 20 when the printer 30 has been moved to a different place but the network address of the printer 30 in the network 10 remains unchanged, the printer position information D12 contained in the print transmitting data D10 and the printer position information at this point in time do not coincide in the printer 30, whereby the print data D14 is not printed. Consequently, the security of the print data can be enhanced.

On the other hand, also on the printers 30, 32 side, the transmission of print data to the printers 30, 32 by somebody who is not duly authorized to perform printing with the printers 30, 32 and the execution of a large print operation by the printers 30, 32 can be avoided.

Incidentally, the following usage patterns of the print system according to this embodiment are possible. For example, it is assumed that a company has a room with restriction of persons permitted to enter the room, and that the printer 30 is installed in this room. It is also assumed that persons having authority to be able to perform printing with the printer 30 are restricted. In this case, the print transmitting data D10 transmitted to the printer 30 by a person who has authority to be able to perform printing with the printer 30 is printed only when the printer 30 is situated in this room. When the printer 30 has been moved to a different room for some reason, printing based on the print transmitting data D10 cannot be performed by the printer 30.

It is further assumed, for example, that the printer 30 is installed in a lockable room in a hotel, and persons which can enter this room are restricted. It is also assumed that some person hopes to send documents, which are drawn up by the print client 20, to one guest who stays at the hotel from a different place. In this case, by transmitting the print transmitting data D10 from the print client 20 to the printer 30, the person who tries to send the documents can print the documents with the printer 30 installed in the lockable room. In other words, the printer 30 can be used just like a facsimile whose installation place is specified. Moreover, in this case, the possibility that a printer installed in a different place performs printing based on print data by mistake can be avoided.

Further, a case is assumed where print transmitting data containing print data is saved in a file in the print clients 20, 22 and transmitted as an attachment of electronic mail or this print transmitting data is published on a Web server and printed by a person who has downloaded it. In this case, by generating the print transmitting data so that it contains plural pieces of printer position information when the print transmitting data is generated from the print data, printing can be performed by only printers located in plural previously registered positions.

Second Embodiment

The second embodiment of the present invention is designed so that by modifying the aforementioned first embodiment, plural position detectors are provided in each of the printers 30, 32, and that when one position detector cannot detect the position of the printer for some reason, the position of the printer is detected by another position detector. Only portions different from the aforementioned first embodiment will be explained below.

Figure 10:
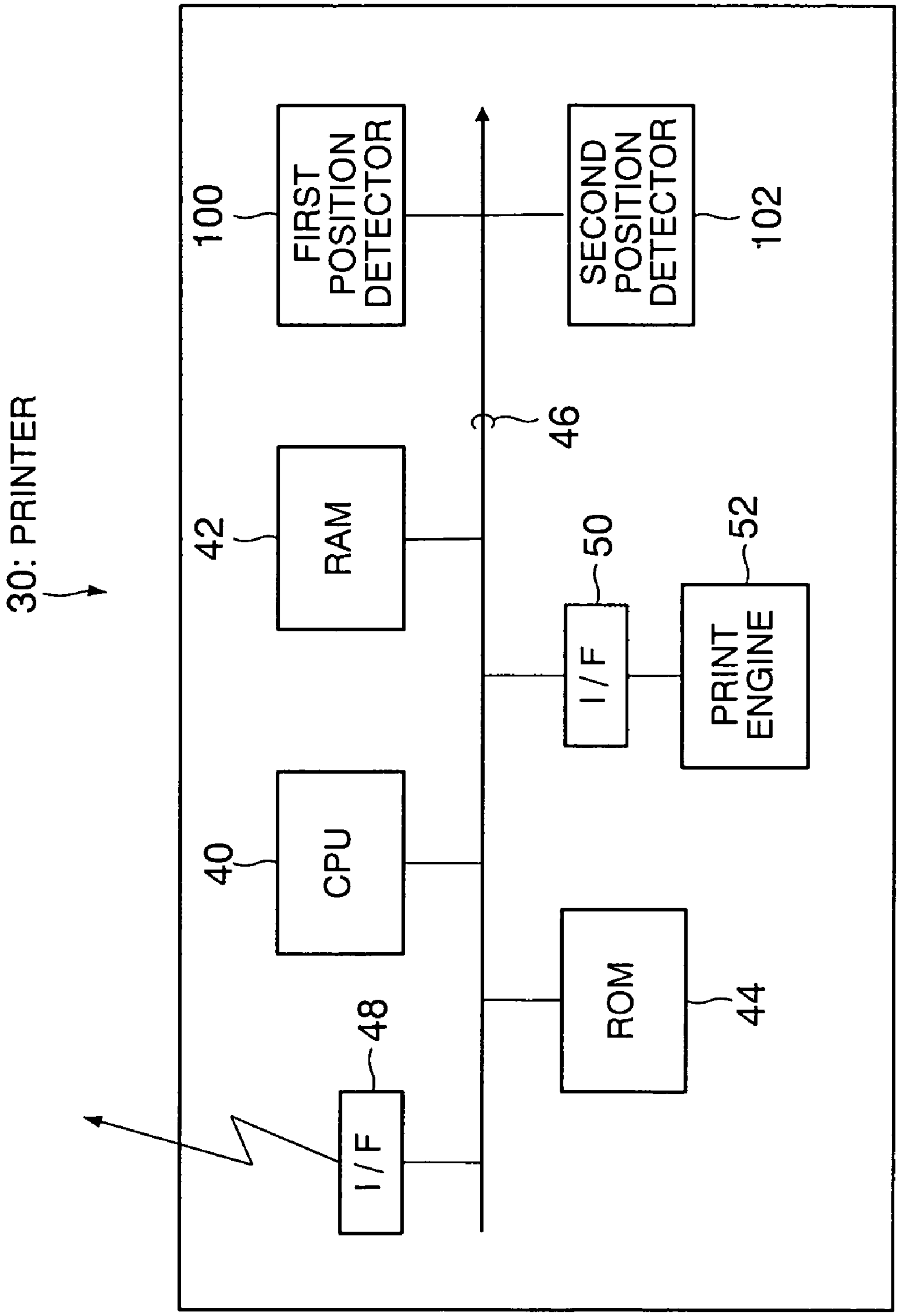
FIG. 10 is a diagram showing a hardware configuration of the printer of a second embodiment and a fifth embodiment according to the present invention.

FIG. 10 is a block diagram explaining the hardware configuration of the printer 30 according to this embodiment, and corresponds to FIG. 2 described above. It should be mentioned that the internal configuration of the printer 32 is the same as that of the printer 30.

As shown in FIG. 10, in the printer 30 according to this embodiment, a first position detector 100 and a second position detector 102 are connected to the internal bus 46. It is assumed here that the first position detector 100 and the second position detector 102 adopt different position detecting methods. For example, in this embodiment, the first position detector 100 detects the position of the printer 30 by the GPS as in the aforementioned first embodiment, and the second position detector 102 detects the position of the printer 30 by using mobile communication technology including the PHS. Moreover, it is assumed in this embodiment that both the first position detector 100 and the second position detector 102 acquire printer position information composed of latitude, longitude, and altitude.

The reason why the different position detecting methods are adopted as described just above is that such a case is assumed that even when the first position detector 100 cannot detect the position of the printer 30 since radio waves from the GPS do not reach the printer 30, the second position detector 102 can detect the position thereof since radio waves for mobile communication reach the printer 30.

Figure 11:
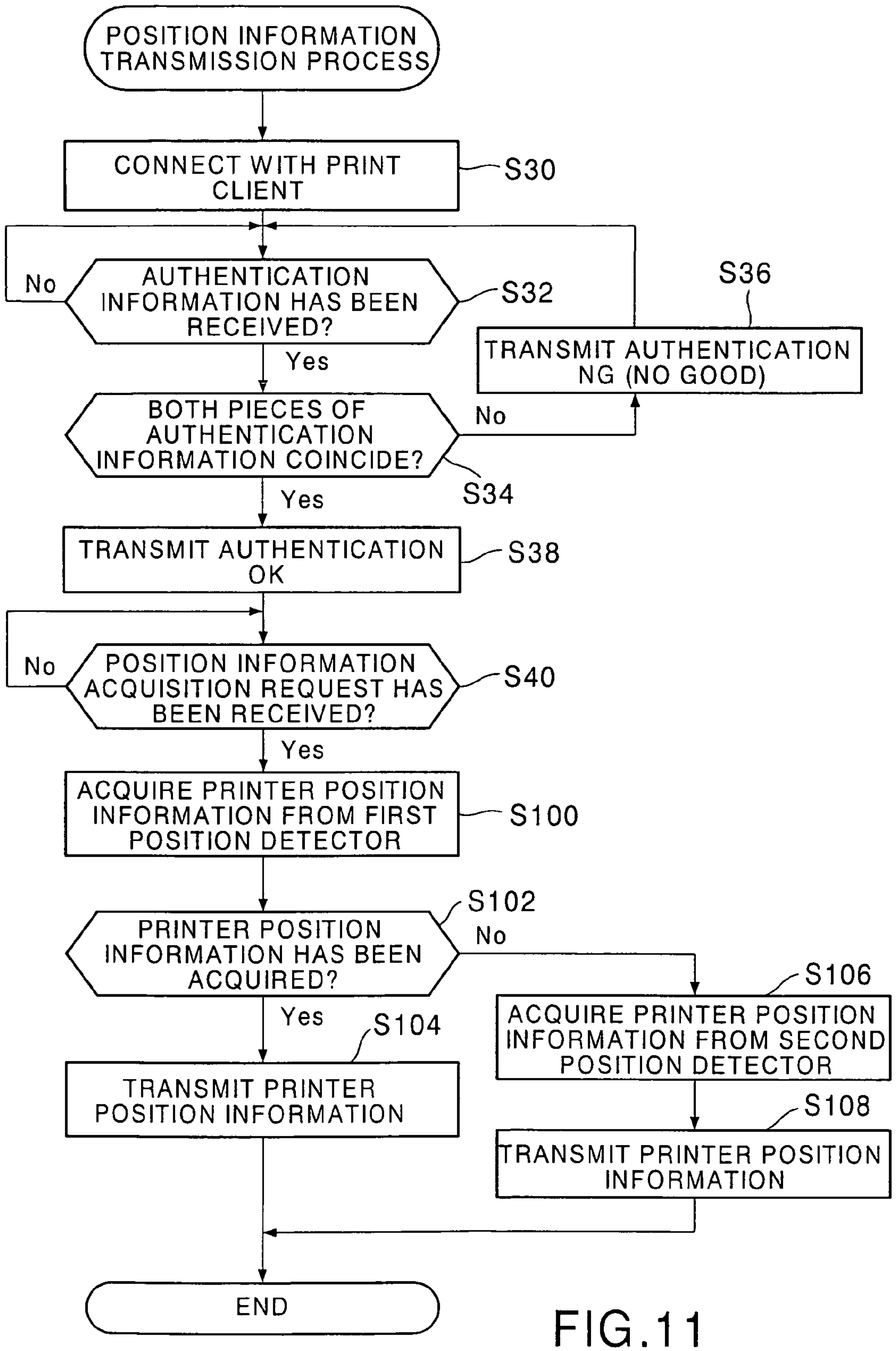
FIG. 11 is a flowchart explaining a position information transmission process executed by the printer according to the second embodiment and the third embodiment.

Next, a position information transmission process executed in the printers 30, 32 corresponding to the position information request process in the print clients 20, 22 will be explained based on FIG. 11. FIG. 11 is a flowchart explaining the position information transmission process executed in the printers 30, 32, and corresponds to the aforementioned flowchart in FIG. 7. Also here, similarly to the above, assuming the case where the printer position information is transmitted from the printer 30 to the print client 20, the following explanation is given.

In FIG. 11, the process from step S30 to step S40 is the same as that in the aforementioned first embodiment, but the process thereafter is different. Namely, when the printer 30 has received the position information acquisition request from the print client 20 in step S40 (step S40: Yes), the printer 30 acquires printer position information from the first position detector 100 (step S100).

Then, the printer 30 judges whether the printer position information has been acquired from the first position detector 100 (step S102). When the printer position information has been acquired from the first position detector 100 (step S102: Yes), the printer 30 transmits this printer position information to the print client 20 (step S104). Thus, this position information transmission process is completed.

Contrary to this, when the printer position information has not been acquired from the first position detector 100 (step S102: No), the printer 30 acquires printer position information from the second position detector 102 (step S106). Then, the printer 30 transmits the printer position information acquired from the second position detector 102 to the print client 20 (step S108). Thus, the position information transmission process is completed.

Figure 12:
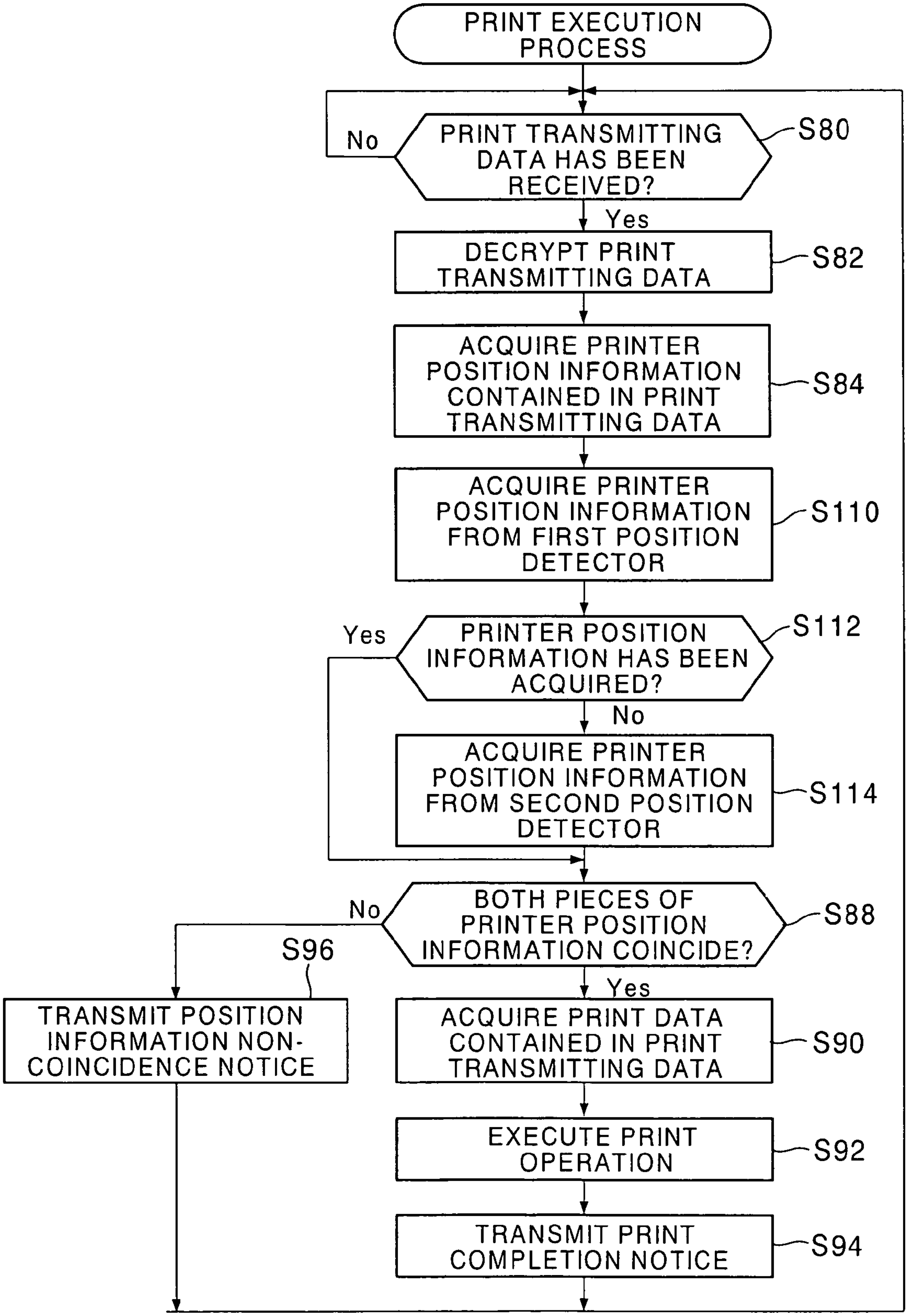
FIG. 12 is a flowchart explaining a print execution process executed by the printer according to the second embodiment.

Next, a print execution process executed in the printers 30, 32 corresponding to the print request process in the print clients 20, 22 will be explained based on FIG. 12. FIG. 12 is a flowchart explaining the print execution process executed in the printers 30, 32, and corresponds to the aforementioned flowchart in FIG. 9. Also here, similarly to the above, assuming the case where the printer 30 executes a print request from the print client 20, the following explanation is given.

As shown in FIG. 12, the print execution process according to this embodiment is the same from step S80 to step S84 as that in the aforementioned first embodiment. However, in this embodiment, in step S110 subsequent to step S84, the printer 30 acquires printer position information from the first position detector 100 (step S110).

Then, the printer 30 judges whether the printer position information has been acquired from the first position detector 100 (step S112). When the printer position information has been acquired from the first position detector 100 (step S112: Yes), the printer 30 performs the process in and after step S88 using this printer position information. The process in and after step S88 is the same as that in the aforementioned first embodiment.

On the other hand, when the printer position information has not been acquired from the first position detector 100 (step s112: No), the printer 30 acquires printer position information from the second position detector 102 (step S114). The printer 30 performs the process in and after step S88 using the printer position information acquired from the second position detector 102.

As described above, according to the print system of this embodiment, similarly to the aforementioned first embodiment, the security of print data can be enhanced by utilizing printer position information, and moreover the security of a printer itself can be enhanced.

Furthermore, in this embodiment, the plural position detectors 100 and 102 are provided in each of the printers 30, 32, whereby even if printer position information cannot be acquired from the first position detector 100, printer position information can be acquired from the second position detector 102. Consequently, the reliability of acquisition of printer position information on the printer side can be increased.

Third Embodiment

In the aforementioned first and second embodiments, in step S88 of the print execution process in the printers 30, 32, the print operation is executed only when the printer position information D12 contained in the print transmitting data D10 and the printer position information acquired at that time in point coincide. However, if the precision of the position detector is improved, the printer position information is changed even when the installation positions of the printers 30, 32 are moved by only one meter or two meters according to the users' convenience, and consequently the print transmitting data D10 from the print clients 20, 22 cannot be printed. In that case, this print system will be a very difficult-to-use print system for the users. Hence, in this embodiment, by providing a predetermined range of tolerance between two pieces of printer position information, the print data D14 contained in the print transmitting data D10 is printed even if the printer position information D12 contained in the print transmitting data D10 and the printer position information acquired at a point in time when printing is about to be performed are slightly different. Hereinafter, only portions different from the aforementioned first and second embodiments will be explained.

Figure 13:
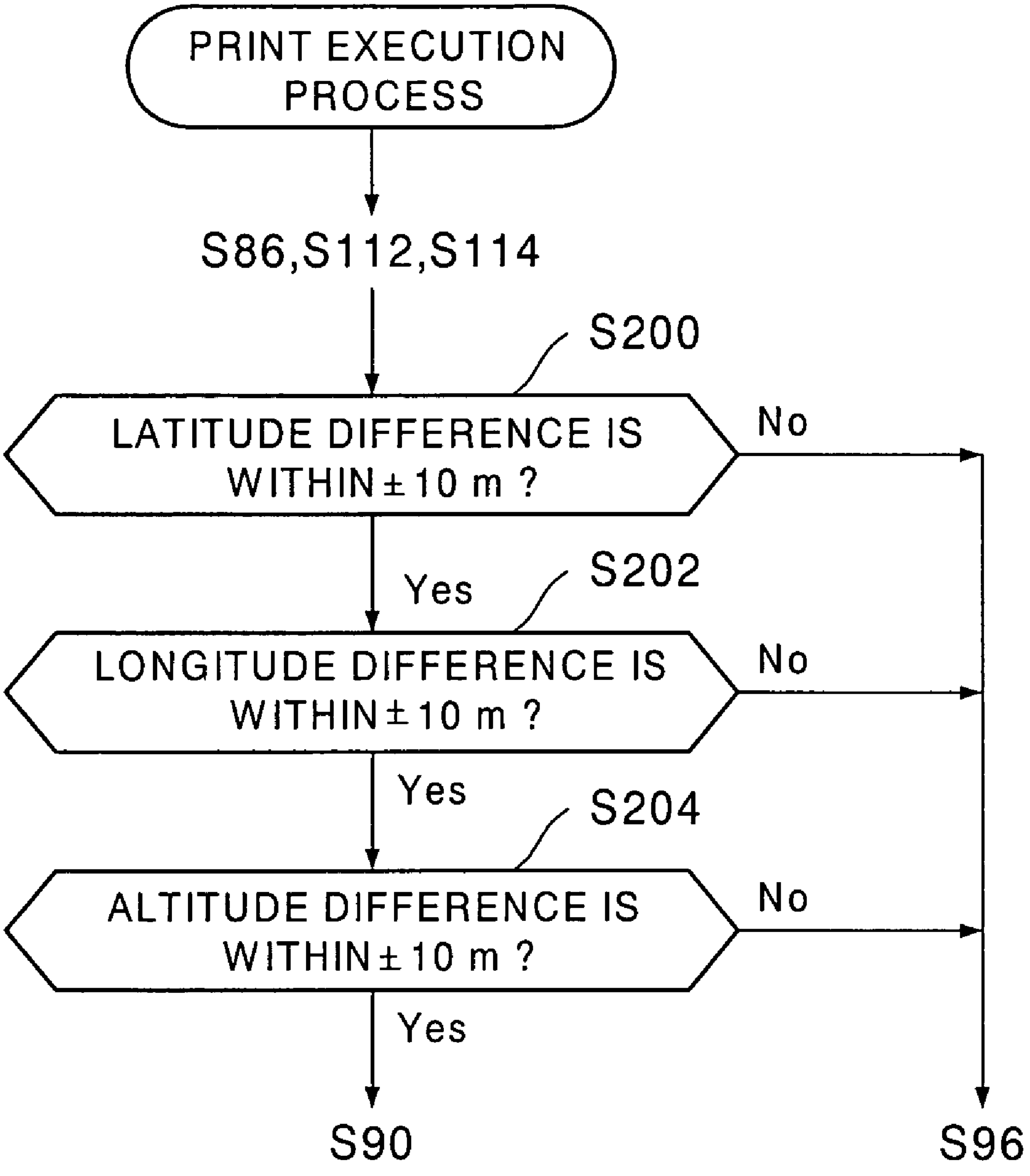
FIG. 13 is a flowchart explaining a print execution process executed by the printer according to the third embodiment of the present invention.

FIG. 13 partially shows a flowchart explaining a print execution process executed in the printers 30, 32 according to this embodiment. Also here, similarly to the above, assuming the case where the printer 30 executes the print transmitting data D10 transmitted from the print client 20, the following explanation is given.

A process in step S200 shown in FIG. 13 is a process subsequent to step S86 in FIG. 9 in the first embodiment, and a process subsequent to step S112 or step S114 in FIG. 12 in the second embodiment. In this step S200, the printer 30 judges whether the difference between the latitude of the printer position information D12 contained in the received print transmitting data D10 and the latitude of the printer position information acquired at this point in time is within ±10 m, for example (step S200). When the difference between both the latitudes exceeds ±10 m (step S200: No), it means that these two pieces of printer position information do not coincide, and hence the printer 30 transmits the position information non-coincidence notice to the print client 20 (step S96, See FIG. 9 and FIG. 12).

On the other hand, when the difference between both the latitudes is within ±10 m (step S200: Yes), it is judged whether the difference between the longitude of the printer position information D12 contained in the received print transmitting data D10 and the longitude of the printer position information acquired at this point in time is within ±10 m, for example (step S202). When the difference between both the longitudes exceeds ±10 m (step S202: No), it means that these two pieces of printer position information do not coincide, and hence the printer 30 transmits the position information non-coincidence notice to the print client 20 (step S96, See FIG. 9 and FIG. 12).

On the other hand, when the difference between both the longitudes is within ±10 m (step S202: Yes), it is judged whether the difference between the altitude of the printer position information D12 contained in the received print transmitting data D10 and the altitude of printer position information acquired at this point in time is within ±10 m, for example (step S204). When the difference between both the altitudes exceeds ±10 m (step S204: No), it means that these two pieces of printer position information do not coincide, and hence the printer 30 transmits the position information non-coincidence notice to the print client 20 (step S96, See FIG. 9 and FIG. 12).

On the other hand, when the difference between both the altitudes is within ±10 m (step S204: Yes), it means that these two pieces of print position information coincide, and therefore, the print data D14 contained in the print transmitting data D10 is acquired and printed (step S90, step S92, See FIG. 9 and FIG. 12). The process other than this is the same as that in the aforementioned first and second embodiments.

As can be seen from the process from step S200 to step S204, in this embodiment, it is judged whether the difference between the printer position information D12 contained in the print transmitting data D10 and the printer position information acquired at this point in time is within a predetermined range, and when the difference between the two pieces of printer position information is within the predetermined range, it is judged that the print transmitting data D10 matches the printer position information at this point in time. On the other hand, when the difference between the two pieces of printer position information is not within the predetermined range, it is judged that the print transmitting data does not match the printer position information at this point in time.

As described above, according to the print system of this embodiment, if the difference between the printer position information D12 contained in the received print transmitting data D10 and the printer position at this point in time is within the predetermined range when the printers 30, 32 perform the print execution process in the first embodiment or the second embodiment, the print data D14 is printed, whereby user friendliness can be increased while the security of the print data D14 and the printers 30, 32 is ensured.

Namely, even if the printer 30 and the printer 32 have been slightly moved for some reason, it is possible to make the printers 30, 32 execute a print operation using printer position information heretofore acquired by the print clients 20, 22. Therefore, it becomes unnecessary that the print clients 20, 22 acquire printer position information again from the printers 30, 32 only because the printers 30, 32 have been slightly moved.

Fourth Embodiment

Figure 14A:
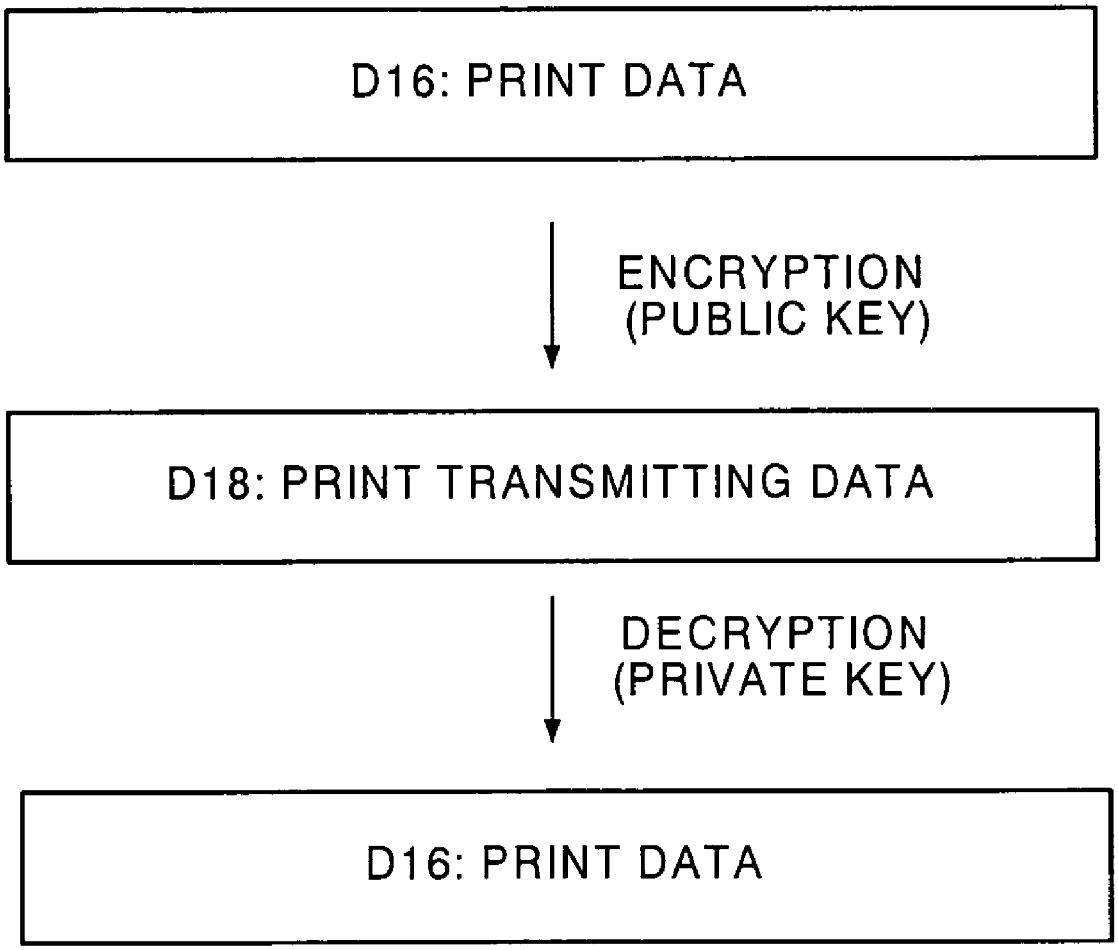
FIG. 14A is a diagram explaining the concept of encryption and decryption of print data in the fourth to a ninth embodiment of the present invention.

As shown in FIG. 14A, a print system according to the fourth embodiment of the present invention is designed so that a public key is generated with at least printer position information indicating a position where a printer is installed, a print client acquires this public key, and that when the print client transmits print data D16 to the printer, the print data D16 is transmitted as print transmitting data D18 which is generated by encrypting the print data D16 with the acquired public key. The printer which has received the print transmitting data D18 generates a private key with at least printer position information at this point in time at the time of reception and executes a print operation only when the print transmitting data D18 has been decrypted with this private key. Further details will be given below.

It should be mentioned that the configuration of the print system according to this embodiment is the same as that in FIG. 1 in the aforementioned first embodiment, configurations of the printers 30, 32 are the same as that in FIG. 2 described above, and that configurations of the print clients 20, 22 are the same as that in FIG. 3 described above.

First, processes in the print clients 20, 22 and the printers 30, 32 when the print clients 20, 22 each acquire a public key will be explained in detail.

Figure 14B:
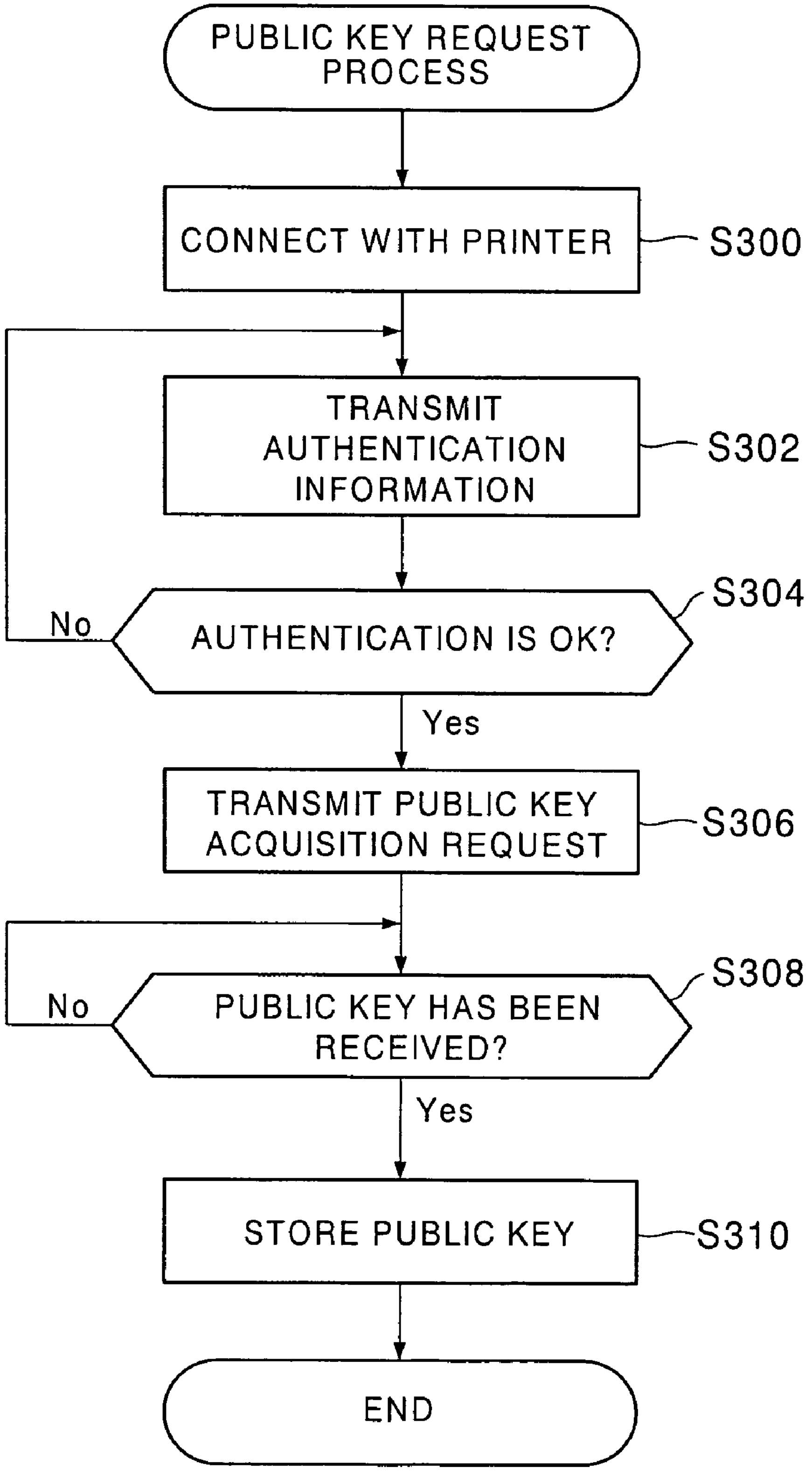
FIG. 14B is a flowchart explaining a public key request process executed by the print client according to the fourth embodiment and the fifth embodiment of the present invention.

FIG. 14B is a flowchart explaining a public key request process executed in the print clients 20, 22. This public key request process is realized by making the CPU 64 read and execute a public key request program stored in the ROM 68 or the hard disk 76 of the print client. Assuming here a case where the print client 20 makes a request for a public key to the printer 30, the following explanation is given.

As shown in FIG. 14B, in the public key request process, the print client 20 first connects with the printer 30 (step S300). In this embodiment, as in the first embodiment, the print client 20 establishes a connection between the print client 20 and the printer 30 by designating the network address of the printer 30.

Thereafter, the print client 20 transmits authentication information to the printer 30 (step S302). In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication has been accepted from the printer 30, and judges whether the authentication has been accepted by the printer 30 based on the authentication result (step S304). When the authentication has not been accepted (step S304: No), the print client 20 repeats the aforementioned process from step S302.

On the other hand, when the authentication has been accepted (step S304: Yes), the print client 20 transmits a public key acquisition request to the printer 30 (step S306). Then, the print client 20 judges whether a public key has been received from the printer 30 (step S308). When the public key has not been received from the printer 30 (step S308: No), the print client 20 stands by while repeating step S308.

On the other hand, when the public key has been received from the printer 30 (step S308: Yes), the public key is stored (step S310). In this embodiment, the print client 20 is provided with a public key table TB20 on the hard disk 76, and the acquired public key is stored and held in this public key table TB20.

FIG. 15 is a diagram showing an example of the structure of the public key table TB20. As shown in FIG. 15, the public key table TB20 includes an item D20 which stores information to specify printers and an item D21 which stores acquired public keys in a one-to-one correspondence with the printers. As described just above, the public key table TB20 can hold public keys concerning plural printers on a printer-by-printer basis. Moreover, by storing the public keys in the public key table TB20 on the hard disk 76 in this manner, even when the print client 20 is powered off and then powered on again, the public key acquired before the power-on can be read from the hard disk 76 and used as it is.

By storing the acquired public key in the public key table TB20, the public key request process shown in FIG. 14B is completed.

Figure 16:
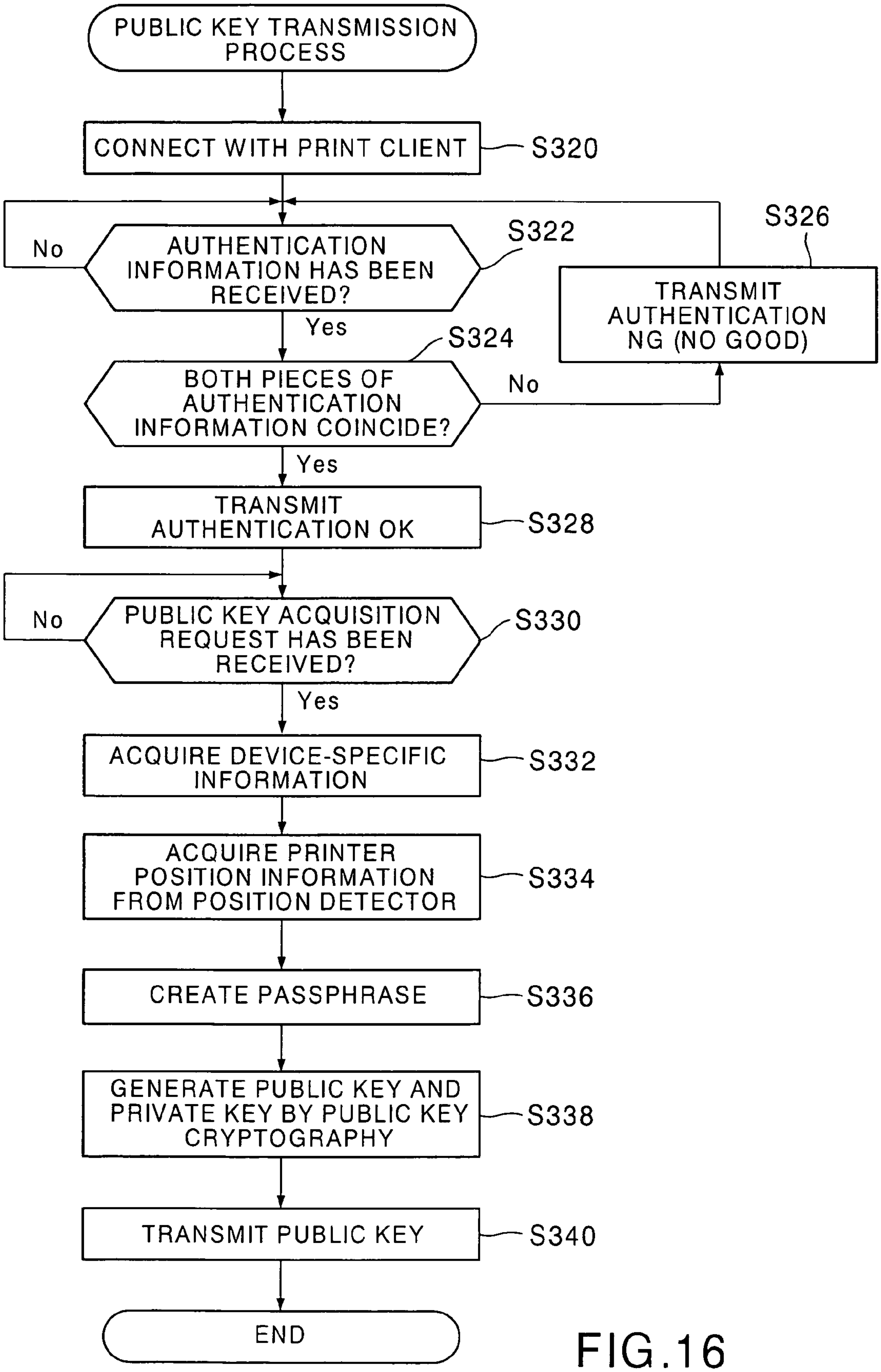
FIG. 16 is a flowchart explaining a public key transmission process executed by the printer according to the fourth embodiment.

Next, a public key transmission process executed in the printers 30, 32 corresponding to the public key request process in the print clients 20, 22 will be explained based on FIG. 16. FIG. 16 is a flowchart explaining the public key transmission process executed in the printers 30, 32. The public key transmission process is realized by making the CPU 40 read and execute a public key transmission program stored in the ROM 44 of the printer. Also here, similarly to the above, assuming the case where the print client 20 makes the request for the public key to the printer 30, the following explanation is given.

As shown in FIG. 16, first, the printer 30 establishes a connection with the print client 20 (step S320). This corresponds to the aforementioned step S300 on the print client 20 side. Subsequently, the printer 30 judges whether the authentication information has been received from the print client 20 (step S322). When the authentication information has not been received (step S322: No), the printer 30 stands by while repeating the process in step S322.

On the other hand, when the authentication information has been received from the print client 20 (step S322: Yes), the printer 30 judges whether this authentication information coincides with authentication information which is previously registered with the printer 30 (step S324). More specifically, since the client ID and the password are transmitted as the authentication information from the print client 20 as described above, the printer 30 judges whether these client ID and password coincide with a client ID and a password which are previously registered with the printer 30.

When these two pieces of authentication information do not coincide (step S324: No), the printer 30 transmits the authentication result indicating that the authentication has not been accepted to the print client 20 (step S326) and returns to the process in step S322. On the other hand, when these two pieces of authentication information coincide (step S324: Yes), the printer 30 transmits the authentication result indicating that the authentication has been accepted to the print client 20 (step S328).

Thereafter, the printer 30 judges whether the public key acquisition request has been received from the print client 20 (step S330). When the public key acquisition request has not been received (step S330: No), the printer 30 stands by while repeating the process in step S330.

On the other hand, when the public key acquisition request has been received from the print client 20 (step S330: Yes), the printer 30 acquires device-specific information on the printer 30 (step S332). Here, the device-specific information is identification information specifically assigned to the printer 30, and it is, for example, a manufacturer's serial number, an MAC address, or the like of the printer 30.

Then, the printer 30 acquires printer position information on the printer 30 at this point in time from the position detector 54 (step S334). The reason why the printer position information is acquired from the position detector 54 each time as described just above is that in order that, when the printer 30 has been moved to a different place, a public key is generated with position information after the movement.

Subsequently, the printer 30 creates a passphrase with the device-specific information and the printer position information (step S336). There are various methods of creating the passphrase, and in this embodiment, the passphrase is created by simply joining the printer position information after the device-specific information. Incidentally, the passphrase may contain data other than these device-specific information and printer position information.

Thereafter, the printer 30 generates a public key and a private key with the created passphrase by a public key cryptography (step S338). The public key cryptography has the property that the same public key and private key are generated again if the same passphrase is used. Then, the printer 30 transmits only the public key out of the generated public key and private key to the print client 20 (step S340). Incidentally, the private key is abandoned without being saved. Thus, the public key transmission process according to this embodiment is completed.

Next, processes in the print clients 20, 22 and the printers 30, 32 when the print clients 20, 22 want to perform printing and transmit a print request to the printers 30, 32 will be explained in detail.

Figure 17:
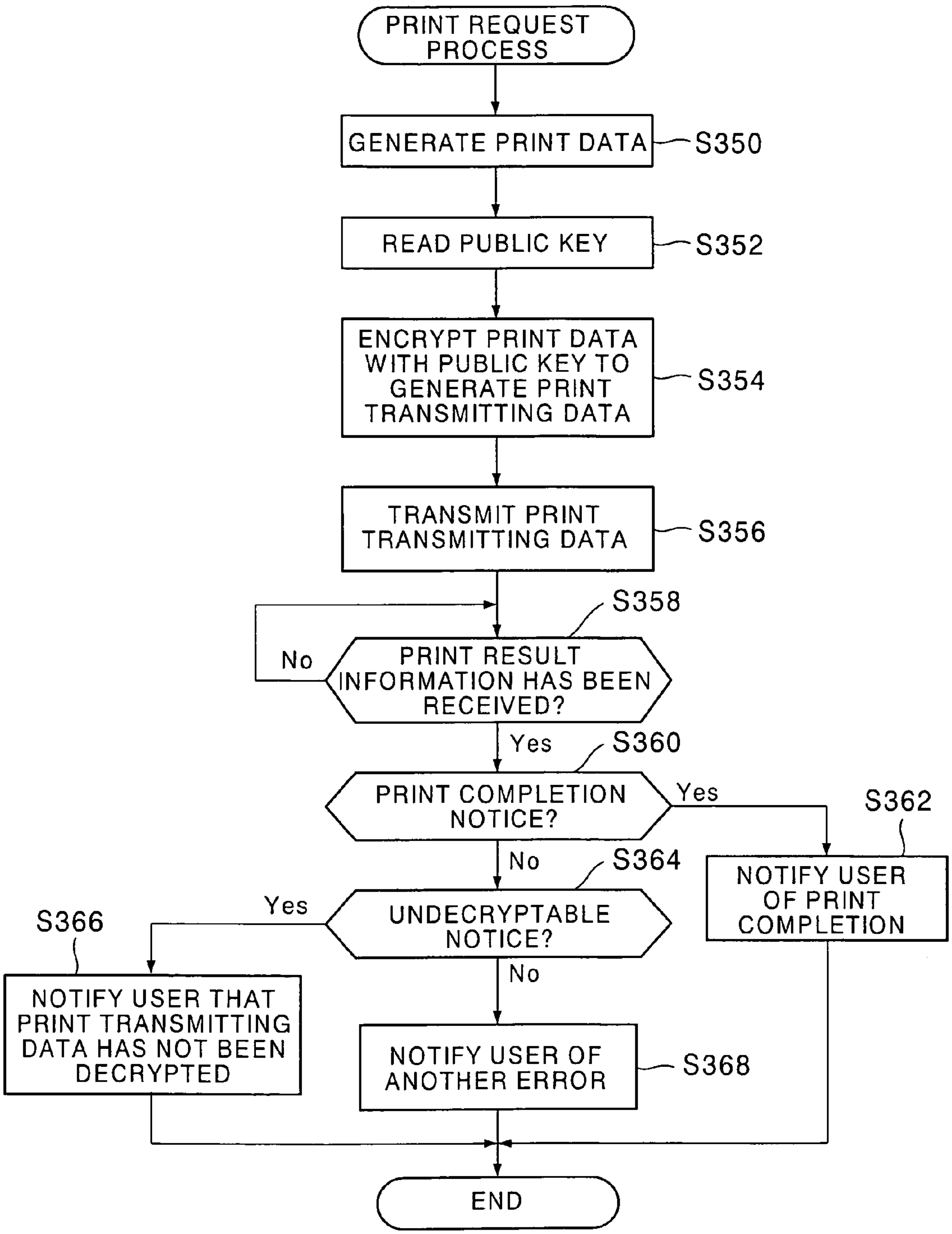
FIG. 17 is a flowchart explaining a print request process executed by the print client according to the fourth embodiment and the fifth embodiment of the present invention.

FIG. 17 is a flowchart explaining a print request process executed in the print clients 20, 22. This print request process is realized by making the CPU 64 read and execute a print request program stored in the ROM 68 or the hard disk 76 of the print client. Here, assuming a case where the print client 20 makes a print request to the printer 30, the following explanation is given.

As shown in FIG. 17, the print client 20 generates print data based on a print request from the user (step S350). This print data is data necessary for an actual print operation when the printer 30 is an ordinary printer.

Then, the print client 20 reads the public key of the printer 30 from the public key table TB20 on the hard disk 76 (step S352). Subsequently, the print client 20 encrypts the print data with the public key of the printer 30 to generate print transmitting data (step S354). Incidentally, the print transmitting data may contain data other than the print data.

Thereafter, the print client 20 transmits the encrypted print transmitting data to the printer 30 (step S356). More specifically, the print client 20 designates the network address of the printer 30 and sends out the print transmitting data to the network 10.

Subsequently, the print client 20 judges whether print result information has been received from the printer 30 (step S358). When the print result information has not been received (step S358: No), the print client 20 stands by while repeating the process in step S358. On the other hand, when the print result information has been received (step S358: Yes), the print client 20 judges whether the print result information is a print completion notice (step S360).

When this print result information is the print completion notice (step S360: Yes), it means that the printer 30 has properly completed the print operation, and hence the print client 20 notifies the user that the printer 30 has completed the print operation (step S362). On the other hand, when the received print result information is not the print completion notice (step S360: No), whether the print result information is an undecryptable notice is judged (step S364).

When the print result information is the undecryptable notice (step S364: Yes), the print client 20 notifies the user that since the print transmitting data has not been decrypted by the printer 30, the print operation has not been executed (step S366). On the other hand, when the print result information is not the undecryptable notice (step S364: No), some other error is thought to occur, and hence the print client 20 gives notice according to the type of the error to the user (step S368).

The print request process in the print client 20 is completed by the notice in step S362, step S366, or step S368.

Figure 18:
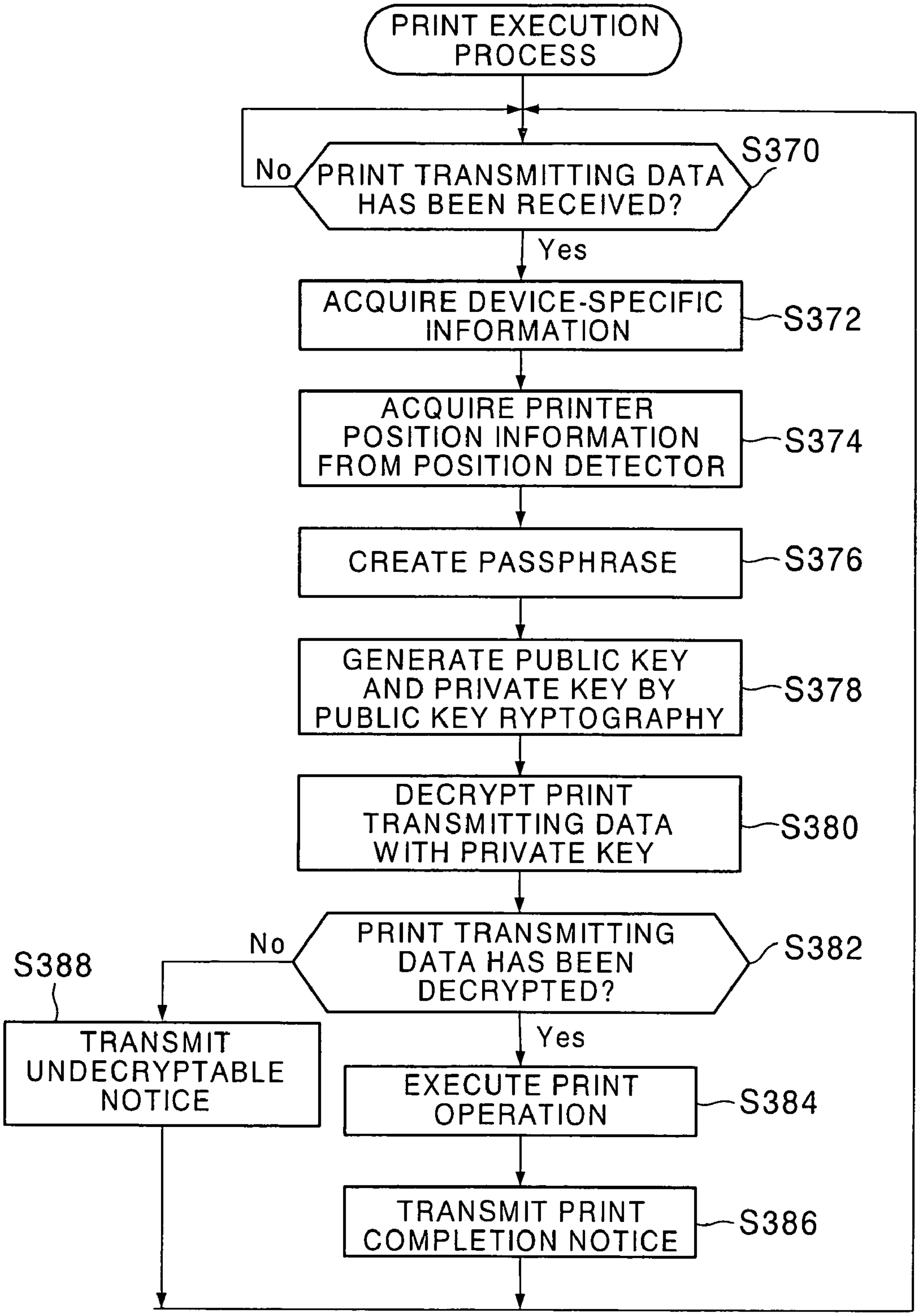
FIG. 18 is a flowchart explaining a print execution process executed by the printer according to the fourth embodiment.

Next, a print execution process executed in the printers 30, 32 corresponding to the print request process in the print clients 20, 22 will be explained based on FIG. 18. FIG. 18 is a flowchart explaining the print execution process executed in the printers 30, 32. This print execution process is realized by making the CPU 40 read and execute a print execution program stored in the ROM 44 of each of the printers 30, 32. Also here, similarly to the above, assuming the case where the print client 20 makes the print request to the printer 30, the following explanation is given.

As shown in FIG. 18, the printer 30 judges whether the print transmitting data has been received from the network 10 (step S370). When no print transmitting data has been received (step S370: No), the printer 30 stands by while repeating the process in step S370.

On the other hand, when the print transmitting data has been received (step S370: Yes), the printer 30 acquires its own device-specific information (step S372). Subsequently, the printer 30 acquires printer position information on the printer 30 at this point in time from the position detector 54 (step S374). The reason why the printer position information is acquired from the position detector 54 each time as described just above is that, when the printer 30 has been moved to a different place, there is a possibility that the printer 30 is installed in a place where the user does not intend to perform printing, and in order that in such a case, the print operation is not executed by the printer 30.

Then, the printer 30 creates a passphrase based on the device-specific information and the printer position information (step S376). The method of creating the passphrase needs to be the same method as in step S336 in the aforementioned public key transmission process. This is because, if the passphrases are different, the print transmitting data encrypted with the public key transmitted to the print client cannot be decrypted with a private key.

Thereafter, the printer 30 generates a public key and a private key with the passphrase by the public key cryptography (step S378). Subsequently, the printer 30 decrypts the received print transmitting data with the generated private key and acquires the print data (step S380).

Then, the printer 30 judges whether the print transmitting data has been decrypted with the private key (step S382). When the print transmitting data has been decrypted (step S382: Yes), the printer 30 executes the print operation by driving the print engine 52 based on the acquired print data (step S384). More specifically, the printer 30 performs a language interpretation of the print data and generates print request data fitting the print engine 52. Then, by transmitting this print request data to the print engine 52, print sheets and so on are printed by the print engine 52.

As can be seen from the above, in this embodiment, the private key is generated with the passphrase containing at least the printer position information detected by the position detector 54, and when the print transmitting data has been decrypted with this private key, it is judged that the print transmitting data matches the printer position information.

At a point in time when the print operation has been properly completed, the printer 30 transmits the print completion notice that the print operation has been properly completed as the print result information to the print client 20 (step S386). Then, the printer 30 returns to the aforementioned process in step S370.

Contrary to this, when it is judged in step S382 that the print transmitting data has not been decrypted (step S382: No), the printer 30 transmits the undecryptable notice as the print result information to the print client 20 (step S388). Namely, in this embodiment, when the private key is generated with the passphrase containing at least the printer position information detected by the position detector 54 but the print transmitting data has not been decrypted with this private key, it is judged that that the print transmitting data does not match the printer position information. Then, the printer 30 returns to the aforementioned process in step S370.

As described above, according to the print system of this embodiment, the print clients 20, 22 can limit a printer able to print transmitted encrypted print transmitting data based on printer position information, so that the execution of a print operation by a printer installed in a position where the users of the print clients 20, 22 do not intend to perform printing can be avoided. For example, even if the print transmitting data is transmitted by mistake to the printer 30 from the print client 20 when the printer 30 has been moved to a different place but the network address of the printer 30 in the network 10 remains unchanged, the printer position information is changed in the printer 30, whereby the passphrase created in step S376 is different from that before the movement. Hence, the print transmitting data cannot be decrypted with a private key generated with this passphrase, and thereby the print operation cannot be executed by the printer 30. Consequently, the security of print data can be enhanced.

On the other hand, also on the printers 30, 32 side, the transmission of print data to the printers 30, 32 by somebody who is not duly authorized to perform printing with the printers 30, 32 and the execution of a large print operation by the printers 30, 32 can be avoided. For example, even if a third party can know the network address of the printer 30 for some reason and tries to transmit print transmitting data to the printer 30, the third party cannot acquire the public key of the printer 30. Even if this user generates print transmitting data by encrypting print data with a different public key or generates print transmitting data without encryption and transmits the print transmitting data to the printer 30, it is judged in step S382 of the print execution process that the print transmitting data has not been decrypted, and hence it becomes impossible to make the printer 30 execute the print operation. Consequently, the security of the printer 30 itself can be enhanced.

Moreover, in this embodiment, the passphrase contains the device-specific information, and hence even if a third party can know the position of the printer 30 for some reason, the passphrase used in the printer 30 cannot be specified unless the device-specific information on the printer 30 is known. Consequently, the possibility that the third party who has no rightful authority performs printing with the printer 30 can be greatly reduced.

Fifth Embodiment

The fifth embodiment of the present invention is obtained by combining the second embodiment with the aforementioned fourth embodiment. Namely, in this embodiment, plural position detectors are provided in each of the printers 30, 32, and when one position detector cannot detect the position of the printer for some reason, the position of the printer is detected by another position detector. Only portions different from the aforementioned fourth embodiment will be explained below.

It should be noted that hardware configurations of the printers 30, 32 according to this embodiment are the same as that in FIG. 10.

Figure 19:
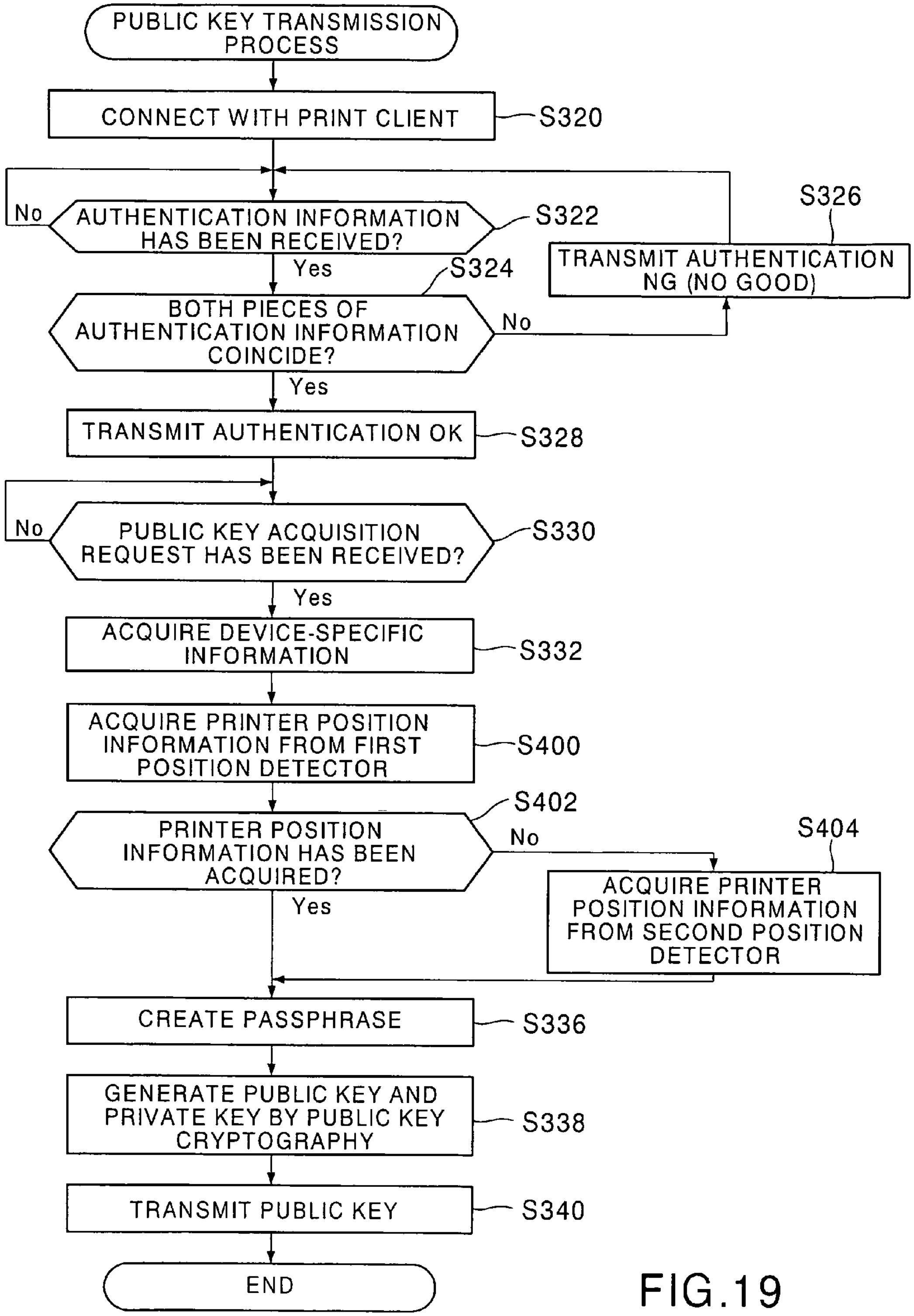
FIG. 19 is a flowchart explaining a public key transmission process executed by the printer according to the fifth embodiment.

First, a public key transmission process executed in the printers 30, 32 corresponding to a public key request process in the print clients 20, 22 will be explained based on FIG. 19. FIG. 19 is a flowchart explaining the public key transmission process executed in the printers 30, 32, and corresponds to the flowchart in FIG. 16 in the fourth embodiment. Also here, similarly to the above, assuming the case where the print client 20 makes a request for a public key to the printer 30, the following explanation is given.

In FIG. 19, the process from step S320 to step S332 is the same as that in the aforementioned fourth embodiment, but the process thereafter is different. Namely, after the printer 30 has acquired the device-specific information in step S332, the printer 30 acquires printer position information from the first position detector 100 (step S400).

Then, the printer 30 judges whether the printer position information has been acquired from the first position detector 100 (step S402). When the printer position information has been acquired from the first position detector 100 (step S402: Yes), the printer 30 creates a passphrase with the device-specific information acquired in step S332 and the printer position information acquired in step S400 (step S336).

Contrary to this, when the printer position information has not been acquired from the first position detector 100 (step S402: No), the printer 30 acquires printer position information from the second position detector 102 (step S404). Then, the printer 30 creates a passphrase with the device-specific information acquired in step S332 and the printer position information acquired in step S404 (step S336). The process after step S336 is the same as that in the aforementioned fourth embodiment.

Figure 20:
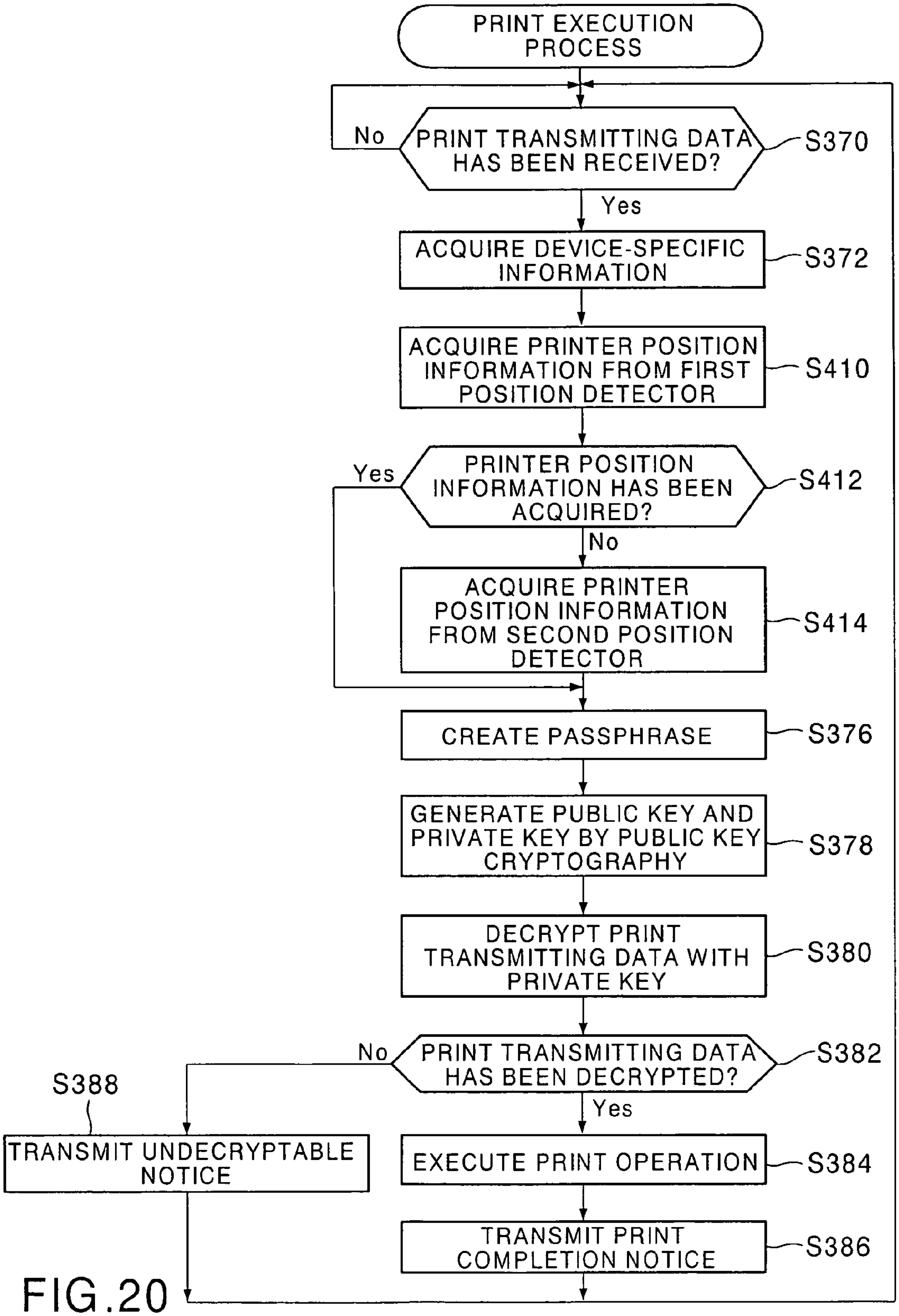
FIG. 20 is a flowchart explaining a print execution process executed by the printer according to the fifth embodiment.

Next, a print execution process executed in the printers 30, 32 corresponding to the print request process in the print clients 20, 22 will be explained based on FIG. 20. FIG. 20 is a flowchart explaining the print execution process executed in the printers 30, 32, and corresponds to the flowchart in FIG. 18 in the aforementioned fourth embodiment. Also here, similarly to the above, assuming the case where the printer 30 executes a print operation based on a print request from the print client 20, the following explanation is given.

As shown in FIG. 20, the print execution process according to this embodiment is the same from step S370 to step S372 as that according to the aforementioned fourth embodiment. However, in this embodiment, in step S410 subsequent to step S372, the printer 30 acquires printer position information from the first position detector 100 (step S410).

Then, the printer 30 judges whether the printer position information has been acquired from the first position detector 100 (step S412). When the printer position information has been acquired from the first position detector 100 (step S412: Yes), the printer 30 performs the process in and after step S376 using this printer position information. The process in and after step S376 is the same as that in the aforementioned fourth embodiment.

On the other hand, when the printer position information has not been acquired from the first position detector 100 (step S412: No), the printer 30 acquires the printer position information from the second position detector 102 (step S414). The printer 30 performs the process in and after step S376 using the printer position information acquired from the second position detector 102.

As described above, according to the print system of this embodiment, similarly to the aforementioned fourth embodiment, a public key and a private key are generated with a passphrase containing at least printer position information, and each of the print clients 20, 22 is notified of the public key. Then, every time the printer 30 receives print transmitting data, the printer 30 generates a private key again with a passphrase containing at least printer position at that point in time and decrypts the print transmitting data with the generated private key, whereby the security of print data can be enhanced, and moreover the security of the printer itself can be enhanced.

Furthermore, in this embodiment, the plural position detectors 100, 102 are provided in each of the printers 30, 32, whereby even if the printer position information cannot be acquired from the first position detector 100, the printer position information can be acquired from the second position detector 102. Consequently, the reliability of acquisition of printer position information on the printer side can be increased.

Sixth Embodiment

The sixth embodiment of the present invention is designed so that the position detector 54 of the printer 30 is not internally but externally mounted in the printer 30 in the aforementioned first to fifth embodiments.

Figure 21A:
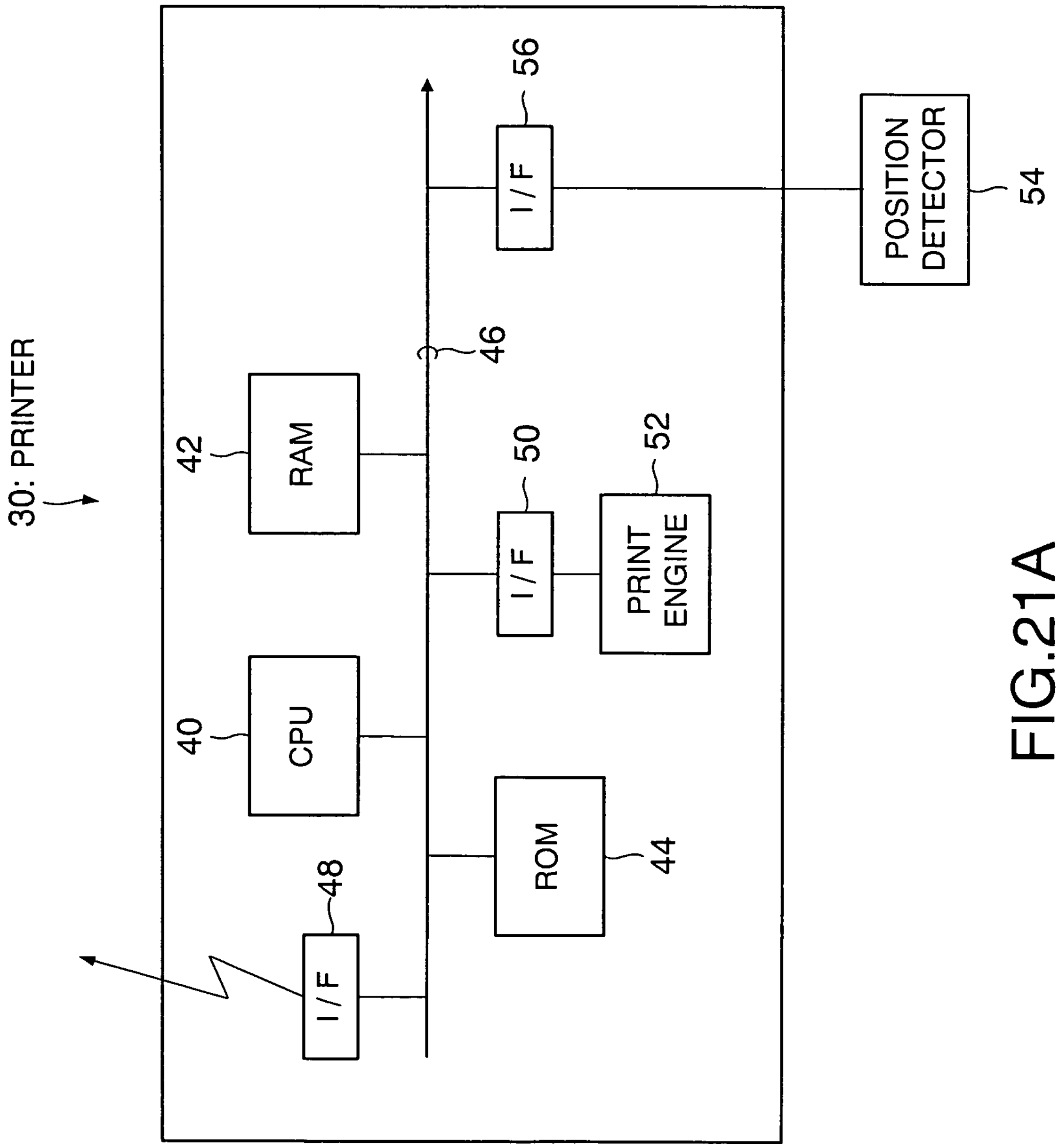
FIG. 21A is a diagram showing an example of a configuration of the printer in which a position detector is externally mounted via a wired cable (a sixth embodiment)

FIG. 21A is a block diagram showing a configuration of the printer 30 according to this embodiment. In the printer 30 shown in FIG. 21A, the position detector 54 is provided outside the printer 30 and connected to the printer 30 via an interface 56. The printer 30 having a configuration such as shown in FIG. 21A is realized by constituting the position detector 54 by a GPS device or a PHS terminal and inserting the GPS device or the PHS terminal into the printer 30 via a card slot. In the example in FIG. 21A, the printer 30 and the position detector 54 are connected by a short-distance wired cable such as a USB.

The printer 30 is usually used as a printer without the position detector 54, but when the position detector 54 is needed in the aforementioned first to fifth embodiments, the user attaches the position detector 54 to the printer 30 and uses this printer 30 as the printer with the position detector 54. In short, in this embodiment, the position detector 54 is detachable.

Points other than this in the printer 30 are the same as in the aforementioned first to fifth embodiments.

Figure 21B:
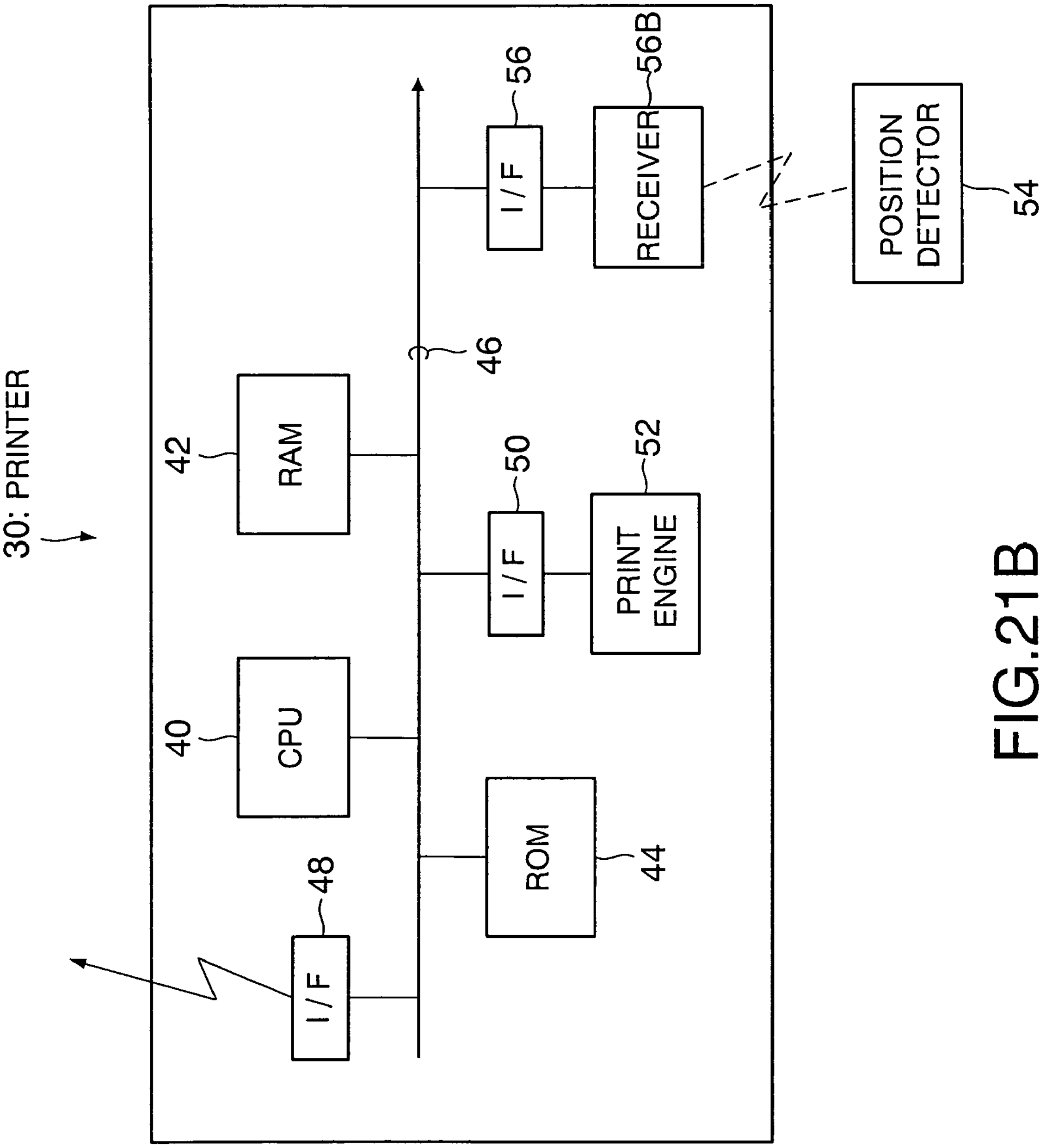
FIG. 21B is a diagram showing an example of a configuration of the printer in which the position detector is externally mounted via wireless (the sixth embodiment)

FIG. 21B is a diagram showing a modification of the sixth embodiment. In the example in FIG. 21B, a wireless receiver 56B is connected to the interface 56 of the printer 30. The position detector 54 is constituted by a GPS-equipped portable terminal., for example, and the position detector 54 and the receiver 56B are connected by a short-distance wireless system such as Bluetooth. Position information acquired by the position detector 54 is transmitted to the printer 30 by the short-distance wireless system.

If the printer 30 is configured as in this embodiment, it is possible for the user to attach the position detector 54 to the printer 30 when needed without the expensive position detector 54 being internally mounted in each printer. Consequently, the cost of the printer 30 can be reduced. Moreover, the printer 30 and the position detector 54 are connected by a wired cable, Bluetooth, or the like whose connection distance is restricted, whereby the distance between the printer 30 and the position detector 54 can be restricted to a predetermined range.

Seventh Embodiment

The seventh embodiment of the present invention is designed so that by modifying the aforementioned fourth embodiment, the printers 30, 32 are connected to the network 10 via a print server, and a position detector is provided in this print server.

Figure 22:
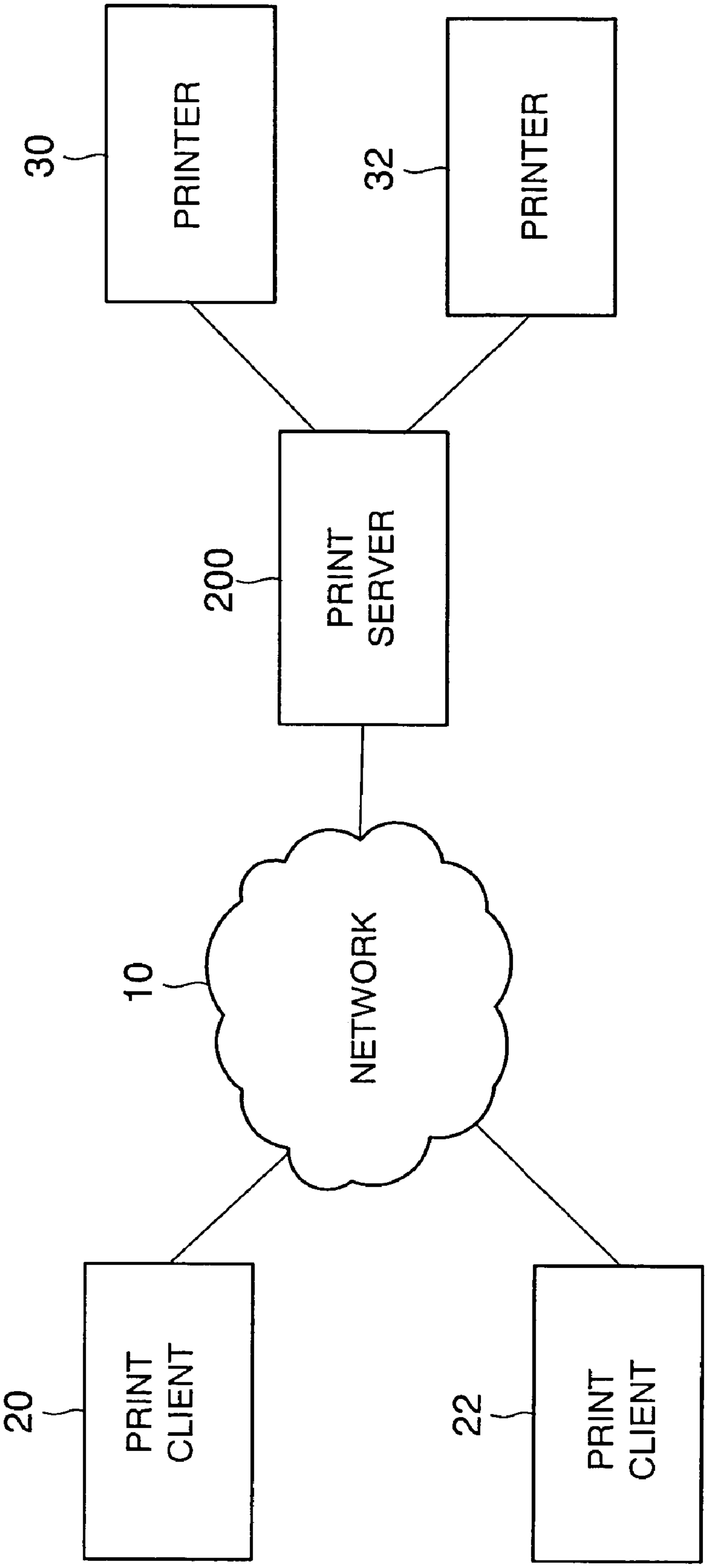
FIG. 22 is a diagram showing an example of a configuration of a print system according to a seventh embodiment.

FIG. 22 is a block diagram showing a hardware configuration of a print system according to this embodiment, and corresponds to FIG. 1 described above.

As shown in FIG. 22, in the print system according to this embodiment, the printers 30, 32 are connected to the network 10 via a print server 200. Therefore, when trying to perform printing with the printer 30; for example, the print clients 20, 22 transmit print transmitting data to the print server 200 via the network 10. The print server 200 which has received this print transmitting data spools print data obtained by decrypting the print transmitting data and transmits the spooled print data to the printer 30 according to the availability of the printer 30.

Figure 23:
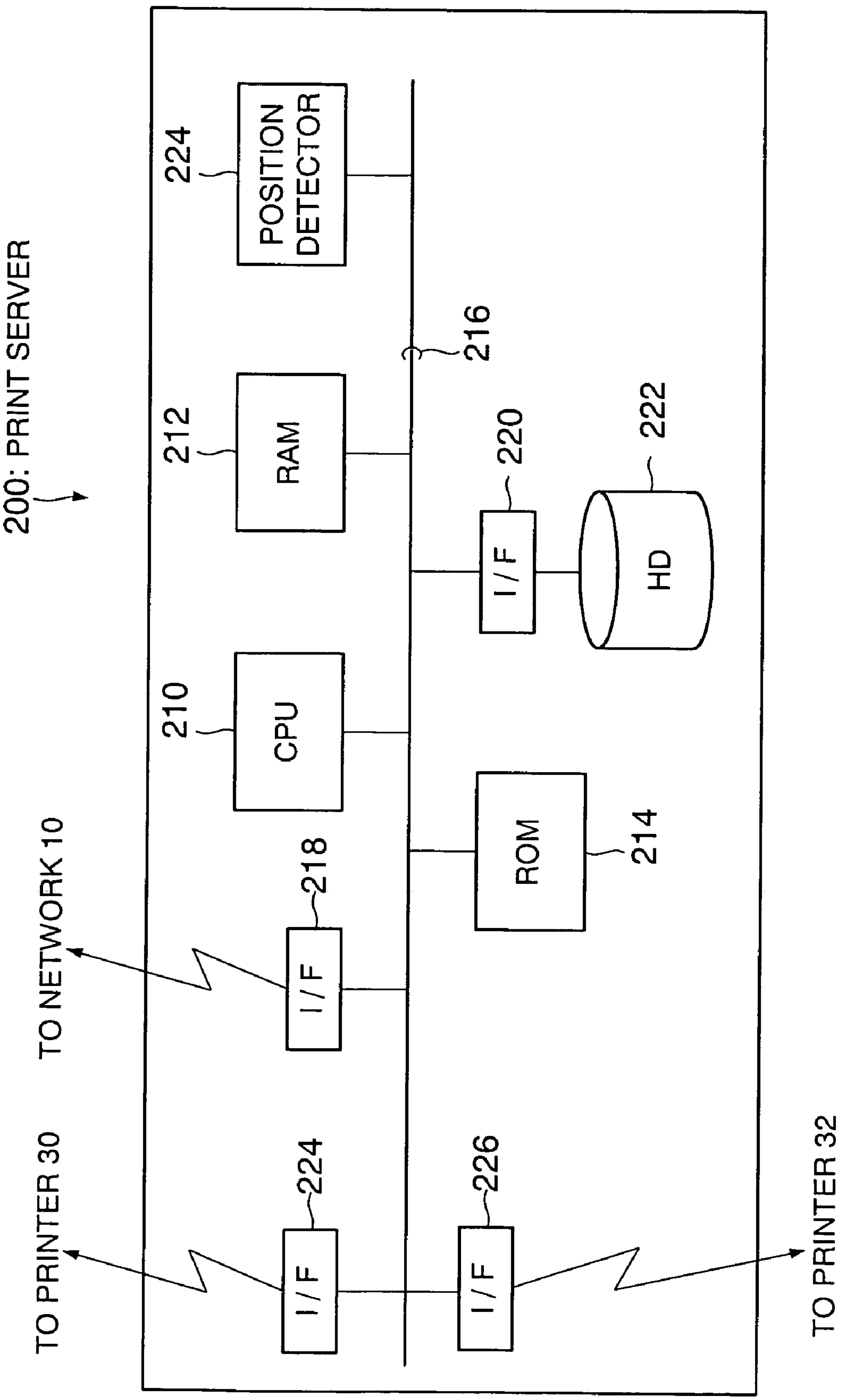
FIG. 23 is a diagram showing an example of a configuration of a print server according to the seventh embodiment.

FIG. 23 is a block diagram explaining an internal configuration of the print server 200 according to this embodiment. As shown in FIG. 23, the print server 200 includes a CPU 210, a RAM 212, and a ROM 214, and they are connected to each other via an internal bus 216. A communication interface 218 is connected to the internal bus 216, and the print server 200 is connected to the aforementioned network 10 via the communication interface 218. In addition, an interface 220 is connected to the internal bus 216, and a hard disk 222 is connected as an auxiliary memory to the interface 220.

Moreover, a position detector 224 is connected to the internal bus 216. This position detector 224 has a function of specifying a position where the print server 200 is installed. In this embodiment, the position detector 224 is constituted, for example, by a GPS (global positioning system), and the latitude, longitude, and altitude of the position where the print server 200 is installed can be specified.

However, the constitution of the position detector 224 is not limited to the constitution using the GPS, and, for example, when the print server 200 is connected to the network 10 by a wireless LAN, the position of the print server 200 may be specified based on a wireless base station which accommodates the print server 200.

Moreover, the position of the print server 200 may be specified by using mobile communication technology including the PHS (Personal Handyphone System). Further, it is also possible that the position detector 54 uses both the GPS and the PHS, and when it cannot receive ratio waves of the GPS inside a room, it specifies the position based on radio waves of the PHS.

In addition, in this embodiment, communication interfaces 224, 226 are connected to the internal bus 216, and the print server 200 is connected to the printer 30 via the communication interface 224 and connected to the printer 32 via the communication interface 226.

It should be mentioned that configurations of the print clients 20, 22 are the same as that in FIG. 3 in the aforementioned first embodiment. Moreover, the printers 30, 32 each may be an ordinary printer which is obtained by omitting the position detector 54 from the printer in FIG. 2.

Figure 24:
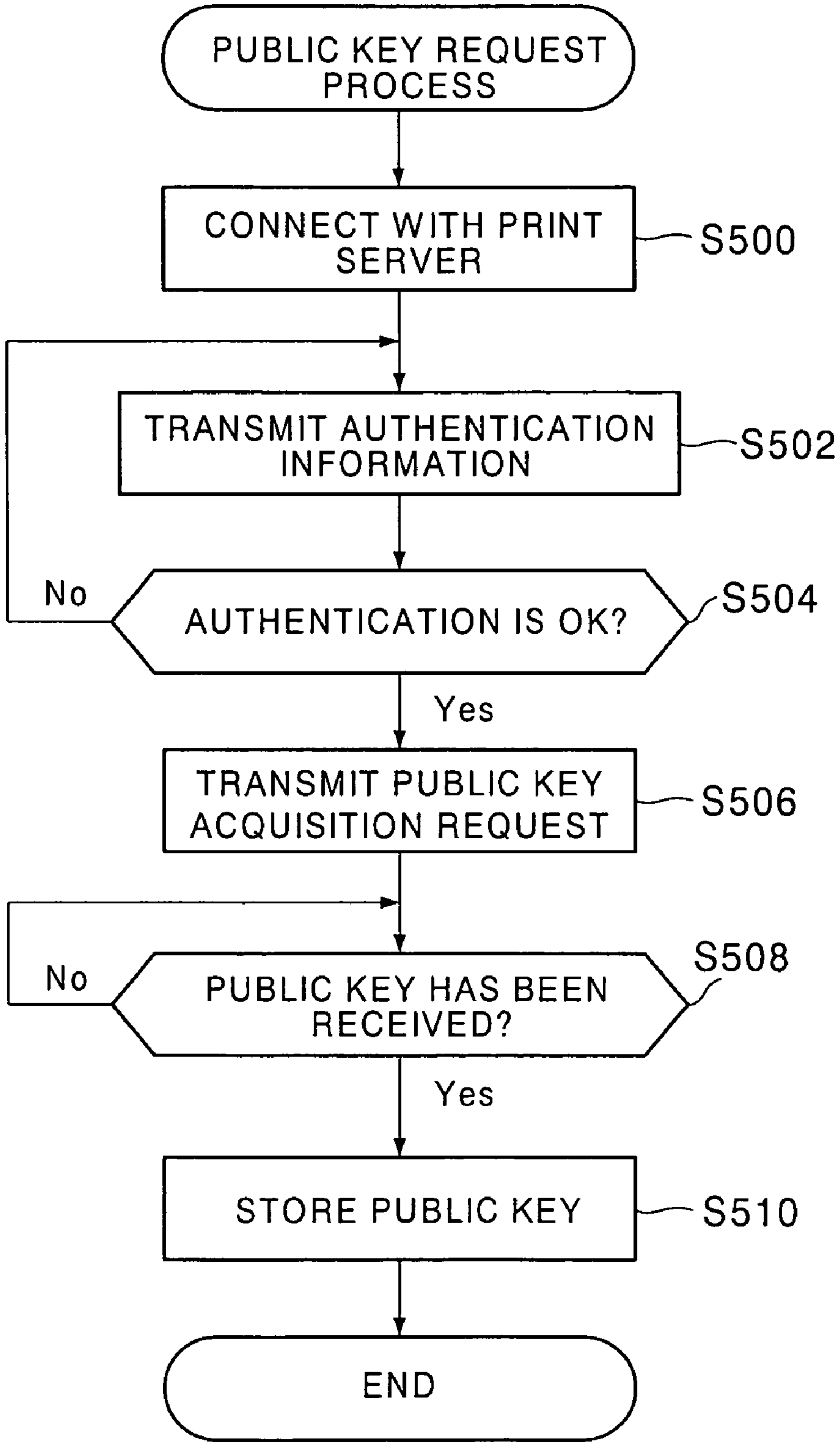
FIG. 24 is a flowchart explaining a public key request process executed by the print client according to the seventh embodiment.

FIG. 24 is a flowchart explaining a public key request process executed in the print clients 20, 22. This public key request process is realized by making the CPU 64 read and execute a public key request program stored in the ROM 68 or the hard disk 76 of the print client. Assuming here a case where the print client 20 makes a request for the public key of the printer 30 to the print server 200, the following explanation is given.

As shown in FIG. 24, in the public key request process, the print client 20 first connects with the print server 200 (step S500). In this embodiment, as in the first embodiment, the print client 20 establishes a connection between the print client 20 and the print server 200 by designating the network address of the print server 200.

Thereafter, the print client 20 transmits authentication information to the print server 200 (step S502). In this embodiment, a combination of a client ID to specify the print client and a password is used as the authentication information. Accordingly, the print client 20 transmits the client ID and the password to the print server 200.

Subsequently, the print client 20 receives an authentication result indicating whether authentication has been accepted from the print server 200, and judges whether the authentication has been accepted by the print server 200 based on the authentication result (step S504). When the authentication has not been accepted (step S504: No), the print client 20 repeats the aforementioned process from step S502.

On the other hand, when the authentication has been accepted (step S504: Yes), the print client 20 transmits a public key acquisition request to the print server 200 (step S506). In this embodiment, in some cases, plural printers are connected to the print server 200, and hence in this public key acquisition request, a printer is designated by designating the port number of the print server 200 to which the printer is connected. Then, the print client 20 judges whether the requested printer's public key has been received from the print server 200 (step S508). When the public key has not been received from the print server 200 (step S508: No), the print client 20 stands by while repeating step S508.

On the other hand, when the public key has been received from the print server 200 (step S508: Yes), the public key is stored (step S510). In this embodiment, the print client 20 is provided with a public key table TB30 on the hard disk 76, and the acquired public key is stored and held in this public key table TB30.

FIG. 25 is a diagram showing an example of the structure of the public key table TB30. As shown in FIG. 25, the public key table TB30 includes an item D30 which stores information to specify printers and an item D31 which stores acquired public keys in a one-to-one correspondence with the printers. As described just above, the public key table TB30 can hold public keys concerning plural printers on a printer-by-printer basis. Moreover, by storing the public keys in the public key table TB30 on the hard disk 76 in this manner, even when the print client 20 is powered off and then powered on again, the public key acquired before the power-on can be read from the hard disk 76 and used as it is.

In the aforementioned fourth embodiment, as shown in FIG. 15, information to specify a printer is created by storing the IP address of the printer in the item D20, but in this embodiment, as shown in FIG. 25, information to specify a printer is created by combining the IP address of the print server 200 and the port number of the print server 200.

By storing the acquired public key in the public key table TB30, the public key request process shown in FIG. 24 is completed.

Figure 26:
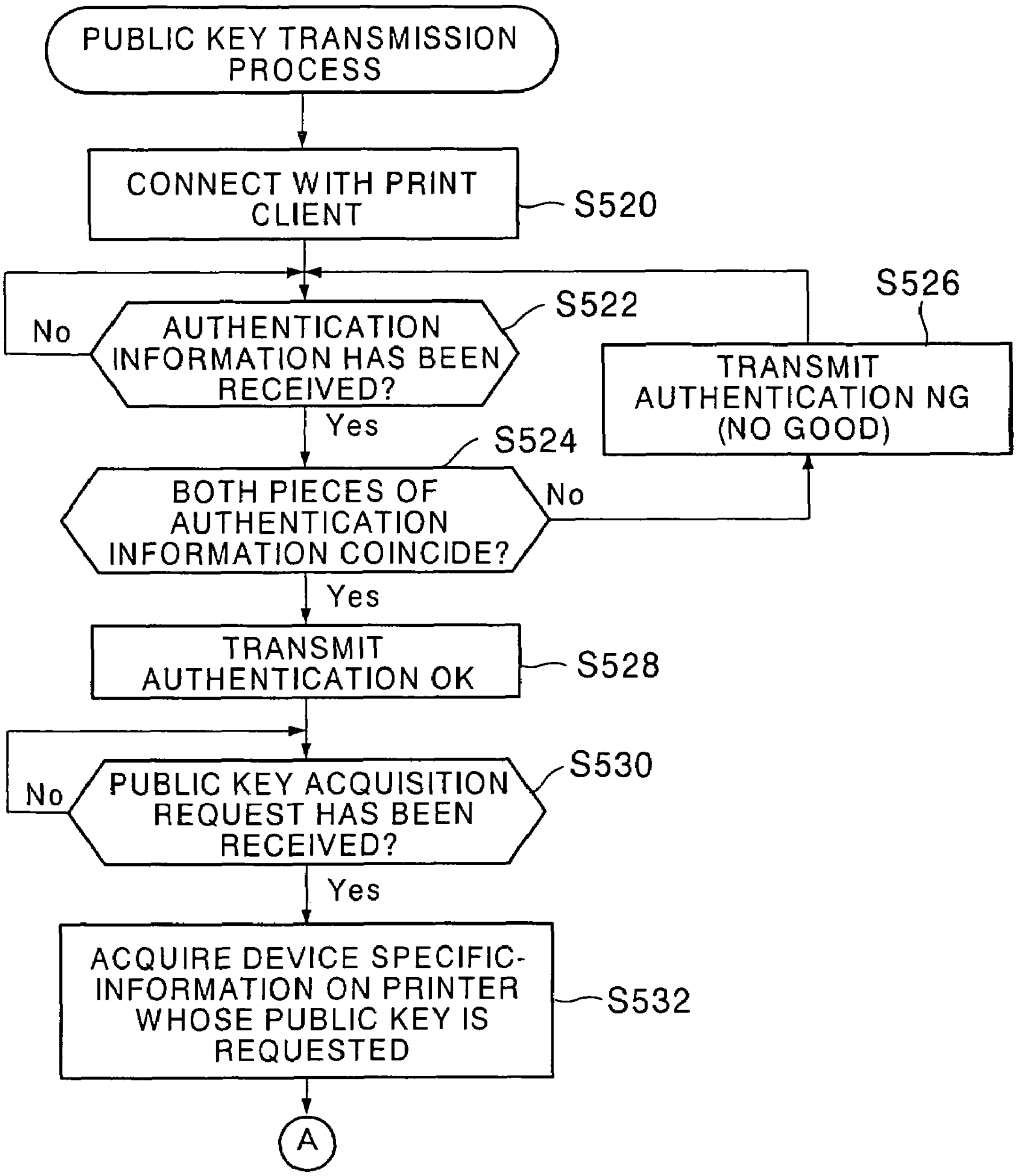
FIG. 26 is a flowchart explaining a public key transmission process executed by the print server according to the seventh embodiment (First process)
Figure 27:
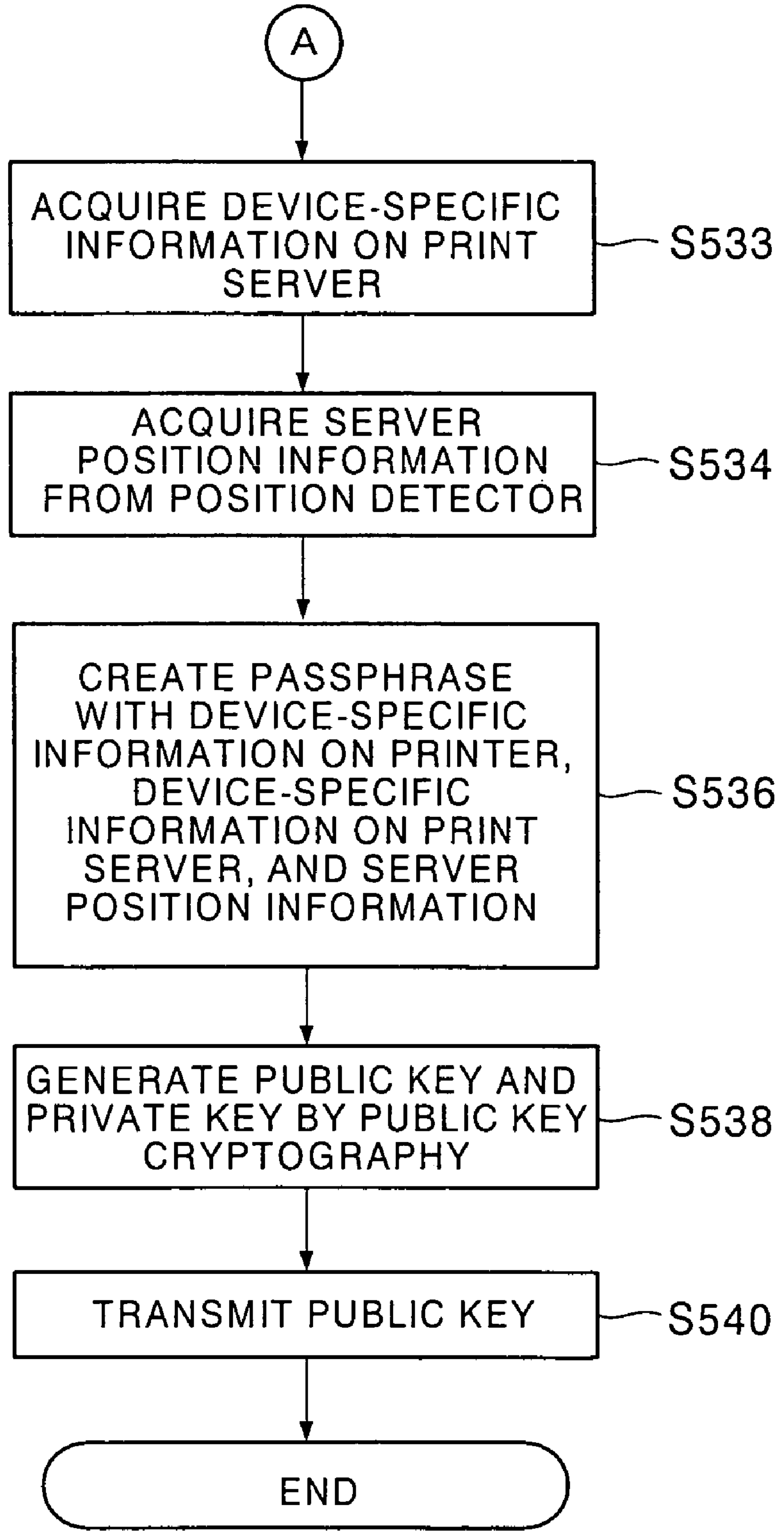
FIG. 27 is a flowchart explaining the public key transmission process executed by the print server according to the seventh embodiment (Second process)

Next, a public key transmission process executed in the print server 200 corresponding to the public key request process in the print clients 20, 22 will be explained based on FIG. 26 and FIG. 27. FIG. 26 and FIG. 27 are flowcharts explaining the public key transmission process executed in the print server 200. The public key transmission process is realized by making the CPU 210 read and execute a public key transmission program stored in the ROM 214 of the print server 200. Also here, similarly to the above, assuming the case where the print client 20 makes the request for the public key of the printer 30 to the print server 200, the following explanation is given.

As shown in FIG. 26, first, the print server 200 establishes a connection with the print client 20 (step S520). This corresponds to the aforementioned step S500 on the print client 20 side. Subsequently, the print server 200 judges whether the authentication information has been received from the print client 20 (step S522). When the authentication information has not been received (step S522: No), the print server 200 stands by while repeating the process in step S522.

On the other hand, when the authentication information has been received from the print client 20 (step S522: Yes), the print server 200 judges whether this authentication information coincides with authentication information which is previously registered with the print server 200 (step S524). More specifically, since the client ID and the password are transmitted as the authentication information from the print client 20 as described above, the print server 200 judges whether these client ID and password coincide with a client ID and a password which are previously registered with the print server 200.

When these two pieces of authentication information do not coincide (step S524: No), the print server 200 transmits the authentication result indicating that the authentication has not been accepted to the print client 20 (step S526) and returns to the process in step S522. On the other hand, when these two pieces of authentication information coincide (step S524: Yes), the print server 200 transmits the authentication result indicating that the authentication has been accepted to the print client 20 (step S528).

Thereafter, the print server 200 judges whether the public key acquisition request has been received from the print client 20 (step S530). When the public key acquisition request has not been received (step S530: No), the print server 200 stands by while repeating the process in step S530.

On the other hand, when the public key acquisition request has been received from the print client 20 (step S530: Yes), the print server 200 acquires device-specific information on the printer whose public key is requested (step S532). More specifically, the print server 200 acquires the device-specific information on the printer by requesting the printer of the port designated by the public key acquisition request to transmit the device-specific information and receiving the transmitted device-specific information. Incidentally, the device-specific information on the printer may be previously acquired by the print server 200 and stored on the hard disk 222. In this case, the device-specific information can be acquired by reading the device-specific information on the printer in question from the hard disk 222.

Then, as shown in FIG. 27, the print server 200 acquires device-specific information on the print server 200 (step S533). The device-specific information on the print server 200 is also identification information specifically assigned to the print server 200, and it is, for example, a manufacturer's serial number, an MAC address, or the like of the print server 200.

Then, the print server 200 acquires server position information on the print server 200 at this point in time from the position detector 224 (step S534). The reason why the server position information is acquired from the position detector 224 each time as described just above is that in order that, when the print server 200 has been moved to a different place, a public key is generated with position information after the movement.

Subsequently, the print server 200 creates a passphrase with the device-specific information on the printer 30, the device-specific information on the print server 200, and the server position information on the print server 200 (step S536). There are various methods of creating the passphrase, and in this embodiment, the passphrase is created by simply joining the device-specific information on the print server 200 after the device specific information on the printer 30 and joining the server position information on the print server 200 after the device-specific information on the print server 200. Incidentally, the passphrase may contain data other than these device-specific information and server position information.

Thereafter, the print server 200 generates a public key and a private key with the created passphrase by a public key cryptography (step S538). The public key cryptography has the property that the same public key and private key are generated again if the same passphrase is used. Then, the print server 200 transmits only the public key out of the generated public key and private key to the print client 20 (step S540). Incidentally, the private key is abandoned without being saved. Thus, the public key transmission process according to this embodiment is completed.

Incidentally, a process in the print clients 20, 22 when the print clients 20, 22 want to perform printing and transmit a print request to the print server 200 is the same as that in the aforementioned fourth embodiment.

Figure 28:
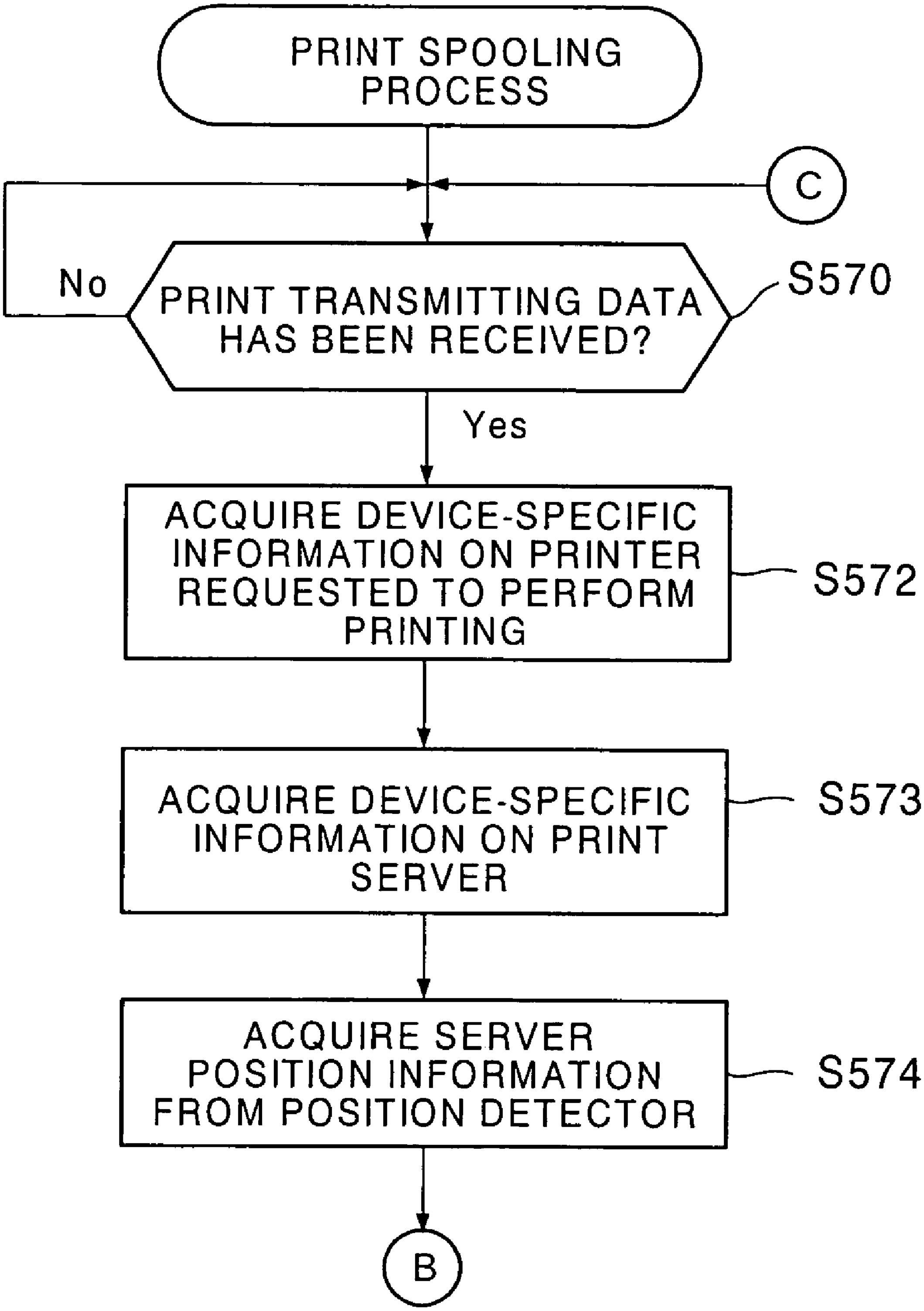
FIG. 28 is a flowchart explaining a print spooling process executed by the print server according to the seventh embodiment (First process)
Figure 29:
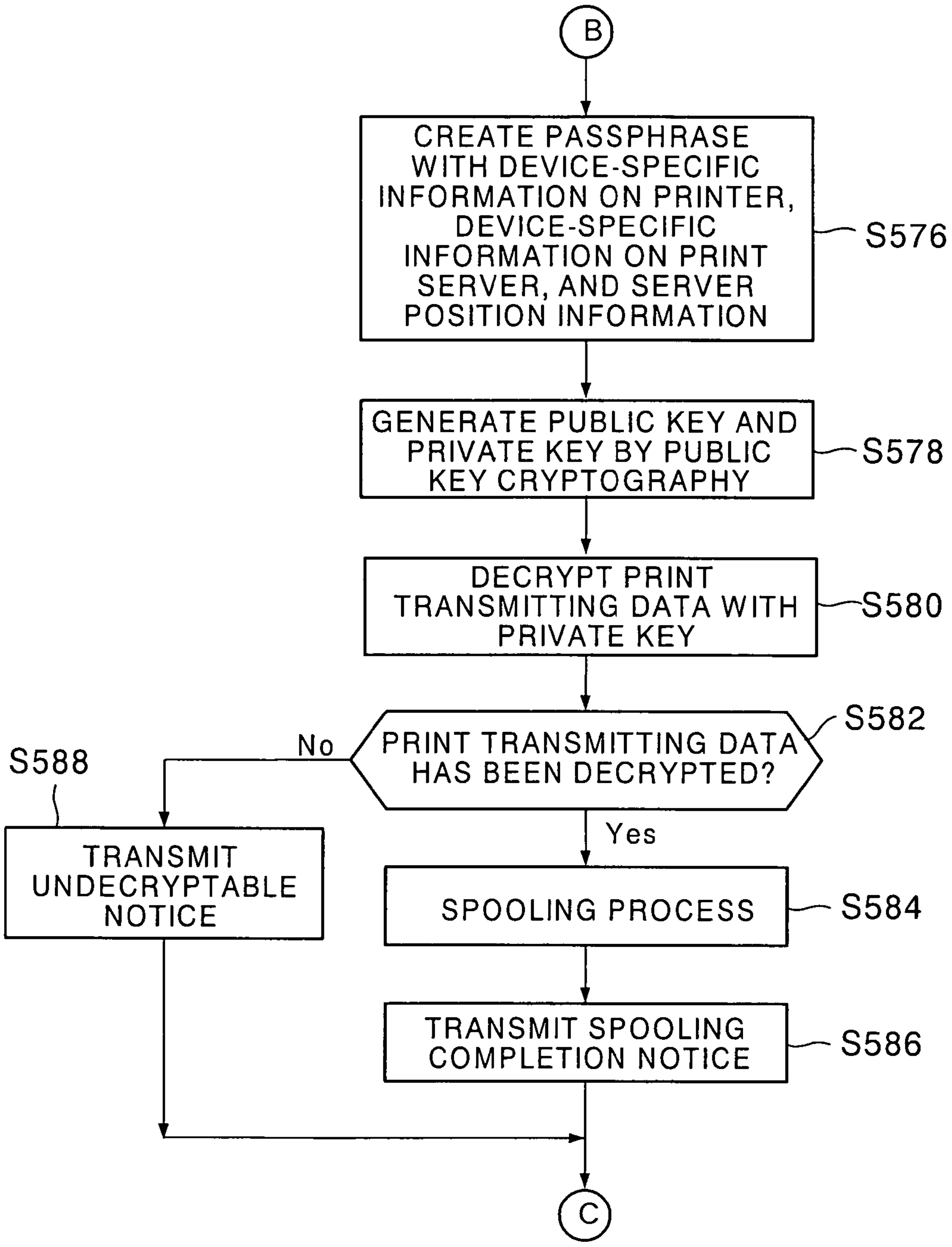
FIG. 29 is a flowchart explaining the print spooling process executed by the print server according to the seventh embodiment (Second process)

Next, a print spooling process executed in the print server 200 corresponding to the print request process in the print clients 20, 22 will be explained based on FIG. 28 and FIG. 29. FIG. 28 and FIG. 29 are flowcharts explaining the print spooling process executed in the print server 200. This print spooling process is realized by making the CPU 210 read and execute a print spooling program stored in the ROM 214 of the print server 200. Also here, similarly to the above, assuming the case where the print client 20 makes the print request to the printer 30, the following explanation is given.

As shown in FIG. 28, the print server 200 judges whether the print transmitting data has been received from the network 10 (step S570). When no print transmitting data has been received (step S570: No), the print server 200 stands by while repeating the process in step S570.

On the other hand, when the print transmitting data has been received (step S570: Yes), the print server 200 acquires device-specific information on the printer which is requested to perform printing (step S572). The method of acquiring the device-specific information on the printer is the same as that in the aforementioned step S532.

Then, the print server 200 acquires its own device-specific information (step S573). Subsequently, the print server 200 acquires server position information on the print server 200 at this point in time from the position detector 214 (step S574). The reason why the server position information is acquired from the position detector 214 each time as described just above is that, when the print server 200 has been moved to a different place, there is a possibility that the print server 200 is installed in a place where the user does not intend to perform printing, and in order that in such a case, the print operation is not executed by the printer connected to the print server 200.

Then, as shown in FIG. 29, the print server 200 creates a passphrase based on the device-specific information on the printer 30, the device specific information on the print server 200, and the server position information (step S576). The method of creating the passphrase needs to be the same method as in step S536 in the aforementioned public key transmission process. This is because, if the passphrases are different, the print transmitting data encrypted with the public key transmitted to the print client cannot be decrypted with a private key.

Thereafter, the print server 200 generates a public key and a private key with the passphrase by the public key cryptography (step S578). Subsequently, the print server 200 decrypts the received print transmitting data with the generated private key and acquires print data (step S580).

Then, the print server 200 judges whether the print transmitting data has been decrypted with the private key (step S582). When the print transmitting data has been be decrypted (step S582: Yes), the print server 200 performs a spooling process (step S584). More specifically, the print server 200 temporarily stores the decrypted print data on the hard disk 222, reads the print data from the hard disk 222 according to the availability of the printer 30 and transmits it to the printer 30. The printer 30 performs a language interpretation of the transmitted print data and generates print request data fitting the print engine 52. Then, by transmitting this print request data to the print engine 52, print sheets and so on are printed by the print engine 52.

As can be seen from the above, in this embodiment, the private key is generated with the passphrase containing at least the server position information detected by the position detector 224 of the print server 200, and when the print transmitting data has been decrypted with this private key, it is judged that the print transmitting data matches the server position information.

At a point in time when the spooling process has been properly completed, the print server 200 transmits a print completion notice that the spooling process has been properly completed as print result information to the print client 20 (step S586). Then, the print server 200 returns to the aforementioned process in step S570.

Contrary to this, when it is judged in step S582 that the print transmitting data has not been decrypted (step S582: No), the print server 200 transmits an undecryptable notice as the print result information to the print client 20 (step S588). Namely, in this embodiment, when the private key is generated with the passphrase containing at least the server position information detected by the position detector 224 of the print server 200 but the print transmitting data has not been decrypted with this private key, it is judged that that the print transmitting data does not match the server position information. Then, the print server 200 returns to the aforementioned process in step S570.

As described above, according to the print system of this embodiment, the print clients 20, 22 can limit a print server able to decrypt transmitted encrypted print transmitting data based on server position information, so that the decryption of the print transmitting data by the print server installed in a position where the users of the print clients 20, 22 do not intend to perform printing can be avoided. For example, even if the print transmitting data is transmitted by mistake to the print server 200 from the print client 20 when the print server 200 has been moved to a different place but the network address of the print server 200 in the network 10 remains unchanged, the server position information is changed in the print server 200, whereby the passphrase created in step S576 is different from that before the movement. Hence, the print transmitting data cannot be decrypted in the print server 200 even if a private key generated with this passphrase is used. Therefore, the security of print data can be enhanced.

On the other hand, also on the print server 200 side, the transmission of print data to the print server 200 by somebody who is not duly authorized to perform printing with printers connected to the print server 200 and the execution of a large print operation by the printers can be avoided. For example, even if a third party can know the network address of the print server 200 for some reason and tries to transmit print transmitting data to the print server 200, the third party cannot acquire the public key of the print server 200. Even if this user generates print transmitting data by encrypting print data with a different public key or generates print transmitting data without encryption and transmits the print transmitting data to the print server 200, it is judged in step S582 of the print spooling process that the print transmitting data has not been decrypted, and hence it becomes impossible to make the printers connected to the print server 200 execute the print operation. Consequently, the security of a print server and printers can be enhanced.

Moreover, in this embodiment, the passphrase contains both the device-specific information on the printer and the device-specific information on the print server 200, and hence even if a third party can know the position of the print server 200 for some reason, the passphrase used in the print server 200 cannot be specified unless the device-specific information on the printer and the device-specific information on the print server 200 are known. Consequently, the possibility that the third party who has no rightful authority performs printing with the printers connected to the print server 200 can be greatly reduced.

Eighth Embodiment

The eighth embodiment of the present invention is designed so that by modifying the aforementioned seventh embodiment, the print server 200 generates a passphrase with the device-specific information on the print server 200 and the server position information without acquiring the device-specific information on the printer connected to the print server 200.

It should be mentioned that the entire configuration of a print system and an internal configuration of the print server 200 according to this embodiment are the same as those in the aforementioned seventh embodiment.

Figure 30:
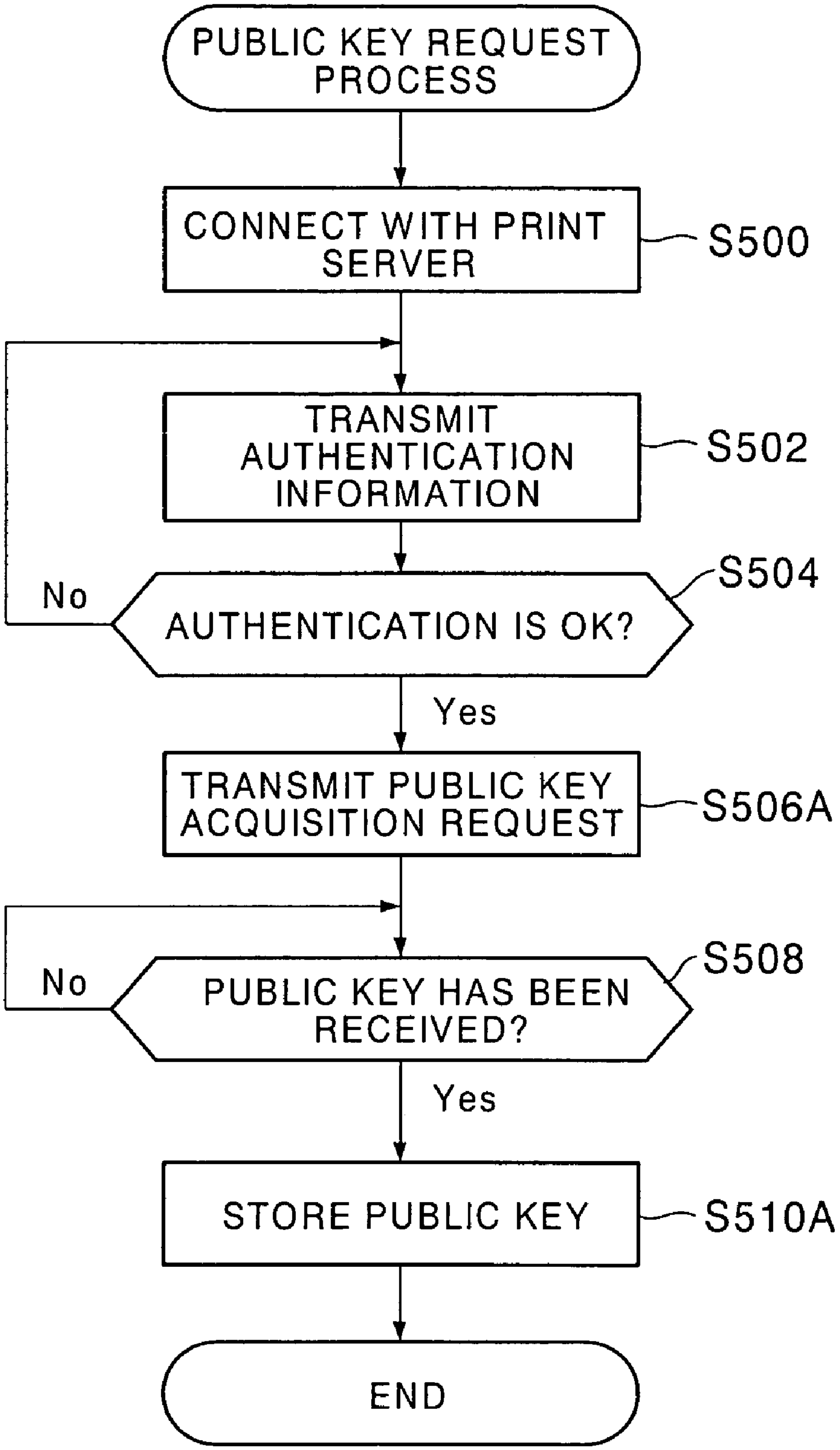
FIG. 30 is a flowchart explaining a public key request process executed by the print client according to an eighth embodiment.

FIG. 30 is a flow chart explaining a public key request process executed in the print clients 20, 22 and corresponds to FIG. 24 in the seventh embodiment. As shown in FIG. 30, the process in step S506 of transmitting a public key acquisition request and the process in step 510 of storing a public key are different from those in the aforementioned seventh embodiment.

In this embodiment, the print clients 20, 22 need not specify a printer when transmitting a public key acquisition request to the print server 200 (step S506A). This is because a passphrase used when the print server 200 generates a public key and a private key does not contain the device-specific information on the printer.

When having received the public key from the print server 200, the print clients 20, 22 store the public key in a public key table TB40 (step S510A). FIG. 31 shows the structure of the public key table TB40.

As shown in FIG. 31, the public key table TB40 according to this embodiment includes an item D40 which stores information to specify print servers and an item D41 which stores acquired public keys in a one-to-one correspondence with the print servers. Namely, in this embodiment, public keys differ from one print server to another print server. The print clients 20, 22 manage the public keys on a per print server basis.

Figure 32:
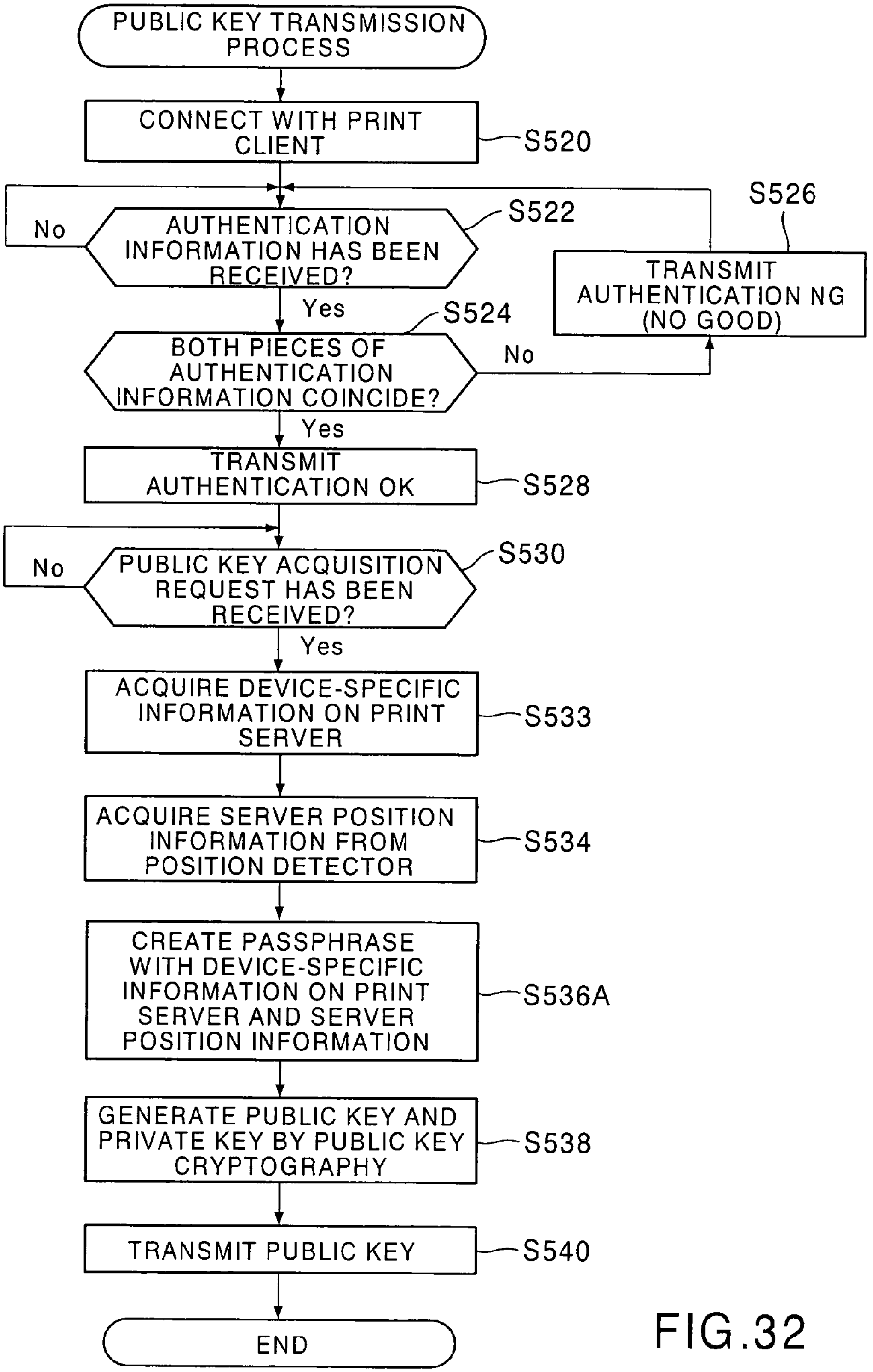
FIG. 32 is a flowchart explaining a public key transmission process executed by the print server according to the eighth embodiment.

FIG. 32 is a flow chart explaining a public key transmission process executed in the print server 200. The print key transmission process in this embodiment is the same as that in the aforementioned seventh embodiment except for step S536.

As shown in FIG. 32, in this embodiment, the print server 200 creates a passphrase with device-specific information on the print server 200 and server position information (step S536A). Namely, the passphrase is created by joining the server position information after the device-specific information on the print server 200. The process other than this is the same as that in the aforementioned seventh embodiment.

Incidentally, a process in the print clients 20, 22 when the print clients 20, 22 want to perform printing and transmit a print request to the print server 200 is the same as that in the aforementioned fourth embodiment.

Figure 33:
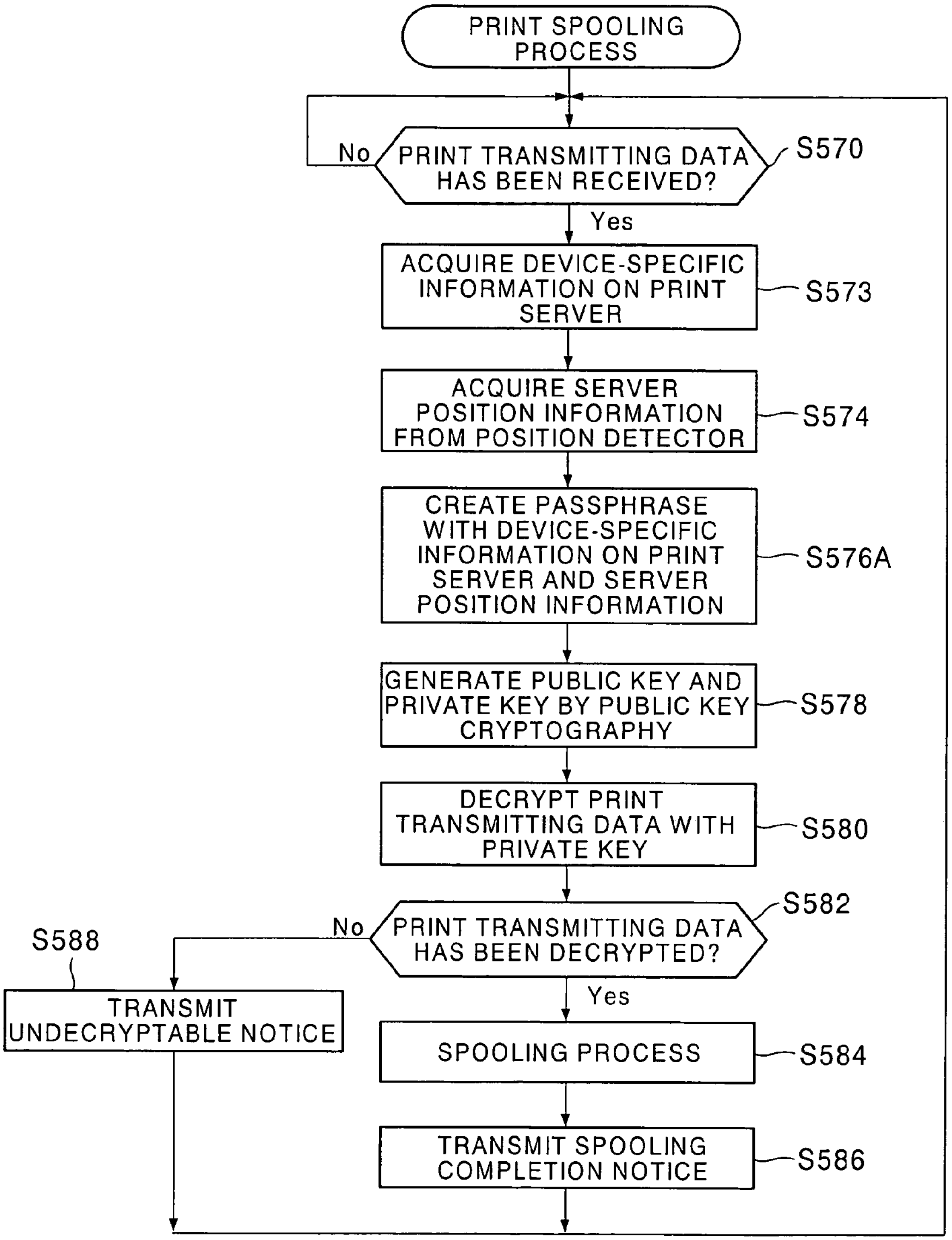
FIG. 33 is a flowchart explaining a print spooling process executed by the print server according to the eighth embodiment.

FIG. 33 is a flowchart explaining a print spooling process executed in the print server 200. As shown in FIG. 33, in this embodiment, the print server 200 creates a passphrase with device specific information on the print server 200 and server position information (step S576A). Namely, the passphrase is created by the same method as in step S536A. The process other than this is the same as that in the aforementioned seventh embodiment.

As described above, according to the print system of this embodiment, public keys are generated on a per print server basis, whereby there is an advantage of making the management of the public keys on the print clients 20, 22 side easy.

Ninth Embodiment

The ninth embodiment is designed so that by modifying the aforementioned seventh embodiment and eighth embodiment, the print server 200 transmits decrypted print data to a printer directly without spooling it.

Figure 34:
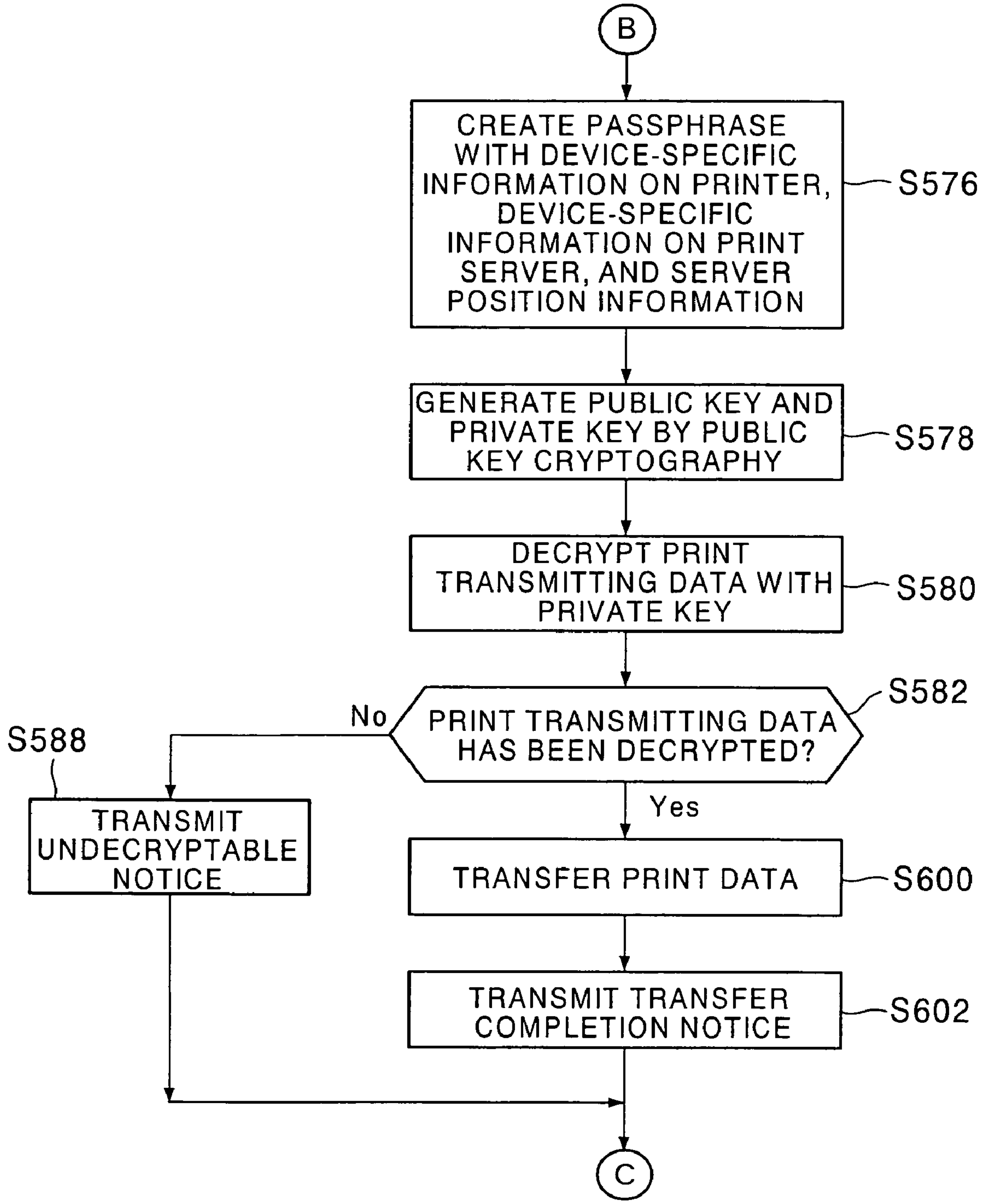
FIG. 34 is a flowchart explaining a print execution process executed by the print server according to a ninth embodiment (modification of the seventh embodiment)

FIG. 34 is a diagram showing a print execution process which is obtained by modifying the print spooling process in the aforementioned seventh embodiment, and corresponds to FIG. 29. As shown in FIG. 34, in this embodiment, when the print transmitting data has been decrypted (step S582: Yes), print data obtained by decryption is transferred to the printer 30 (step S600). Then, at a point in time when the print data has been properly transferred, the print server 200 transmits to the print client 20 a notice to the effect that the print data has been properly transferred as print result information (step S602). Then, similarly to the seventh embodiment, the print server 200 returns to the process in step S570.

Figure 35:
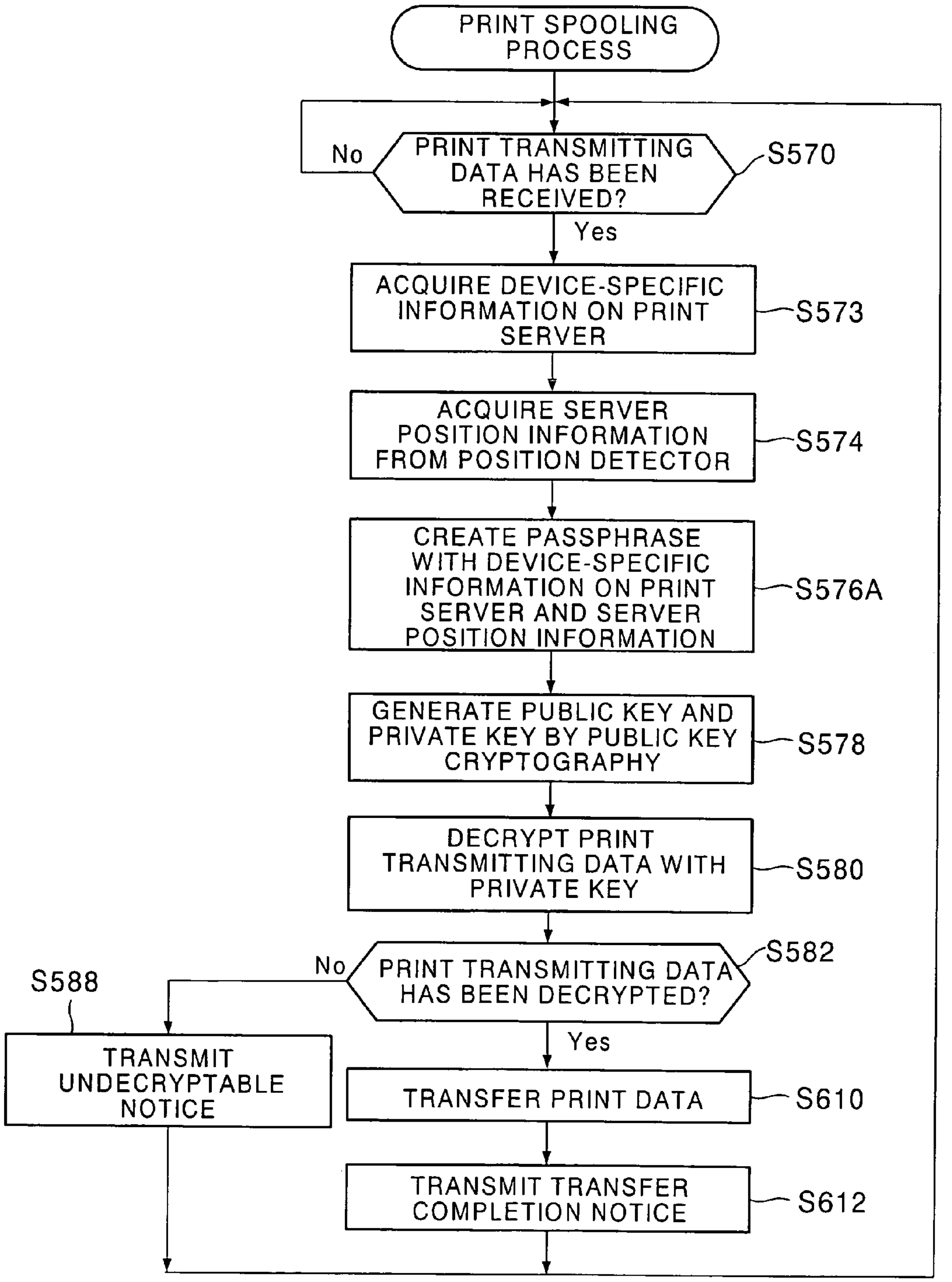
FIG. 35 is a flowchart explaining a print execution process executed by the print server according to the ninth embodiment (modification of the eighth embodiment)

FIG. 35 is a diagram showing a print execution process obtained by modifying the print spooling process in the aforementioned eighth embodiment, and corresponds to FIG. 33. As shown in FIG. 35, in this embodiment, when the print transmitting data has been decrypted (step S582: Yes), the print data obtained by decryption is transferred to the printer 30 (step S610). Then, at a point in time when the print data has been properly transferred, the print server 200 transmits to the print client 20 a notice to the effect that the print data has been properly transferred as print result information (step S612). Then, similarly to the eighth embodiment, the print server 200 returns to the process in step S570.

As described above, the aforementioned seventh embodiment and eighth embodiment can be also applied to the print server 200 of a type without a spooling process.

It should be mentioned that the present invention is not limited to the aforementioned embodiments, and various changes may be made therein. For example, the present invention is explained with the print client as an example of a data transmitting device which transmits data whose security is to be ensured and the printer as an example of a data receiving device which receives the data in the aforementioned embodiments, but a combination of the data transmitting device and the data receiving device in a data transmitting and receiving system is not limited to that in the aforementioned embodiments. For example, in the data transmitting and receiving system, the data transmitting device may be a digital camera for taking images and the data receiving device may be a data server which stores data on the images taken by the digital camera. In this case, transmitting data transmitted from the digital camera is received by the data server, when this transmitting data matches device position information at this point in time in the data server, the data server stores data contained in the transmitting data, and when the transmitting data and the device position information at this point in time do not match, the data sever does not store the data contained in the transmitting data.

Moreover, in the data transmitting and receiving system, the data transmitting device may be a personal computer and the data receiving device may be a projector which projects image data transmitted from the personal computer. In this case, transmitting data transmitted from the personal computer is received by the projector, when this transmitting data matches device position information at this point in time in the projector, the projector projects data contained in the transmitting data, and when the transmitting data and the device position information at this point in time do not match, the projector does not project the data contained in the transmitting data.

Further, in the data transmitting and receiving system, the data transmitting device may be a content server for music or the like and the data receiving device may be a playback device for content data such as music transmitted from the content server. In this case, transmitting data transmitted from the content server is received by the playback device, when this transmitting data matches device position information at this point in time in the playback device, the playback device plays back data contained in the transmitting data, and when the transmitting data and the device position information at this point in time do not match, the playback device does not play back the data contained in the transmitting data.

The above also applies to the aforementioned seventh embodiment and eighth embodiment, and the present invention may be applied to a server which spools data other than the print transmitting data.

Moreover, in the aforementioned second embodiment and fifth embodiment, the printers 30, 32 each include two position detectors 100 and 102, but the number of position detectors is not limited to two and it may be plural. In this case, when the printer acquires printer position information, the printer position information may be acquired from one of position detectors capable of position detection at this point in time out of these plural position detectors.

Further, the aforementioned embodiments are explained with the case where a print medium for the printers 30, 32 is a print sheet as an example, but the print medium is not limited to this, and the present invention can be applied to other print media such as an OHP sheet and the like.

Furthermore, in the aforementioned embodiments, device-specific information on the printer and/or device-specific information on the print server in addition to printer position information or server position information are used for the passphrase, but the device-specific information on the printer and the device-specific information on the print server may not be used. In this case, for example, the passphrase may be created by only the printer position information or the server position information.

Figure 36:
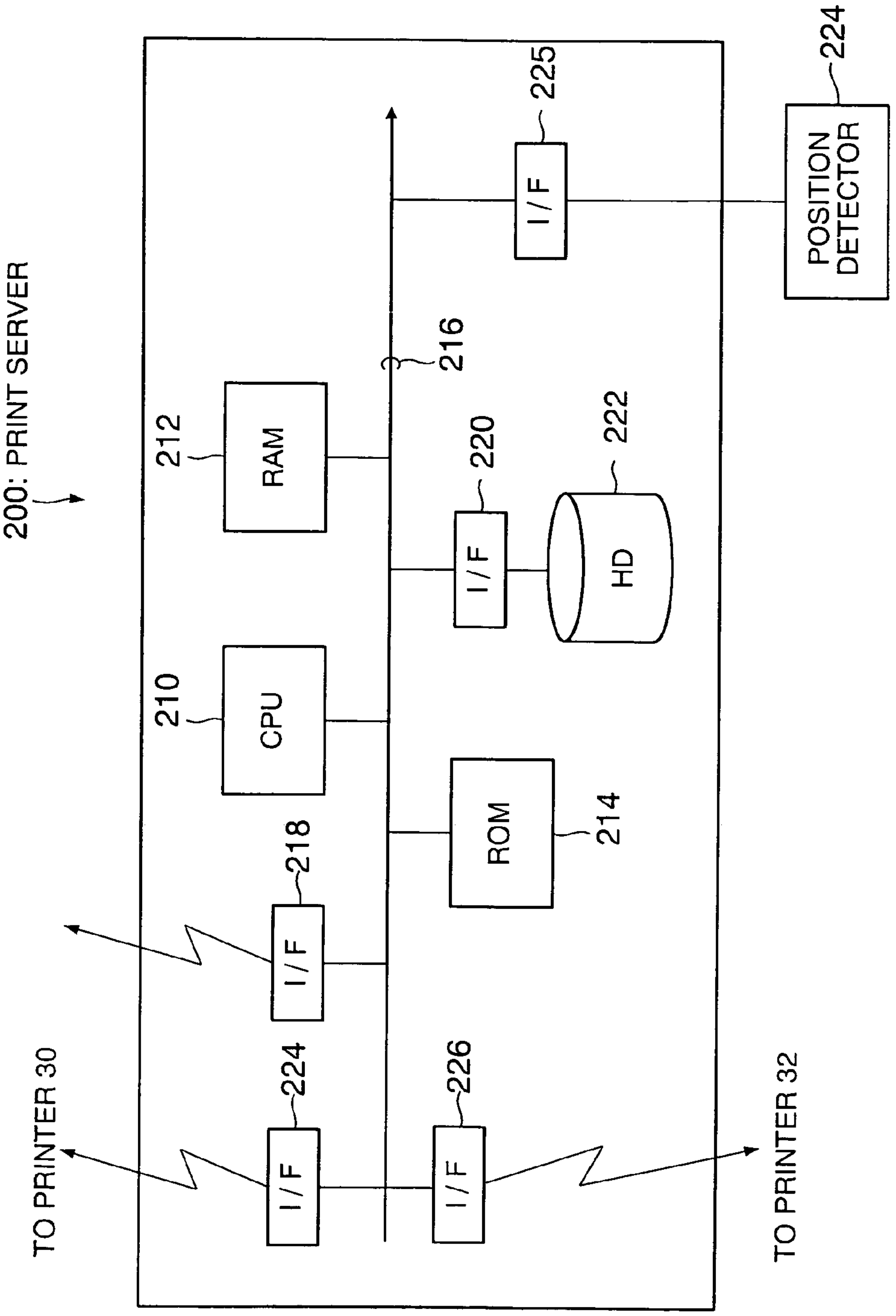
FIG. 36 is a diagram showing an example of a configuration of the print server in which a position detector is externally mounted via a wired cable.
Figure 37:
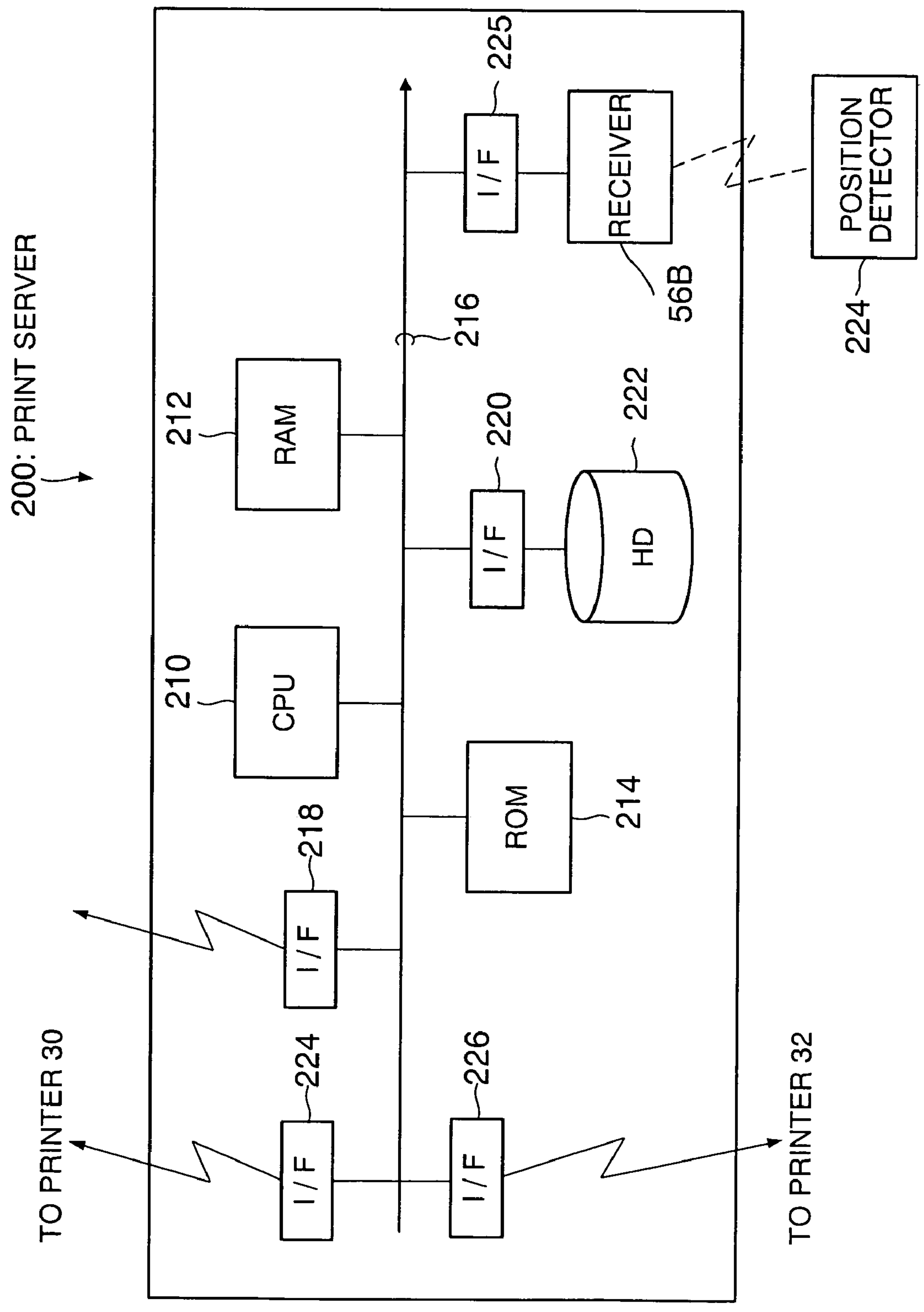
FIG. 37 is a diagram showing an example of a configuration of the print server in which the position detector is externally mounted via wireless.

Besides, as shown in FIG. 36 and FIG. 37, in the aforementioned seventh to ninth embodiments, the position detector 224 may be mounted externally as in the sixth embodiment. In this case, in the example in FIG. 36, the position detector 224 is detachable via an interface 225. In the example in FIG. 37, the position detector 224 can communicate with the print server 200 via a receiver 56B.

Moreover, in the aforementioned embodiments, as an example in which a print request is restricted, the case where a print operation is not accepted is explained, but the print request restriction is not limited to the above case. For example, it is also possible in the first to third embodiments that when printer position information is matched, there is no restriction on the number of print sheets in the case of the print request, and that when the printer position information is not matched, the number of print sheets is restricted, for example, to 10. Alternatively, it is also possible that when the printer position information is matched, both color print and black-and-white print are possible, and that when the printer position information is not matched, print is limited to only black-and-white print. Further, it is also possible that when the printer position information is not matched, only a print request of print data transmitted from an IP address which is previously registered with the printer is accepted.

Further, in the aforementioned fourth to ninth embodiments, a print operation is executed only when the received print transmitting data can be decrypted with the private key, but regardless of whether the print transmitting data can be decrypted, the print operation may be executed based on data acquired by decryption. In this case, when the print transmitting data has not been decrypted properly with the private key, the printer executes a meaningless print operation, and hence the user cannot obtain a meaningful print result.

Furthermore, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print clients 20, 22 and/or the printers 30, 32 read the record medium on which this program is recorded and execute this program.

Moreover, the print clients 20, 22 and/or the printers 30, 32 sometimes have other programs such as an operating system, other application programs, and the like. In this case, by using these other programs in the print clients 20, 22 and/or the printers 30, 32, a command, which calls a program to realize a process equal to that in the aforementioned embodiments out of programs in the print clients 20, 22 and/or the printers 30, 32, may be recorded on the record medium.

Further, such a program can be distributed not in the form of the record medium but in the form of a carrier wave via a network. The program transmitted in the form of the carrier wave over the network is incorporated in the print clients 20, 22 and/or the printers 30, 32, and the aforementioned embodiments can be realized by executing this program.

Furthermore, when being recorded on the record medium or transmitted as the carrier wave over the network, the program is sometimes encrypted or compressed. In this case, the print clients 20, 22 and/or the printers 30, 32 which have read the program from the record medium or the carrier wave need to execute the program after decrypting or expanding it.

The invention claimed is:

1. A printer which processes print transmitting data, comprising:

a print transmitting data receiver which receives the print transmitting data;

a first printer position acquisition which acquires printer position information to specify a place where the printer is installed when the print transmitting data receiver has received the print transmitting data, this printer position information being regarded as first printer position information;

a judgment section which judges whether the print transmitting data matches the first printer position information;

a print executor which executes a print operation based on the print transmitting data when the judgment section judges that the print transmitting data matches the first printer position information and restricts the print operation based on the print transmitting data when the judgment section judges that the print transmitting data does not match the first printer position information;

a public key acquisition request receiver which receives a public key acquisition request transmitted from a print client;

a second printer position acquisition which acquires printer position information on the printer when the public key acquisition request receiver has received the public key acquisition request, this printer position information being regarded as second printer position information;

a public key generator which generates a public key with a first passphrase containing at least the second printer position information; and a public key transmitter which transmits the public key generated by the public key generator to the print client which has transmitted the public key acquisition request, wherein the print executor does not execute the print operation based on the print transmitting data when the judgment section judges that the print transmitting data does not match the first printer position information.

2. The printer according to claim 1, wherein the judgment section generates a private key with a second passphrase containing at least the first printer position information acquired by the first printer position acquisition, judges that the print transmitting data matches the first printer position information when the print transmitting data has been decrypted with the private key, and judges that the print transmitting data does not match the first printer position information when the print transmitting data has not been decrypted with the private key.

3. The printer according to claim 2, further comprising:

an authentication information receiver which receives authentication information from the print client; and an authentication information judgment section which judges whether the authentication information received by the authentication information receiver coincides with previously registered authentication information, wherein the public key transmitter transmits the public key to the print client only when the two pieces of the authentication information coincide in the authentication information judgment section.

4. The printer according to claim 3, further comprising:

a device-specific information acquisition which acquires device-specific information which is information specific to the printer, wherein the second passphrase used in the judgment section contains at least the first printer position information and the device-specific information, and the first passphrase used in the public key generator contains at least the second printer position information and the device-specific information.

5. A control method of a printer which processes print transmitting data, comprising the steps of:

receiving the print transmitting data;

acquiring printer position information to specify a place where the printer is installed when the print transmitting data has been received, and regarding this printer position information as first printer position information;

judging whether the print transmitting data matches the first printer position information;

executing a print operation based on the print transmitting data when it is judged that the print transmitting data matches the first printer position information;

restricting the print operation based on the print transmitting data when it is judged that the print transmitting data does not match the first printer position information;

receiving a public key acquisition request transmitted from a print client;

acquiring printer position information on the printer when the public key acquisition request has been received and regarding this printer position information as second printer position information;

generating a public key with a first passphrase containing at least the second printer position information; and transmitting the public key to the print client which has transmitted the public key acquisition request, wherein in the step of restricting the print operation, the print operation based on the print transmitting data is not executed when it is judged that the print transmitting data does not match the first printer position information.

6. The control method of the printer according to claim 5, wherein in the step of judging whether the print transmitting data matches the first printer position information, a private key is generated with a second passphrase containing at least the first printer position information, it is judged that the print transmitting data matches the first printer position information when the print transmitting data has been decrypted with the private key, and it is judged that the print transmitting data does not match the first printer position information when the print transmitting data has not been decrypted with the private key.

7. The control method of the printer according to claim 6, further comprising the steps of:

receiving authentication information from the print client; and judging whether the received authentication information coincides with previously registered authentication information, wherein in the step of transmitting the public key, the public key is transmitted to the print client only when the two pieces of the authentication information coincide.

8. The control method of the printer according to claim 7, further comprising the step of:

acquiring device-specific information which is information specific to the printer, wherein the second passphrase contains at least the first printer position information and the device-specific information, and the first passphrase contains at least the second printer position information and the device-specific information.

* * * * *